United States Patent [19]

Miyazawa

[11] Patent Number: 5,229,678
[45] Date of Patent: Jul. 20, 1993

[54] DRIVE CONTROL UNIT FOR AN ULTRASONIC STEP MOTOR

[75] Inventor: Osamu Miyazawa, Suwa, Japan

[73] Assignee: Seiko Epson Corporation, Tokyo, Japan

[21] Appl. No.: 602,576

[22] Filed: Oct. 22, 1990

[30] Foreign Application Priority Data

| Oct. 20, 1989 | [JP] | Japan | 1-273082 |
| Jun. 19, 1990 | [JP] | Japan | 2-158683 |
| Jun. 27, 1990 | [JP] | Japan | 2-166858 |
| Jun. 27, 1990 | [JP] | Japan | 2-166859 |
| Jun. 27, 1990 | [JP] | Japan | 2-166860 |

[51] Int. Cl.$^5$ .......................................... H01L 41/08
[52] U.S. Cl. .................................... 310/323; 310/316
[58] Field of Search .............. 310/323, 328, 316, 317; 318/116

[56] References Cited

U.S. PATENT DOCUMENTS

| 4,513,219 | 4/1985 | Katsuma et al. | 310/323 |
| 4,692,672 | 9/1987 | Okuno | 318/116 |
| 4,727,276 | 2/1988 | Izukawa et al. | 310/316 |
| 4,739,212 | 4/1988 | Imasaka et al. | 310/323 |
| 4,763,148 | 8/1988 | Tsukimoto et al. | 310/323 |
| 4,771,203 | 9/1988 | Mukohjima et al. | 310/323 |
| 4,794,294 | 12/1988 | Shimizu et al. | 310/316 |
| 4,829,209 | 5/1989 | Kawasaki et al. | 310/323 |
| 4,882,500 | 11/1989 | Iijima | 310/323 |
| 4,914,336 | 4/1990 | Yamasaki | 310/316 |
| 4,937,488 | 6/1990 | Fujie et al. | 310/323 |
| 4,952,834 | 8/1990 | Okada | 310/316 |
| 4,954,742 | 9/1990 | Izukawa | 310/316 |
| 4,980,599 | 12/1990 | Kuwabara et al. | 310/323 |
| 5,001,404 | 3/1991 | Kataoka | 318/116 |
| 5,006,746 | 12/1988 | Kasuga et al. | 310/323 |
| 5,010,222 | 4/1991 | Suganuma | 318/116 |
| 5,013,956 | 3/1989 | Kurozumi et al. | 310/323 |
| 5,023,526 | 6/1991 | Kuwabara et al. | 318/116 |
| 5,041,750 | 8/1991 | Kitani | 310/323 |
| 5,079,470 | 1/1992 | Kasuga et al. | 310/323 |
| 5,087,852 | 2/1992 | Culp | 310/323 |

FOREIGN PATENT DOCUMENTS

| 58-93477 | 6/1983 | Japan . |
| 59-122385 | 7/1984 | Japan . |
| 59-37673 | 9/1984 | Japan . |
| 60-51478 | 3/1985 | Japan . |
| 60-245482 | 12/1985 | Japan | 310/323 |
| 61-139280 | 6/1986 | Japan . |
| 61-224883 | 10/1986 | Japan . |
| 62-247770 | 10/1987 | Japan . |
| 62-293980 | 12/1987 | Japan . |
| 63-64582 | 3/1988 | Japan . |
| 0190569 | 8/1988 | Japan | 319/323 |
| 63-283475 | 11/1988 | Japan . |
| 63-305772 | 12/1988 | Japan . |
| 1-07678 | 4/1989 | Japan . |
| 0148077 | 6/1989 | Japan | 310/323 |

OTHER PUBLICATIONS

Iijima, "Ultrasonic Motor Using Flexural Standing Wave", *Japanese Journal of Applied Physics Supplement*, 23-1 (1987).
Japanese Journal of Applied Physics/ Supplement Vo. 26 No. 26-1, 1987, pp. 191-193.

*Primary Examiner*—Mark O. Budd
*Attorney, Agent, or Firm*—Blum Kaplan

[57] ABSTRACT

An ultrasonic step motor includes a rotor having projections which extend toward a flexible stator. Piezoelectric elements are connected to and spaced along the circumference of the stator. A drive control unit applies driving signals to the vibrators to create nodes and antinodes forming substantially a standing waveform on the stator. The crests of the stator contact the projections of the rotor so as to move the projections of the rotor relative to and toward the nodes of the stator. Drive control circuitry maintains the frequency of the driving signal at the resonant frequency of the stator. The period of time during which the driving signals are applied to the piezoelectric elements is adjusted so as to reduce the power level required to drive the step motor.

142 Claims, 55 Drawing Sheets

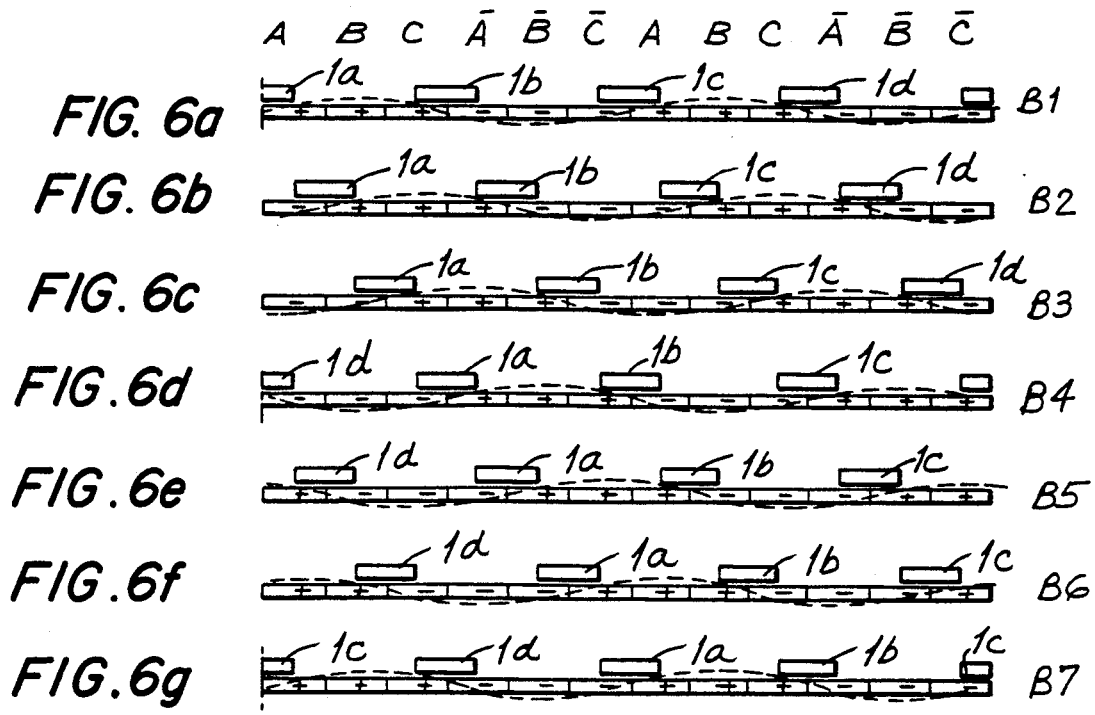
FIG. 6a
FIG. 6b
FIG. 6c
FIG. 6d
FIG. 6e
FIG. 6f
FIG. 6g
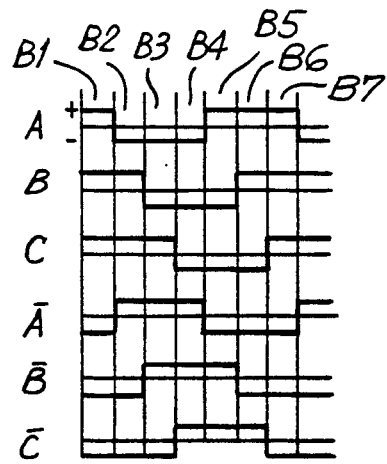
FIG. 7
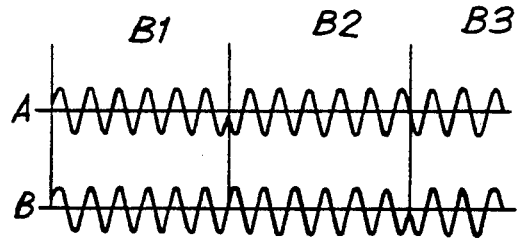
FIG. 8

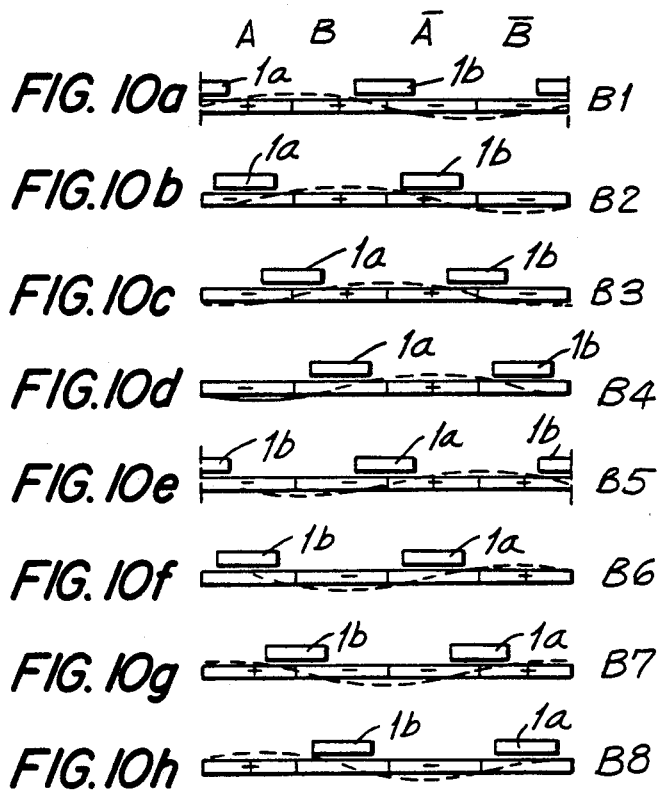
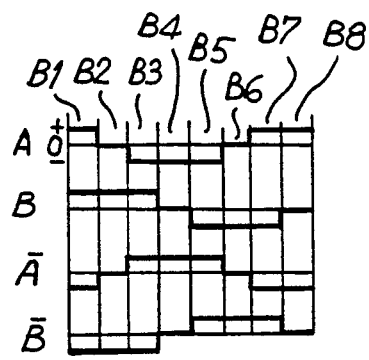
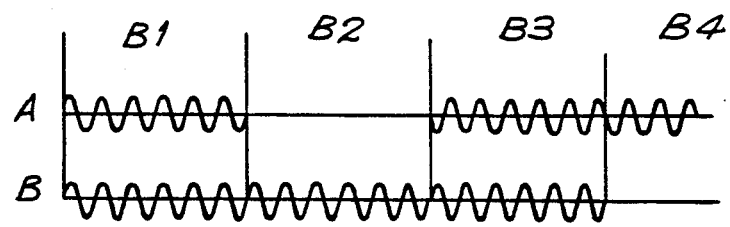
FIG. 10a – FIG. 10h
FIG. 11
FIG. 12

DRIVE CONTROL UNIT FOR AN ULTRASONIC STEP MOTOR

BACKGROUND OF THE INVENTION

The present invention relates to drive control unit for an ultrasonic step motor, and more particularly to the drive circuitry for controlling the ultrasonic vibrations supplied to a step motor.

Conventional ultrasonic motors such as disclosed in Japanese Laid-Open Patent Publication Nos. 58-93477, 59-37673, 59-122385, and 60-51478, convert ultrasonic vibrational energy to rotational energy by applying a travelling wave to a set of vibrators to drive a rotor. The rotor rotates or otherwise continuously moves whenever and only when a driving voltage is applied to the stator of the motor. The motors operate inefficiently. Complex feedback control systems also must be provided and include circuitry for controlling the number of revolutions, stopping positions and/or rotational speed of the rotor. An undesirably high level in power consumption by the drive control unit results. Adjustment in the length of the step by the rotor also cannot be easily achieved. Undesirable manufacturing costs, additional assembly time and other related drawbacks also result.

It is therefore desirable to provide an ultrasonic motor which avoids such feedback control systems and, in particular, a step motor which operates more efficiently with drive circuitry which consumes less power and permits wide variation in the step movement of the rotor.

SUMMARY OF THE INVENTION

Generally speaking, in accordance with the invention, a step motor includes a stator operable for vibrating in a first direction at a frequency which produces at least two vibratory nodes positioned on the stator and a plurality of piezoelectric elements for excitation of the stator. The step motor also includes drive circuitry for driving the piezoelectric elements so as to control the number and position of vibratory nodes produced by the stator. A rotor moves relative to the vibratory nodes in a second direction essentially orthogonal to the first direction through contact with the stator.

By energizing the piezoelectric elements based on the driving voltages, the stator vibrates with portions of the stator flexing upwardly in the first direction so as to create a standing waveform having at least crests (referred to hereinafter as "antinodes") and nodes.

Preferably, the rotor includes projections extending toward the stator. The projections are positioned so as to come into contact with the raised portions (i.e., antinodes) of the stator whereby the projections move relative to the vibratory nodes in the second direction which are essentially orthogonal to the first direction. The rotor therefore moves relative to the stator in steps, that is, with projections of the rotor being pushed by antinode portions of the stator toward nodal portions of the stator. By providing driving circuitry which drives the piezoelectric elements in any desired predetermined phase pattern, the number and size of each rotor step can be simply and easily adjusted.

The piezoelectric elements are spaced along the edge (i.e., circumference) of the stator at predetermined locations. The piezoelectric elements, which serve as vibrators, are connected to that side of the stator opposite to the side which faces the rotor. The stator is made of a material suitable for vibration at its resonant frequency (i.e., fundamental frequency) or a harmonic thereof.

The driving signals produced by the drive circuitry are at a frequency equal to the resonant frequency of both the piezoelectric elements and stator. Accordingly, vibration of the stator is efficiently achieved.

In one feature of the invention, the drive circuitry includes a supply source of positive and negative polarity. The frequency at which the stator vibrates is preferably ultrasonic. Each piezoelectric element (i.e., vibrator) includes at least two terminals. The driving signals are applied to one of the at least two terminals of each vibrator. The other terminal of the at least two terminals is preferably connected to a reference voltage such as ground.

In another feature of the invention, a predetermined number of driving signals of a first polarity are followed by the same predetermined number of driving signals of a second polarity. Alternatively, between one or more driving signals of a first polarity applied to one or more first vibrators and one or more driving signals of a second polarity applied to one or second vibrators is at least one driving signal having a zero voltage level applied to one or more third vibrators.

Power consumption requirements can be reduced by using a supply source of only one polarity rather than a supply source having opposite polarities. Power consumption by the drive circuitry also can be reduced by shortening the length of time during which driving signals are applied to the vibrators. In this feature of the invention, the driving voltage applied to each vibrator which creates an antinode on the stator is not applied for the entire step. A reduction in the power requirements results. Alternatively, driving voltages are applied only to piezoelectric elements corresponding to the antinode positions of the stator to reduce power consumption requirements.

In another feature of the invention, the driving voltages are converted from pulses to sinusoidal waves using filter circuitry. The sinusoidal voltages are at the common resonant frequency of the vibrators and stator resulting in efficient vibration of the stator. By supplying the drive circuitry with a supply voltage of either a positive or negative polarity, and using inverters to create voltages of an opposite polarity, a single power source can be employed reducing the cost for manufacturing the drive circuitry.

In another feature of the invention the vibrators are connected in a series in accordance with the phase pattern of the driving voltages. By connecting one of the two terminals of each vibrator in common, construction of the step motor can be simplified without requiring the grounding of at least one terminal of each vibrator.

In still another feature of the invention, application of a driving voltage to a vibrator is interrupted during one-half the period of time required to move one step. One-half rotor step movement relative to the vibratory nodes is achieved. 3/2, 5/2, etc. rotor step movements also can be produced.

In another aspect of the invention, the driving circuitry determines when the rotor is no longer moving to prevent the unnecessary application of driving voltages thereafter and thereby reduces the consumption of power by the drive circuitry. In accordance with this aspect of the invention, movement of the rotor can be monitored by including an encoder connected to the rotor and a decoder for sending an interruption signal to the drive circuitry when the output of the encoder indicates that the rotor has moved a desired amount. Alternatively, the rotation detecting circuitry detects for maximum induced voltage in a vibrator to determine when the rotor is no longer moving. When the induced voltages reaches a maximum level, application of the driving voltages is interrupted.

In order to further reduce the power consumption level of the driving circuitry, once the rotor has moved a predetermined amount (e.g., one step), the charges on the vibrators are short circuited. Such short circuiting preferably occurs during phase reversal of the vibrators. By short circuiting the vibrators, less power is required in order to apply a voltage of an opposite polarity to the vibrator thereby reducing power level requirements of the driving circuitry.

In accordance with still another aspect of the invention, when the rotor has failed to move a desired amount (e.g., a step) after expiration of a predetermined period of time, the drive circuitry applies driving voltages to all vibrators in order to complete movement of the rotor by one step.

In accordance with still a further aspect of the invention, the frequency of the driving voltages is adjusted so that the stator vibrates at its resonant frequency. In accordance with this aspect of the invention, the magnitude or phase of the induced voltages of the driven vibrators are detected against a reference level to determine the frequency adjustment required to vibrate the stator at its resonant frequency. Preferably, the frequency of the driving voltage is the same as the resonant frequency of the stator. In accordance with this aspect of the invention, the previous induced voltage detected during the last step can be used as the reference level in comparing to the present induced voltage to determine the frequency adjustment to be made to the driving signals. Frequency correction of the driving voltages is made once the rotor has moved a desired amount (e.g., one step).

Accordingly, it is object of the invention to provide an improved step motor which can be adjusted to produce a variety of different rotor step movements.

It is another object of the invention to provide an improved step motor which can be operated at a reduced power level.

It is still another object of the invention to provide an improved step motor in which the stator vibrates and is maintained at its resonant frequency.

Still other objects and advantages of the invention will, in part, be obvious and will, in part, be apparent from the specification.

The invention accordingly comprises a device possessing the features, properties and the relation of components which will be exemplified in the device hereinafter described and the scope of the invention will be indicated in the claims.

BRIEF DESCRIPTION OF THE DRAWINGS

FIGS. 6a-6g are diagrammatic, plan views of the rotor and stator for different vibrational modes;

FIG. 7 is a timing chart of the phase relationships between the driving voltages which produce the vibrational modes of FIGS. 6a-6g;

FIG. 8 is a timing chart of the driving voltages applied to vibrators A and B of FIGS. 6a-6g;

FIGS. 10a-10h are diagrammatic, plan views of the rotor and stator of FIG. 9 for different vibrational modes;

FIG. 11 is a timing chart of the phase relationships between the driving voltages which produce the vibrational modes of FIGS. 10a-10h;

FIG. 12 is a timing chart of the driving voltages applied to vibrators A and B of FIGS. 10a-10h;

DETAILED DESCRIPTION OF THE PREFERRED EMBODIMENTS

A general overview of a surface-wave driven type stepping motor in accordance with the invention will be initially discussed with specific embodiments addressed thereafter.

Figure 1:
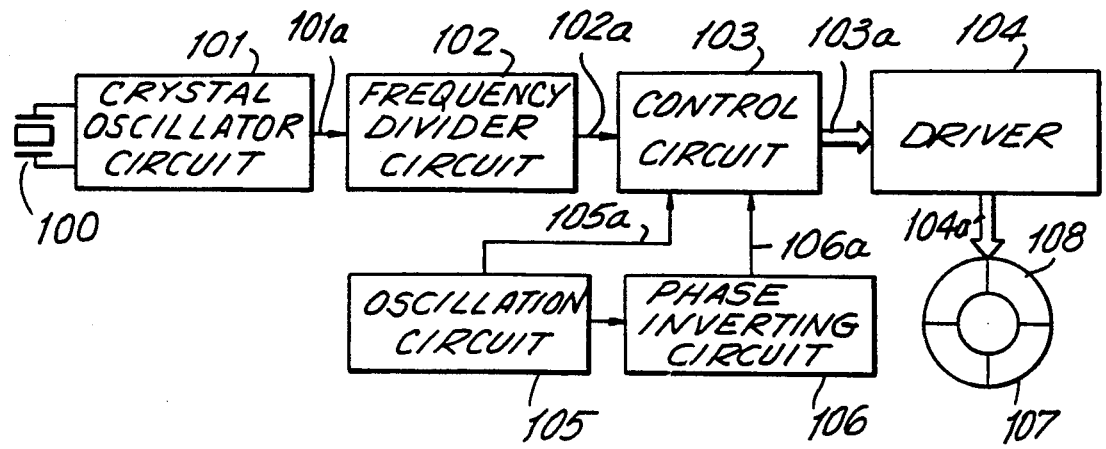
FIG. 1 is a block diagram of a drive control unit for an ultrasonic step motor in accordance with a first embodiment of the invention.

FIG. 1 is a block diagram of drive control unit for a surface wave driven type stepping motor. The drive control unit includes a crystal plate 100 connected to a crystal oscillator circuit 101 which produces an output signal 101a. A frequency divider 102 produces a phase control signal 102a having a frequency less than output signal 101a of crystal oscillator circuit 101. Phase control signal 102a is supplied by circuit 102 to a control circuit 103. Circuit 103 also receives and processes an oscillation signal 105a supplied from an oscillation circuit 105 and a phase inverting signal 106a supplied from a phase inverting circuit 106. Signals 105a and 106a oscillate at the same frequency as the resonant frequency of a vibrating unit 107. Signals 105a and 106a are used by control circuit 103 to generate drive control signals 103a.

Oscillation signal 105a is 180° out of phase with signal 106a. Phase control signal 102a of frequency divider circuit 102 serves as a control signal for controlling the processing of output signal 105a and phase-inverted output signal 106a by control unit 103.

A driver 104 amplifies drive control signals 103a and produces driving voltages 104a applied to vibrating unit 107. For exemplary purposes only, vibrating unit 107 is shown as including four vibrators 108 which are adapted to vibrate independently of one another.

FIGS. 2a-2e diagrammatically illustrate the operating principles of a surface-wave driven type stepping motor in which a piezoelectric unit 3 having a plurality of piezoelectric elements serve as the vibrating units.

Figure 2A:
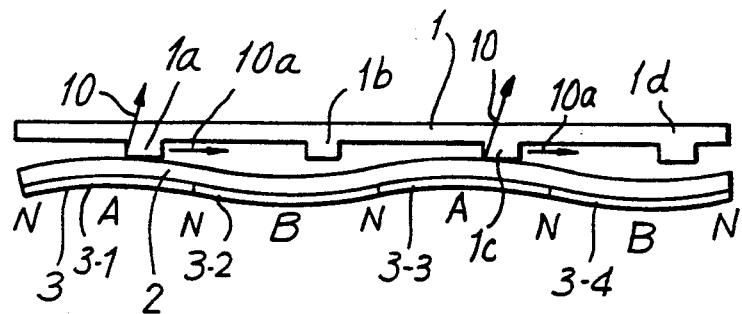
FIGS. 2a-2e are fragmented, diagrammatic elevational views of a rotor and stator of the ultrasonic step motor.

FIG. 2a shows a fixed-phase vibration mode in which a rotor 1 includes projections 1a, 1b, 1c and 1d extending towards a flexible stator 2. A piezoelectric unit 3 is connected to that side of stator 2 which does not face rotor 1. Piezoelectric unit 3 includes four vibrators (e.g., piezoelectric elements) 3-1, 3-2, 3-3 and 3-4 positioned along the circumference of stator 2 and which are alternately classified as vibrators A (i.e., 3-1, 3-3) and B (i.e., 3-2, 3-4). Adjacent vibrators A and B when energized by application of driving signals to piezoelectric unit 3 deform flexible stator 2 so as to be 180° out of phase (i.e. opposite in phase) with each other. The fixed phase vibration mode creates vibratory nodes N between each adjacent set of vibrators A and B of stator 2. By applying a predetermined phase pattern to the vibrators, a standing wave having at least crests (ie., antinodes) and nodes can be formed on stator 2. When piezoelectric unit 3 is energized, projections 1a and 1c are contacted and pushed away by those portions (i.e., antinodes) of stator 2 directly above vibrators 3-1 and 3-3, respectively.

Figure 2B:
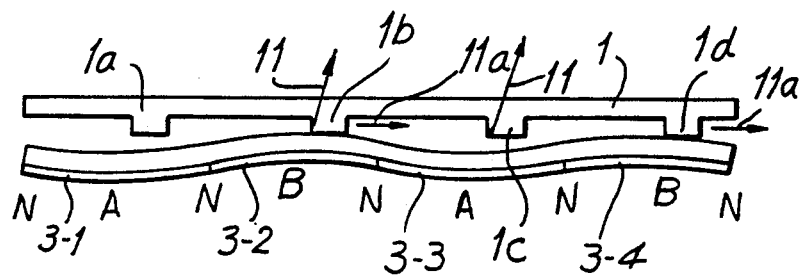

FIG. 2b illustrates a vibration mode in which adjacent vibrators A and B are 180° out of phase with (opposite in phase to) corresponding vibrators of FIG. 2a. In other words, the standing wave formed on stator 2 in FIGS. 2a and 2b are 180° out of phase with each other. Projections 1b and 1d are now in contact with and pushed away by those portions of stator 2 directly above vibrators 3-2 and 3-4, respectively.

In FIGS. 2a and 2b, those projections in contact with stator 2 are subjected to a pair of forces 10 and 11 in directions denoted by corresponding arrows, respectively. Force 10 is applied to projections 1a and 1c of rotor 1 in FIG. 2a. Force 11 is applied to projections 1b and 1d of rotor 1 in FIG. 2b. Projections 1a and 1c and projections 1b and 1d are separated from each other by a fixed interval. Additional projections of rotor 1, not shown in each figure, which are distanced from one of the two projections in contact with stator 2 by this fixed interval or by a multiple fixed interval are similarly subjected to forces 10 or 11 of stator 2.

Forces 10 and 11 have force component $10a$ and $11a$, respectively, which are substantially parallel to the surface of rotor 1 and directed away from the contacted projection. Projections 1a and 1c of FIG. 2a and projections 1b and 1d of FIG. 2b are therefore subjected to forces $10a$ and $11a$, respectively. Each contact projection moves relative to and toward the nearest node N. Rotor 1 therefore moves from left to right as shown in FIGS. 2a and 2b.

Figure 2C:
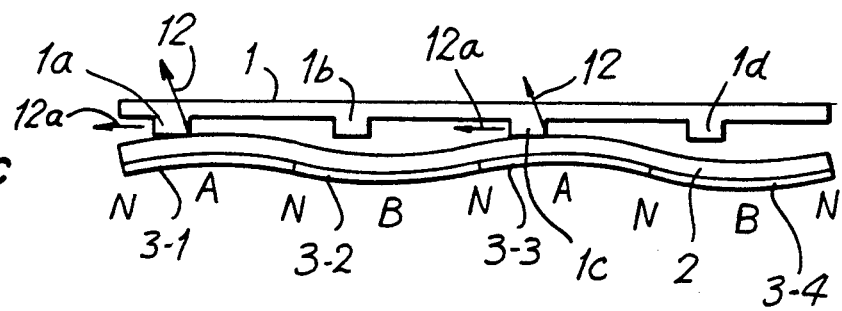
Figure 2D:
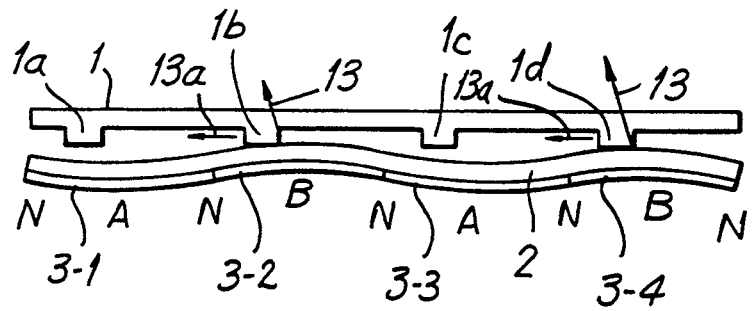

In FIGS. 2c and 2d, projections 1a and 1c and projections 1b and 1d are subjected to a component force $12a$ of a force 12 and to a component force $13a$ of a force 13, respectively. Component forces $12a$ and $13a$ are opposite in direction to component forces $10a$ and $11a$, respectively, and push each contacted projection relative to and toward the nearest node N. Accordingly, rotor 1 rotates from right to left as shown in FIGS. 2c and 2d.

Figure 2E:
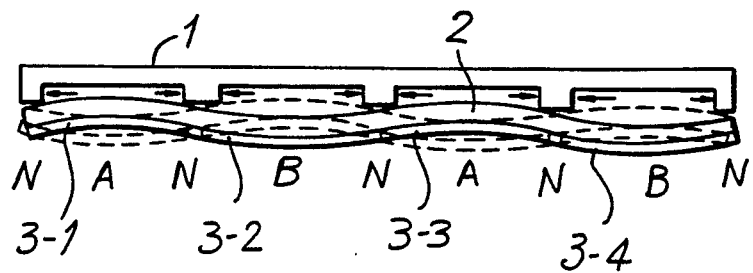

FIG. 2e is a superposition of FIGS. 2a, 2b, 2c and 2d. By adjusting the voltage applied to each vibrator of piezoelectric unit 3 so as change the vibration mode of stator 2, each of the plurality of projections of rotor 1 will move toward one of the plurality of nodes N of stator 2. By continuing to change the positions of nodes N, rotor 1 moves in a step like manner so as to operate as a stepping motor.

The driving voltage applied to the vibrators cause portions of stator 2 to vibrate in a first direction resulting in the production of nodes N in stator 2. Rotor 1 moves relative to nodes N in a direction essentially orthogonal to the first direction resulting in the movement of rotor 1 by one step.

Figure 3:
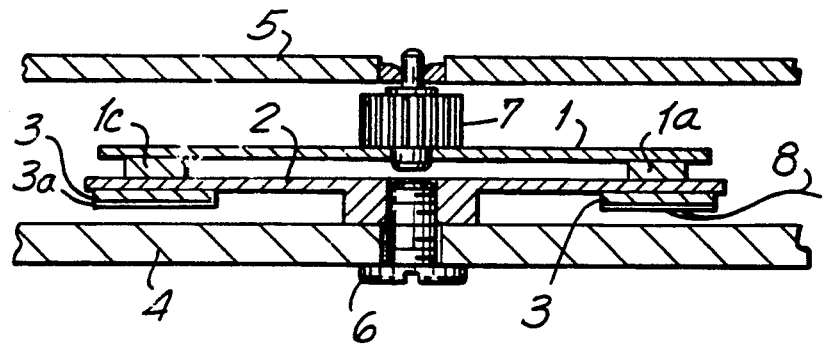
FIG. 3 is a fragmented, elevational of the ultrasonic step motor.
Figure 4:
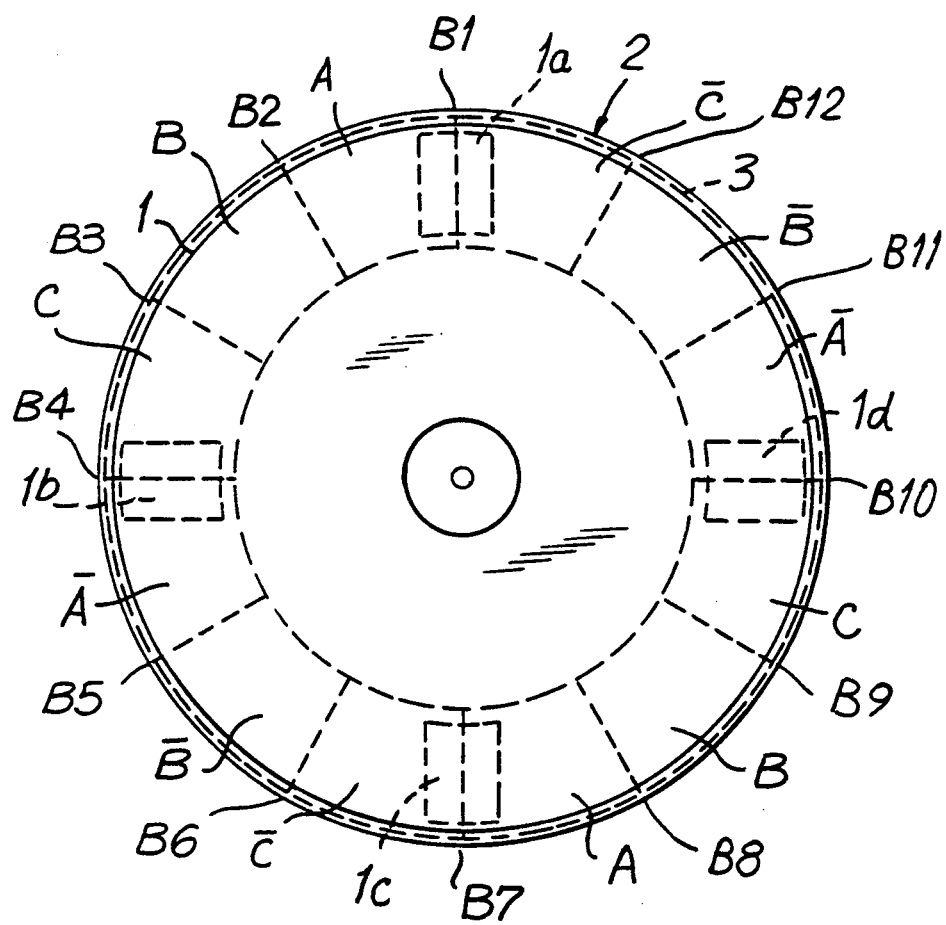
FIG. 4 is a plan view of the stator-rotor section of FIG. 3 in accordance with a first embodiment for this section of the motor.

FIG. 3 illustrates some of the components of an ultrasonic step motor of the rotary-type in accordance with the invention. FIG. 4 illustrates a plan view of the rotor-stator section of FIG. 3 in accordance with one embodiment of the invention. In FIGS. 3 and 4, stator 2 is supported by a round plate 4 and is fastened thereto by a screw 6. A ring-type bearing 5 rotatably guides rotor 1. A pinion 7 is press fit within rotor 1 and is rotatably supported within ring-type bearing 5. Pinion 7 reduces the torque (i.e. turning force) of rotor 1. A pair of lead wires 8 applies a voltage (e.g. driving voltage $104a$) to an electrode pattern $3a$ of piezoelectric unit 3.

Figure 5:
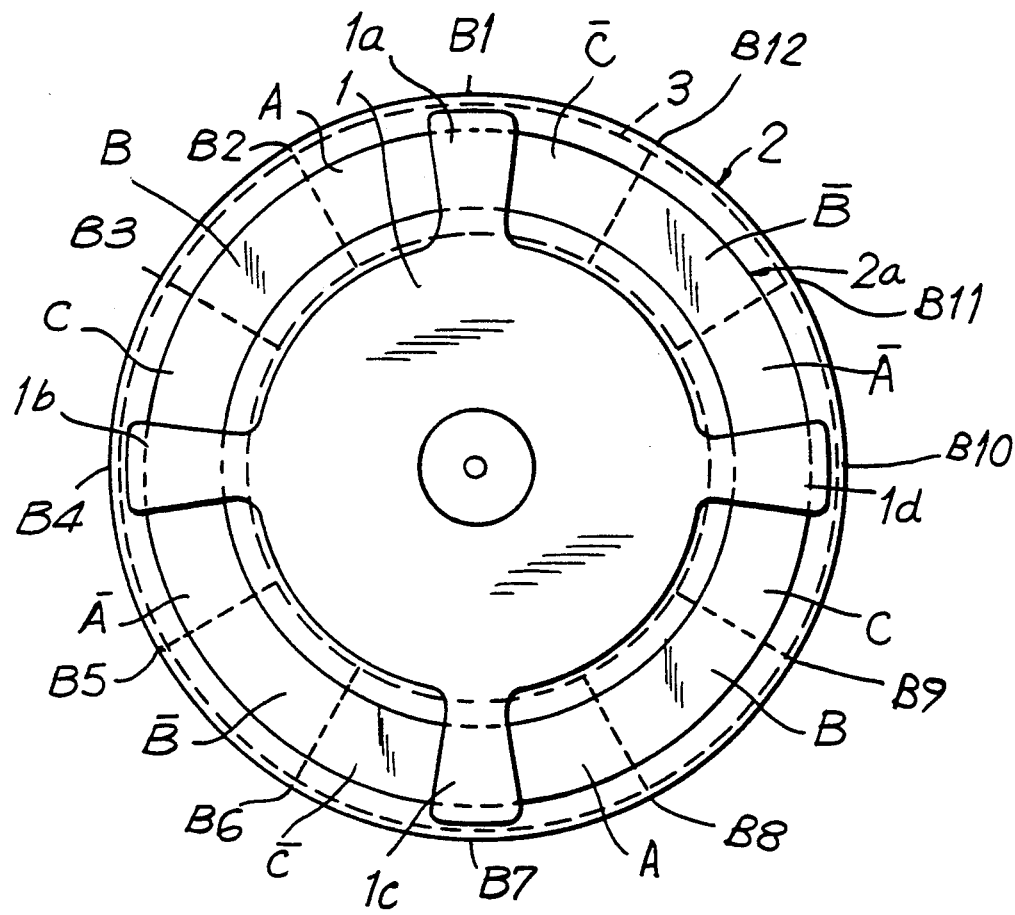
FIG. 5 is a plan view of the stator-rotor section of FIG. 3 in accordance with an alternative embodiment for this section of the motor.

FIG. 5 is a plan view of an ultrasonic step motor of the rotary-type in accordance with an alternative embodiment of the invention. A projection $2a$ of stator 2 is formed along the entire circumference of stator 2 and extends towards rotor 1. Projections 1a and 1c and are formed diametrically opposite to one another on rotor 1. Similarly, projections 1b and 1d are formed diametrically opposite to one another on rotor 1.

FIGS. 4 and 5 illustrate, for explanatory purposes only, four different positions where rotor 1 contacts stator 2 (i.e. where stator 2 contacts projections 1a, 1b, 1c and 1d). In each of these figures, piezoelectric unit 3 includes 12 vibrators denoted by the broken lines. These 12 vibrators, which can be in different vibratory phases from each other, are identified by references letters A, B, C, $\overline{A}$, $\overline{B}$ and $\overline{C}$. Drive voltages applied to these vibrators are identified by the same reference letter. Each drive voltage is in phase with the vibrator to which it is applied. The positions forming the nodes of various vibration modes are sequentially designated by vibrator nodes B1-B12. Four stator nodes N can be formed at any instant in time. Nodes N can be produced at twelve different positions along the circumference of stator 2 (i.e., B1-B12).

FIGS. 6a-6g diagrammatically illustrate a plurality of vibrator modes B1-B7, respectively, of an ultrasonic step motor employing the stator-rotor assembly of FIG. 5. The broken lines in FIGS. 6a-6g represent the vibration mode and phase conditions of voltages applied to the respective vibrators with the polarity of the applied voltage designated by plus (+) or minus (−) signs.

In vibration mode B1, vibrators A, B, C and $\overline{A}$, $\overline{B}$ and $\overline{C}$ form two separate groups. These two groups vibrate 180° out of phase with each other with projections 1a, 1b, 1c and 1d of rotor 1 in the positions shown.

In vibration mode of B2, vibrators B, C and $\overline{A}$, $\overline{B}$, $\overline{C}$ and A form separate groups, whereas vibrators C, $\overline{A}$ and $\overline{B}$, and $\overline{C}$, A and B form separate groups in vibration mode B3. The grouping of these vibrators repeats itself in the same cycle as discussed above beginning with vibration mode B3 through vibration mode B7 so as to move rotor 1 in a stepwise manner from left to right as successively shown in FIGS. 6(a)-6(g). One complete rotation of the rotary-type motor of FIG. 5 is completed in 12 steps (i.e. vibration modes $B_1$-$B_{12}$). By reversing the order of the vibration modes beginning with vibration mode B12, (i.e., B12, B11, ... B1) rotor 1 moves in a direction from right to left as successively shown in FIGS. 6g-6a.

In accordance with an alternative embodiment of the invention, a surface-wave driving type stepping-motor can be easily constructed as a linear motor to provide the rotary movement of FIGS. 6a-6g.

FIG. 7 is a timing chart of the phase relationship for the driving voltages (also referred to as driving signals) applied to the vibrators for producing the vibration modes shown in FIGS. 6a-6g. To produce the vibration mode of B1, a positive (+) phase driving voltage is applied to vibrators A, B and C and a negative (−) phase driving voltage is applied to vibrators $\overline{A}$, $\overline{B}$ and $\overline{C}$. When the driving voltage is zero ("0"), no voltage is applied to a vibrator. The phase of each driving voltage applied to vibrators A, B, C, $\overline{A}$, $\overline{B}$ and $\overline{C}$ is controlled by control circuit 103. When oscillating signal $105a$ from oscillation circuit 105 has a positive phase, the oppositely phased inverting signal $106a$ from phase inverting circuit 106 has a negative phase. Switching between oscillating signal 105a and inverting signal 106a is controlled by the timing of phase control signal 102a of frequency divider circuit 102.

In accordance with this embodiment of invention, six different kinds of drive control signals 103a can be used for the six vibrators A, B, C, $\overline{A}$, $\overline{B}$ and $\overline{C}$. An opposite polarity relationship, however, exists between vibrators A and $\overline{A}$, B and $\overline{B}$, C and $\overline{C}$. Therefore, by reversing the polarity of three drive control signals 103a (e.g. associated with vibrators A, B, C) only three different kinds of drive control signals 103a are required.

FIG. 8 is a timing chart of driving voltages 104a applied to vibrators A and B. During vibration modes B1 and B3, driving voltages 104a applied to vibrators A and B are in phase with each other. During vibration mode B2, driving voltages 104a applied to vibrators A and B are 180° out of phase with each other. Driving voltages 104a are preferably sinusoidal waves at frequencies substantially the same as, if not identical to, the resonant frequency of stator 2 and vibrating unit 3.

As can be readily appreciated, the driving voltages 104a can be applied to respective vibrators based on suitable switching at a predetermined phase pattern to provide a step motor in which 12 steps are required for rotor 1 to complete one revolution.

Figure 9:
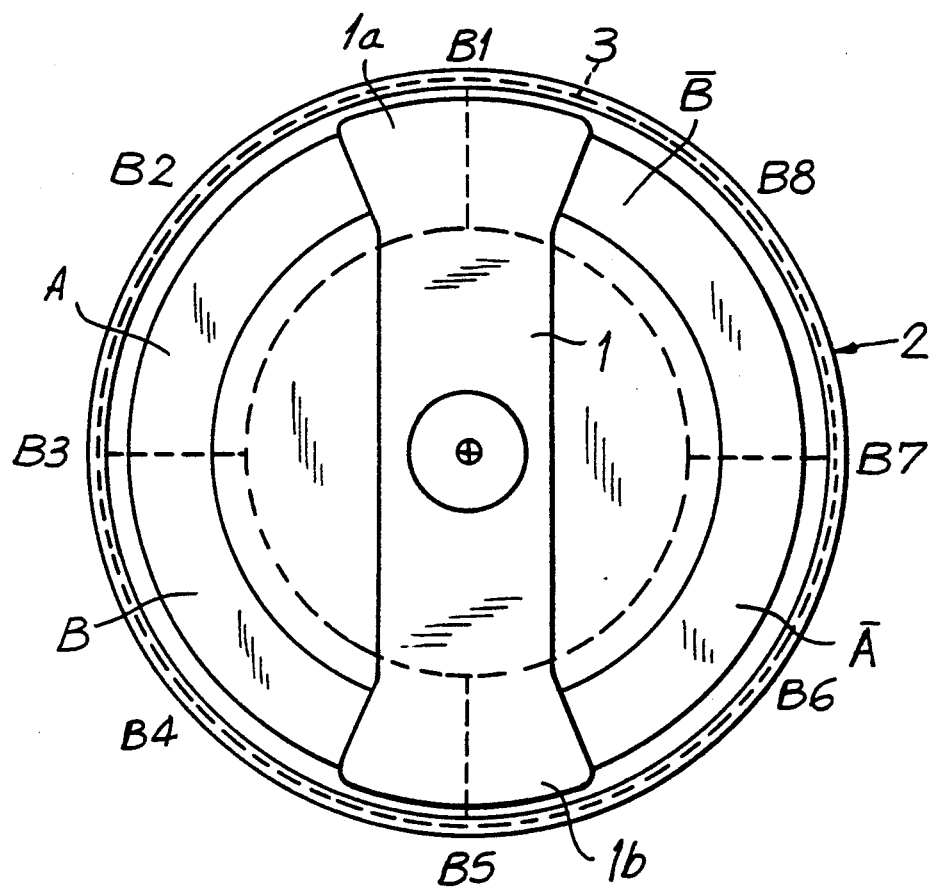
FIG. 9 is a plan view of the stator-rotor section in accordance with another alternative embodiment for this section of the motor.

FIG. 9 is a plan view of the stator-rotor portion of an ultrasonic step motor in accordance with an alternative embodiment of the invention. Piezoelectric unit 3 includes vibrators A, $\overline{A}$, B $\overline{B}$. Rotor 1 and stator 2 contact each other at only two positions, that is, stator 2 contacts rotor 1 at projections 1a and 1b. There are only two stator nodes N existing at any instant in time and only eight positions along the circumference of stator 2 where nodes N can be produced.

FIGS. 10a-10h diagrammatically illustrate a plurality of vibration modes B1-B8 and the corresponding positional relationship of projections 1a and 1b. FIG. 11 is a timing chart of the phase relationship between driving voltages 104a required to produce the vibration modes of FIG. 10. In FIG. 11, the positive (+) and negative (−) signs represent opposite phase conditions and a zero (0) represents the condition where no driving voltage 104a is applied to a vibrator. In accordance with this embodiment of the invention, an ultrasonic step motor having 8 divisions/steps (i.e., ⅛ step movement) is required per revolution. FIG. 12 is a timing chart of driving voltages 104a applied to vibrators A and B for driving vibration modes B1-B4.

It is to be understood that while the foregoing embodiments have been described based on a rotary type step motor, in accordance with the invention, other suitable constructions, vibration modes, vibrators and the like can be employed provided that the projections of the rotor shift (move relative to and) towards the nearest corresponding vibratory nodes of the stator and provided that the vibrators are driven so that the position of the vibratory nodes of the stator are successively changed so as to move the rotor in a stepwise manner.

Oscillation circuit 105 also can be modified so as to use the output of crystal oscillator circuit 101. Alternatively, oscillation circuit 105 can be a self-oscillation type circuit which detects vibrations of vibrating unit 107 so as to resonate unit 107 under optimum conditions. Phase control signal 102a also need not be based on output signal 101a of quartz plate 100.

After rotor 1 of the ultrasonic step motor has been moved by one or more steps to a new position, a frictional force between rotor 1 and stator 2 exists so that rotor 1 is maintained at its new position after application of driving voltages 104a to piezoelectric unit 3 has been interrupted.

Having now completed an overview of the general operating principles in accordance with the invention, specific embodiments of the drive control unit for an ultrasonic step motor will now be discussed.

Figure 13:
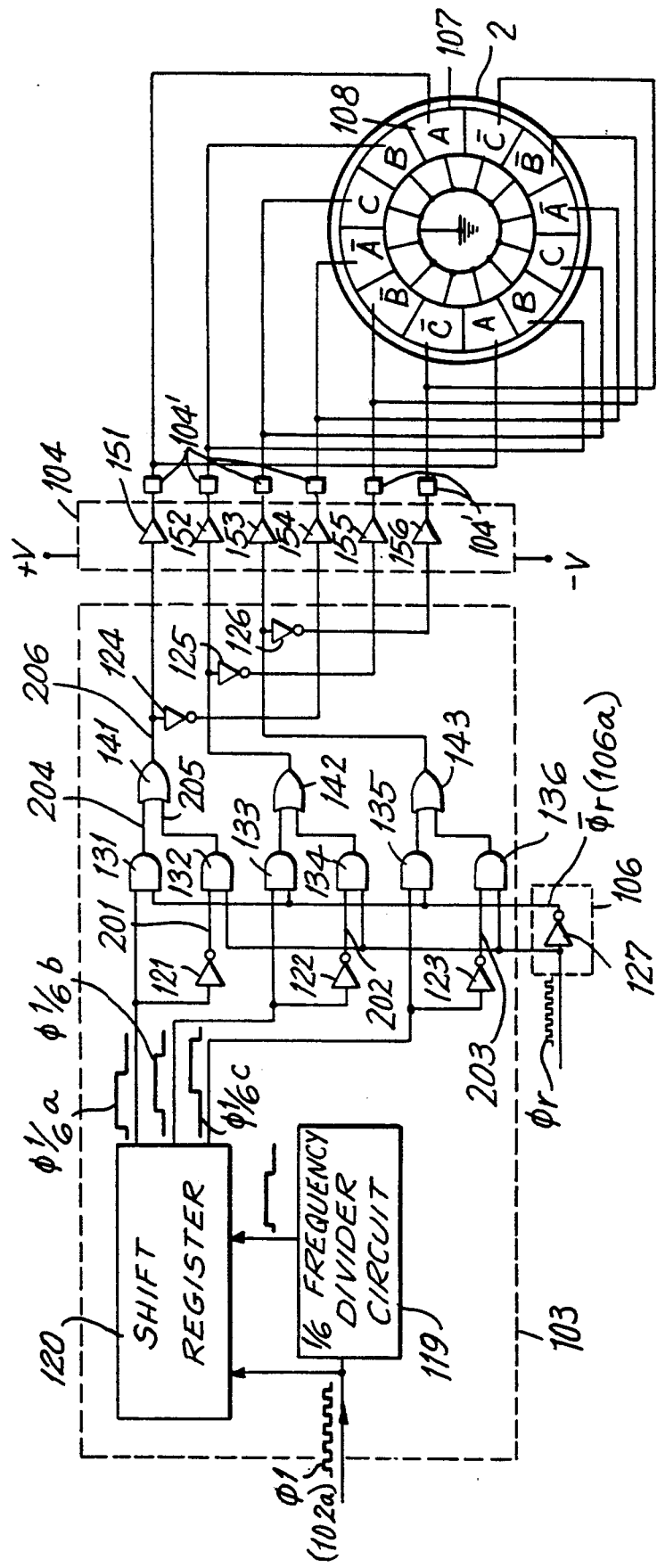
FIG. 13 is a combination block and circuit diagram for the drive control unit of FIG. 1 in accordance with another embodiment of the invention.

FIG. 13 is a combination block and circuit diagram of a drive control unit for an ultrasonic step motor in accordance with one embodiment of the invention. The drive control device includes control circuit 103 having a 1/6 frequency divider circuit 119, a shift register 120, inverters 121, 122, 123, 124, 125 and 126, AND gates 131, 132, 134, 135 and 136 and OR gates 141, 142 and 143. Phase inverting circuit 106 includes an inverter 127. Driver 104 includes buffers 151, 152, 153, 154, 155 and 156. Each of the buffers is supplied with a positive-polarity supply voltage +V and a negative-polarity supply voltage −V to generate driving voltages which oscillate between the positive and negative polarities. Vibrating unit 107 is attached to a stator 102 and includes a plurality of vibrators 108. Each vibrator 108 has two terminals. The first terminal of each vibrator 108 receives a drive voltage from a corresponding one of buffers 151, 152, 153, 154, 155 and 156. The second terminal of each vibrator 108 is connected in common to ground.

This drive control device of FIG. 13 produces a single step (30°) per second for driving an ultrasonic step motor having a 2λ vibration mode of 12-divisions/steps per revolution.

Although not shown in FIG. 13, crystal oscillator circuit 101 and frequency divider circuit 102 of FIG. 1 are used to provide phase control signal 102a to frequency divider circuit 119 and shift register 120. The crystal oscillator circuit and frequency divider circuit found in a conventional electronic watch can be used for crystal oscillator circuit 101 and frequency divider circuit 102, respectively. Oscillation circuit 105 can include, for example, a CR oscillation circuit or self-excited oscillation circuit.

Figure 14:
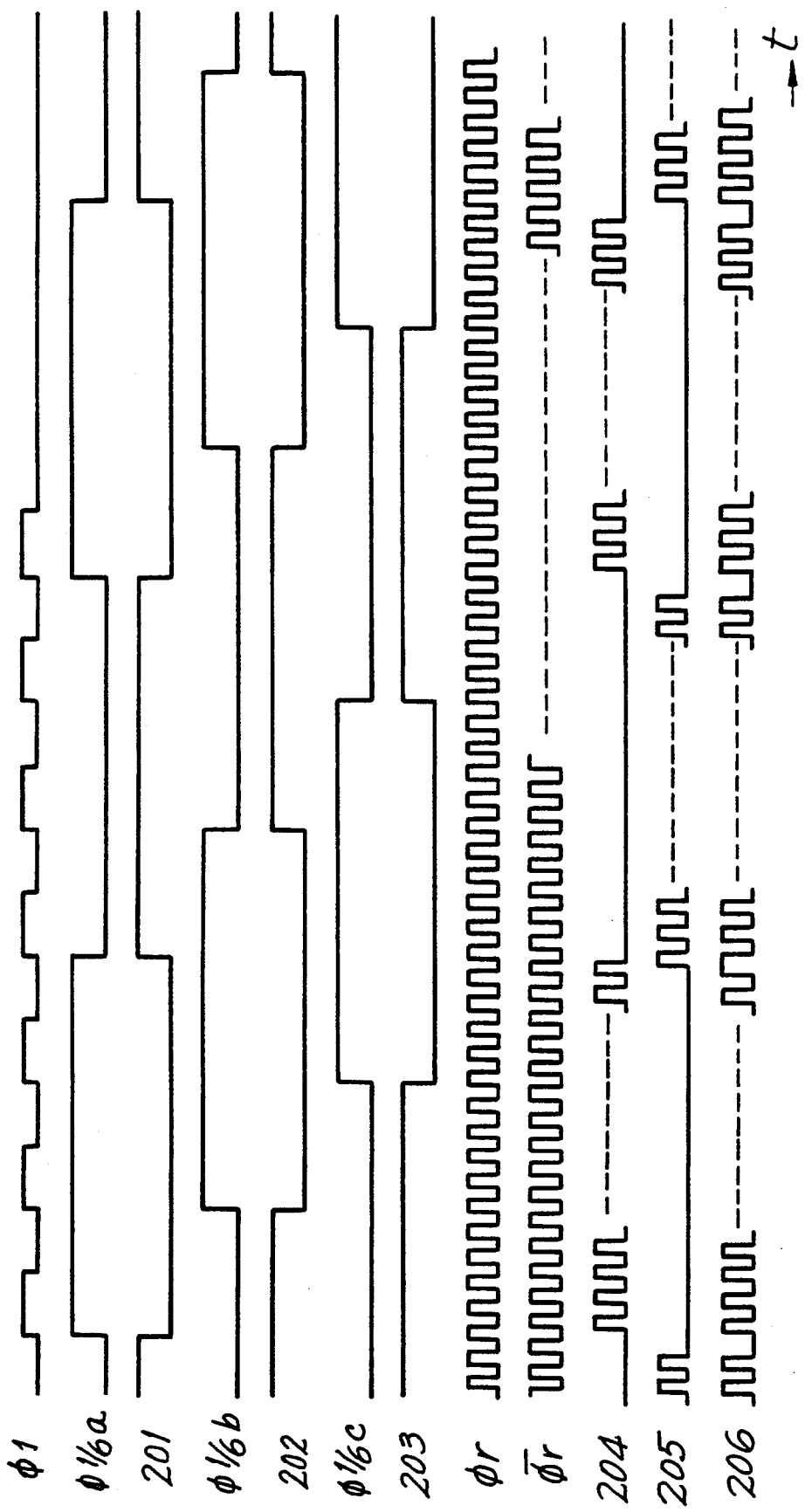
FIG. 14 is a timing chart of various signals supplied to and produced by the drive control unit of FIG. 13.

Referring now to FIGS. 13 and 14, when a 1 Hz control signal $\phi 1$ (i.e. signal 102a) from frequency divider circuit 102 is applied to frequency divider circuit 119 and shift register 120, 1/6 frequency divider circuit 119 carries out 1/6 frequency division to control signal $\phi 1$ and supplies the frequency divider control signal $\phi 1$ to shift register 120. Shift register 120 generates 1/6 Hz signals $\phi 1/6a$, $\phi 1/6b$ and $\phi 1/6c$ which are shifted in phase by 1 second from each another and which are each reversed in phase at 3 second intervals.

Signal $\phi 1/6a$ is applied an input signal to AND gate 131 and is also inverted by inverter 121 producing an inverted signal 201. Inverted signal 201 is supplied as an input signal to AND gate 132. The output signal $\overline{\phi}r$ (i.e. signal 106a) of phase inverting circuit 106 is applied as an input signal to AND gate 131. Oscillation signal $\phi r$ (i.e. signal 105a) from oscillation circuit 105 is applied as an input signal to AND gate 132. AND gate 131 generates an output signal 204 representing the logical products of signal $\phi 1/6a$ and output signal $\overline{\phi}r$. AND gate 132 generates an output signal 205 representing the logical product of inverted signal 201 of signal $\phi 1/6a$ and oscillation signal $\phi r$. Output signals 204 and 205 are supplied to buffer 151 through OR gate 141 and to buffer 154 through inverter 124.

The operations of control circuit 103, driver 104 and phase inverting circuit 106 based on signals φ1/6b and φ1/6c are substantially the same as discussed above with respect to signal φ1/6a so that after a pair of inverted signals 202 and 203 have been obtained, the signals are processed in the same manner as signal 201. The resulting drive control signals (i.e. 103a) applied to buffers 152, 155 and to 153, 156 are respectively shifted successively by 1 second from the drive control signals applied to buffers 151, 154. Driver 104 produces 6 different driving voltages. Each of the buffers applies to a corresponding pair of vibrators 108 at the same time driving voltages which oscillate between the positive and negative-polarity voltages at the same frequency as the frequency of oscillation signal φr. Each set of three vibrators 108 are driven simultaneously at the same phase (i.e. positive or negative polarity) or opposite phase (i.e. positive and negative polarity) with each other. A flexure mode of stator 2 results. Stator 2 vibrates so as to form a standing wave of 2λ. The stator vibrations drive rotor 1 in a stepwise manner.

Preferably, driving voltages 104a are sinusoidal waves which requires a filter circuit 104' for passing the frequency components of oscillation signal φr and $\overline{φr}$. Filter circuit 104' receives the driving voltages 104a which convert pulses of driving voltages 104a into sinusoidal waves.

The drive control unit of FIG. 13 produces sinusoidal voltages of a frequency equal to the resonant frequency of vibrators 108 and stator 2 which are applied to vibrators 108. The positive-polarity and negative-polarity driving voltages are successively applied to vibrators 108 in accordance with a desired phase pattern. Rotor 1 moves in a step-like manner in accordance with this phase pattern. The sinusoidal voltages of the same frequency as the resonant frequency of vibrators 108 and stator 2 result in efficient vibration of vibrators 108 and status 2.

Figure 15:
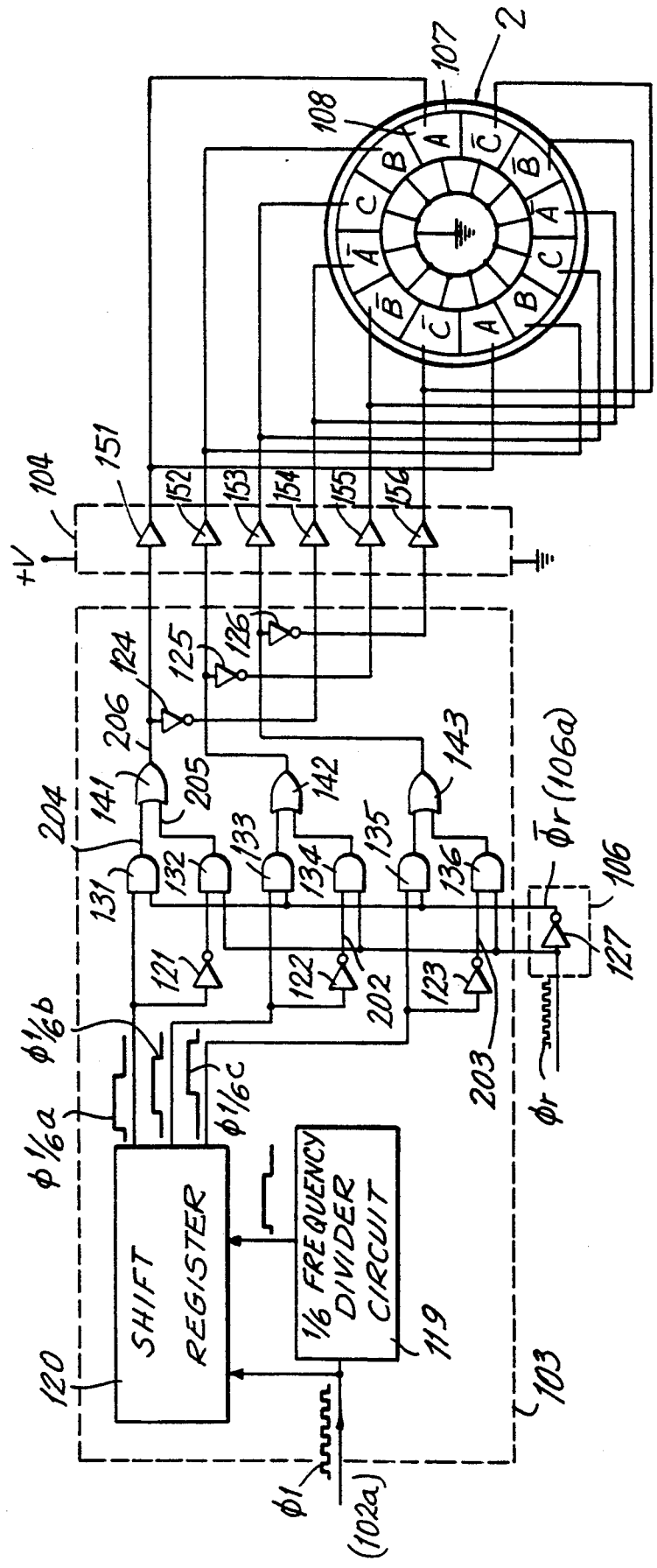
FIGS. 15-17 are combination block and circuit diagrams for the drive control unit of FIG. 1 in accordance with alternative embodiments of the invention.

FIG. 15 is a block and circuit diagram of a drive control unit for an ultrasonic step motor in accordance with another embodiment of the invention. FIG. 15 differs from FIG. 13 in that only the positive-polarity voltage (+V) is supplied to driver 104. The negative electrode of driver 104 is grounded instead of at a potential of −V. The drive control circuit of FIG. 15 is well suited for operation under no-load or light-load conditions and requires only a single power source. Driving signals 104a of the drive control unit of FIG. 15 are at approximately one-half the power level of driving signals 104a of the drive control unit of FIG. 13. If desired, a negative-polarity supply voltage (−V) can be used in place of positive-polarity supply voltage (+V) in FIG. 15.

Figure 16:
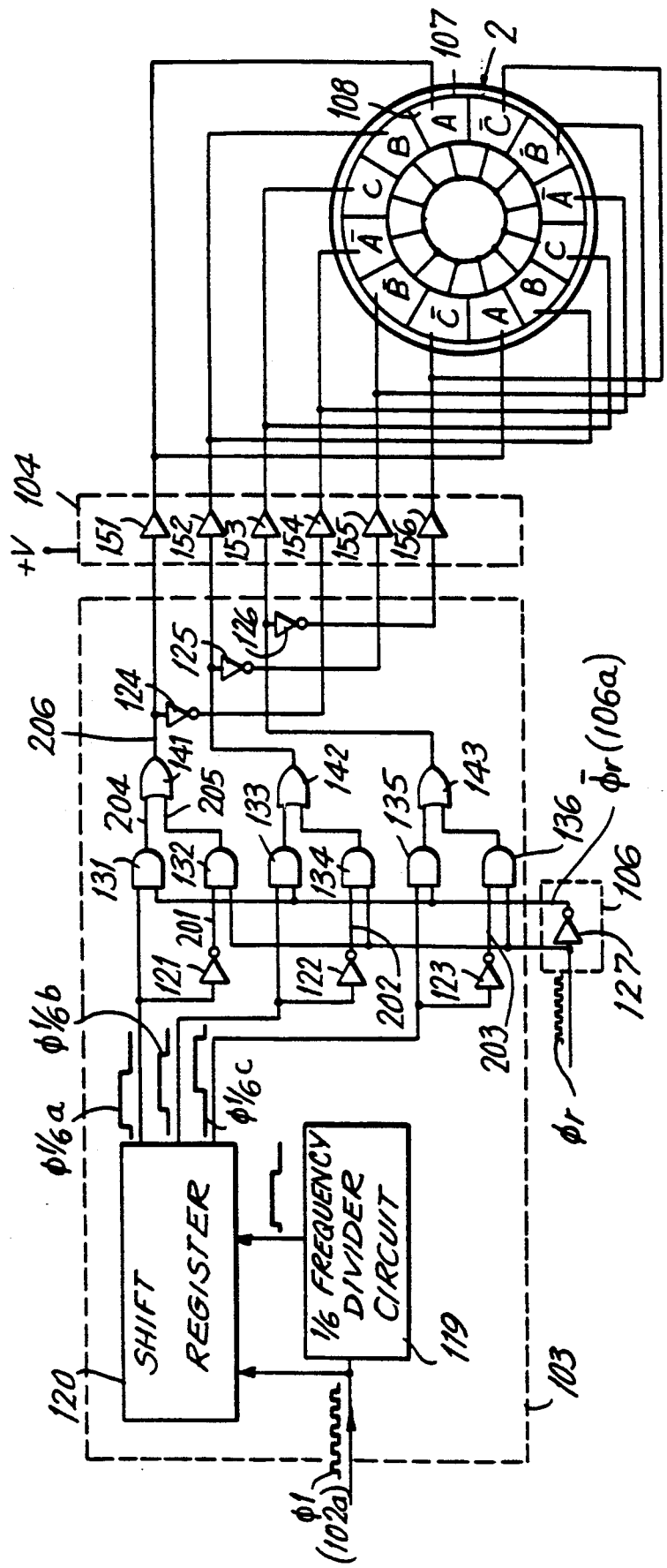

FIG. 16 illustrates a drive control unit for an ultrasonic step motor in accordance with another alternative embodiment of the invention. This embodiment differs from the drive control unit of FIG. 15 in that driver 104 and vibrators 108 are not grounded. As a result, vibrators 108 (e.g. A and $\overline{A}$) are connected in series. The level of the driving voltage applied to each vibrator 108 is therefore reduced by one half as compared with the level of the driving voltage applied to each vibrator 108 of FIG. 15. A 50% reduction in power consumption as compared to the drive control unit of FIG. 15 is achieved.

Construction of the drive control circuitry is complicated when grounding structure is required such as where stator 2 and ground plate 4, as shown in FIG. 3, are made from nonconductive materials. In contrast thereto, since there is no need to ground vibrators 108 in the drive control unit of FIG. 16, construction of the drive control circuitry can be simplified. It is also possible to use a negative-polarity supply voltage in place of the positive-polarity supply voltage in the drive control unit of FIG. 16.

By providing either a positive-polarity or negativepolarity supply voltage with vibrators 108 connected in series in accordance with a desired phase pattern and connecting the other terminal of each vibrator 108 to an ungrounded common, construction of the drive control unit is simplified.

Figure 17:
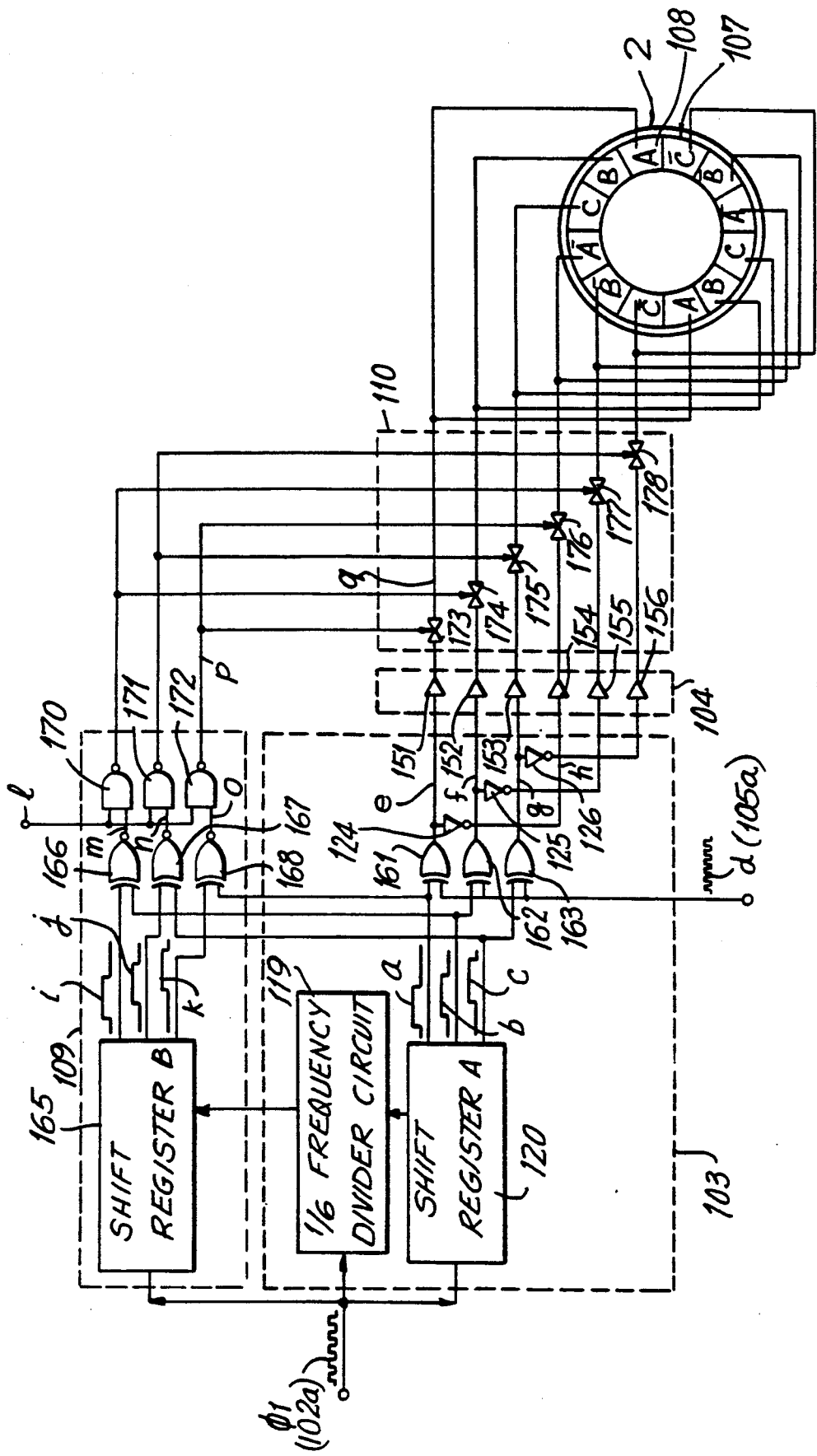

FIG. 17 shows a drive control device for a surface-wave driven stepping motor in accordance with another alternative embodiment of the invention. Control circuit 103 includes 1/6 frequency divider circuit 119, shift register 120, inverters 124, 125 and 126 and a plurality of exclusive OR circuits 161, 162 and 163. Driver 104 includes buffers 151-156. Each buffer is supplied with a positive-polarity supply voltage +V and a negative-polarity supply voltage −V so as to output a drive voltage which oscillates between the positive and negative polarities. Vibrating unit 107 is connected to stator 2 and includes the plurality of vibrators 108. A gate control circuit 109 includes a shift register 165, a plurality of exclusive NOR circuits 166, 167 and 168 and a plurality of NAND gates 170, 171 and 172. A gate circuit 110 includes a plurality of transmission gates 173-178 which are subject to on/off control by gate control signals from gate control circuit 109.

The circuitry of FIG. 17 provides single step (30°) per second driving of the ultrasonic step motor having a 2λ vibration mode of 12-division/steps per revolution.

Figure 18:
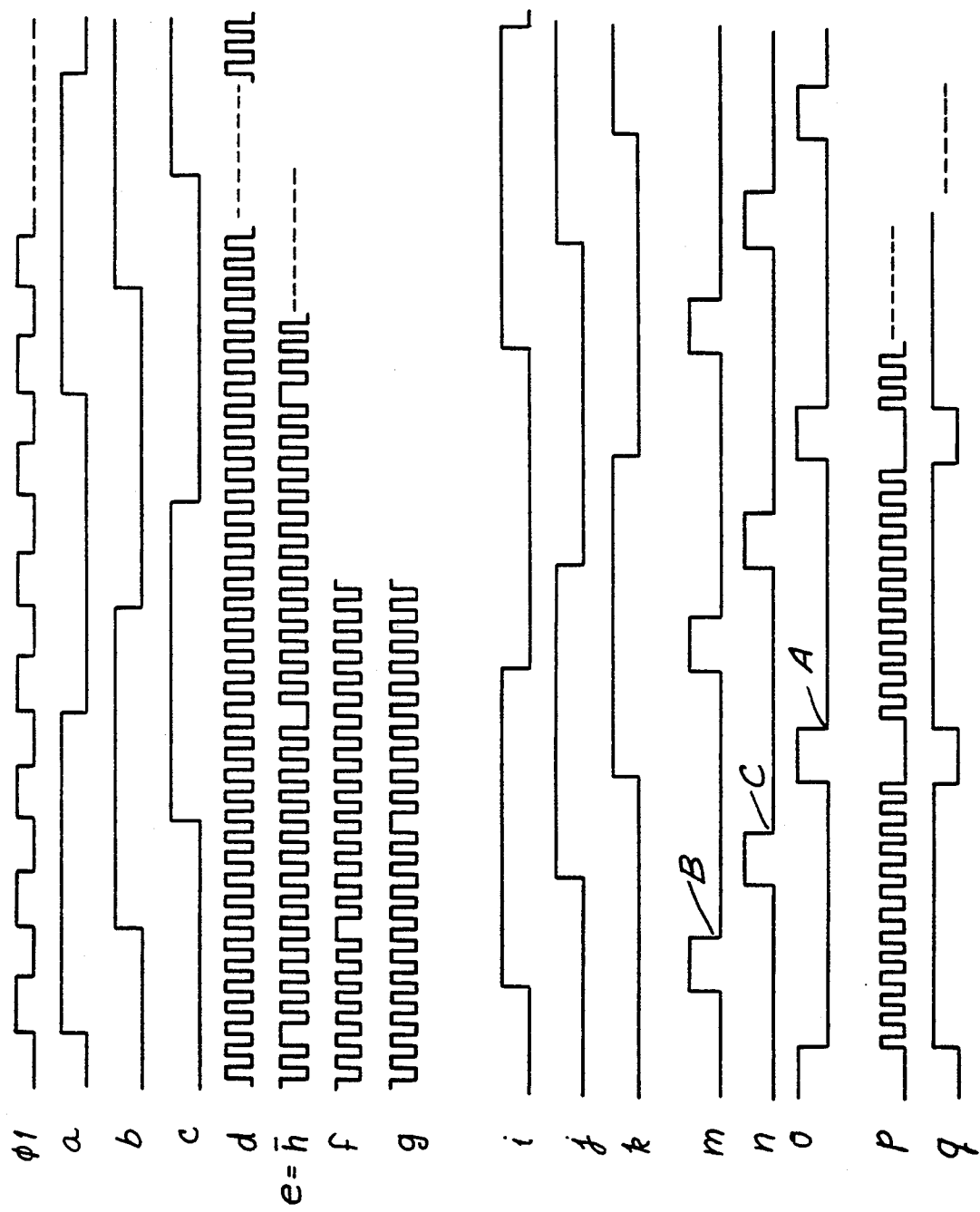
FIG. 18 is a timing chart of various signals supplied to and produced by the drive control unit of FIG. 17.

FIG. 18 is a timing chart showing the operation of the drive control device for FIG. 17. A 1 Hz control signal φ1 provided by frequency divider circuit 102 of FIG. 1 is applied to 1/6 frequency divider circuit 119 and shift registers 120 and 165. Signal φ1 following 1/6 frequency division by 1/6 frequency divider circuit 119 is supplied to the shift registers 120 and 165. Shift register 120 generates 1/6 Hz signals a, b, and c which are sequentially phase shifted by 1 second from each other. Signals a, b and c are each inverted in phase every 3 seconds.

Signal a is applied, along with an oscillation signal d, (i.e. oscillation signal 105a) to exclusive OR circuit 161. An output signal e of circuit 161 is applied to buffer 151 of driver 104 and is also inverted by inverter 124. An inverted signal h, is applied to the buffer 154. Signals b and c are provided as inputs to exclusive OR circuits 162 and 163, respectively. Oscillation signal d is also provided as an input to exclusive OR circuits 162 and 163. A pair of outputs f and g produced by circuits 162 and 163 are applied to inverters 125 and 126, respectively. Signals f and g are applied to buffers 152 and 153 of driver 104, respectively. Signals f and g following inversion by inverters 125 and 126 are applied to buffers 155 and 156, respectively. When gate circuit 110 is open, the drive voltages from driver 104 are sequentially applied to vibrators 108. Step movement of rotor 1 results based on the changes in phase of the drive voltages.

In gate control circuit 109 shift register 165 generates signals i, j, and k which are similar to but delayed in phase by 1 second from signals a, b and c of shift register 120, respectively. Output signals i and b serve as inputs to exclusive NOR circuit 166. Output signal m of circuit 166 and a step switching signal λ serve as inputs to NAND gate 170. Output signals j and c serve as inputs to exclusive NOR circuit 167. Output signals k and a serve as inputs to exclusive NOR circuit 168. Step switching signal λ serves as an input to NOR circuits 171 and 172. A pair of output signals n and o of circuits 167 and 168 are inputted to NOR circuits 171 and 172, respectively. When step switching signal λ is at an L logic level, the gate control signals from NAND gates 170, 171 and 172 are held at a high (H) logic level so that the drive voltages from driver 104 are applied to vibrators 108 causing a one-step driving.

When step switching signal λ assumes a low (L) logic level, NAND gates 170, 171 and 172 invert signals m, n and o of exclusive NOR circuits 166, 167 and 168, respectively. NAND gate 172 receives output signal o of exclusive NOR circuit 168 and step switching signal λ (at a H logic level) to perform NAND logic operation thereon. A gate control signal p is supplied to transmission gate 173. When control signal p turns transmission gate 173 OFF an output signal q of transmission gate 173 is too low (i.e. for ½ second) to cause vibrators A to vibrate. In other words, a time interval exists during which no drive voltage is applied to the pair of vibrators A. Vibrators $\overline{A}$, B, $\overline{B}$, C and $\overline{C}$ have similar time intervals when no driving voltage is applied. The driving voltages applied sequentially to vibrators A, B, C, $\overline{A}$, $\overline{B}$ and $\overline{C}$ are shifted by one second from the previously applied driving voltages in the same sequential order.

Figure 19:
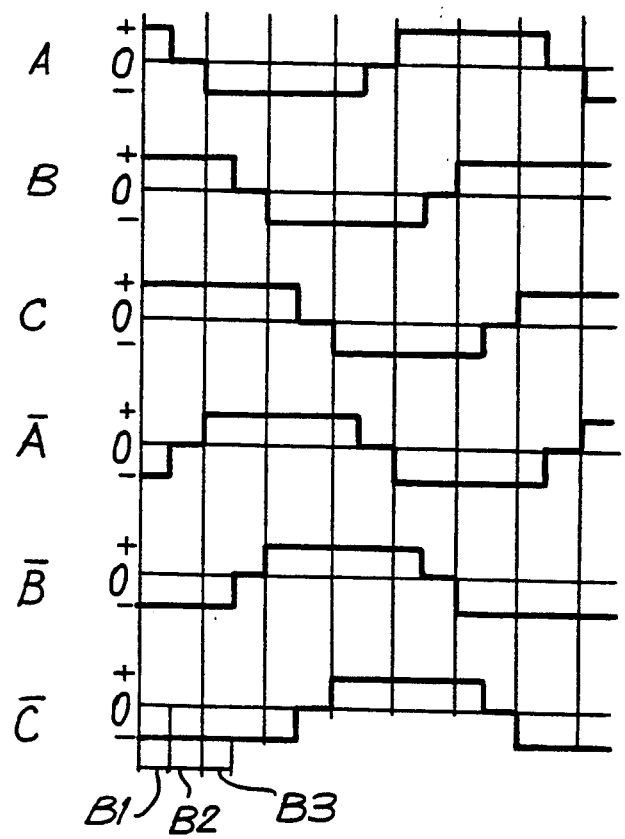
FIG. 19 is a timing chart of the phase relationships between the driving voltages produced by the drive control unit of FIG. 18.
Figure 20:
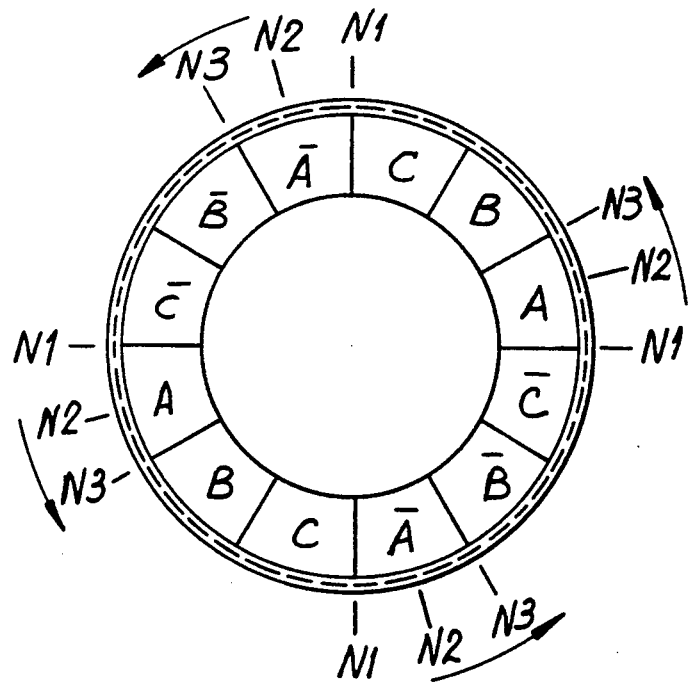
FIG. 20 is a diagrammatic plan view of the vibrators illustrating the nodal positions based on the timing chart of FIG. 19.

Referring now to FIGS. 19 and 20, operation of the drive control circuit of FIG. 17 is shown based on a timing chart showing the phase relationship between the driving voltages (FIG. 19) and the position of nodes N of stator 2 (FIG. 20).

In vibration mode B1, the driving voltage is applied to each of the vibrators. For one-step driving, a node N1 is produced between vibrators 108 when the drive voltages are of different phases. (e.g. vibrators C and $\overline{A}$ and vibrators $\overline{C}$ and A).

In vibration mode B2, no drive voltage is applied to vibrators A and $\overline{A}$. In the central portions of vibrators A and $\overline{A}$ nodes N2 are produced.

In vibration mode B3 the drive voltage is applied to each vibrator 108. Nodes N3 are produced between vibrators A and B and vibrators $\overline{A}$ and $\overline{B}$ for one-step driving. The position of nodes N from vibration mode B1 to B2 and from vibration mode B2 to B3 shifts by ½ step. Rotor 1 moves by a corresponding ½ step.

The drive control unit of FIG. 17, therefore provides driving voltages successively applied to vibrators 1908 in accordance with a given phase pattern. Application of the driving voltage to selected one of the plurality of vibrators 108 is also interrupted for a given period of time at intervals of one-half period (i.e., step). Accordingly, ½, 3/2, etc. step movement of rotor 1 are provided.

Figure 21:
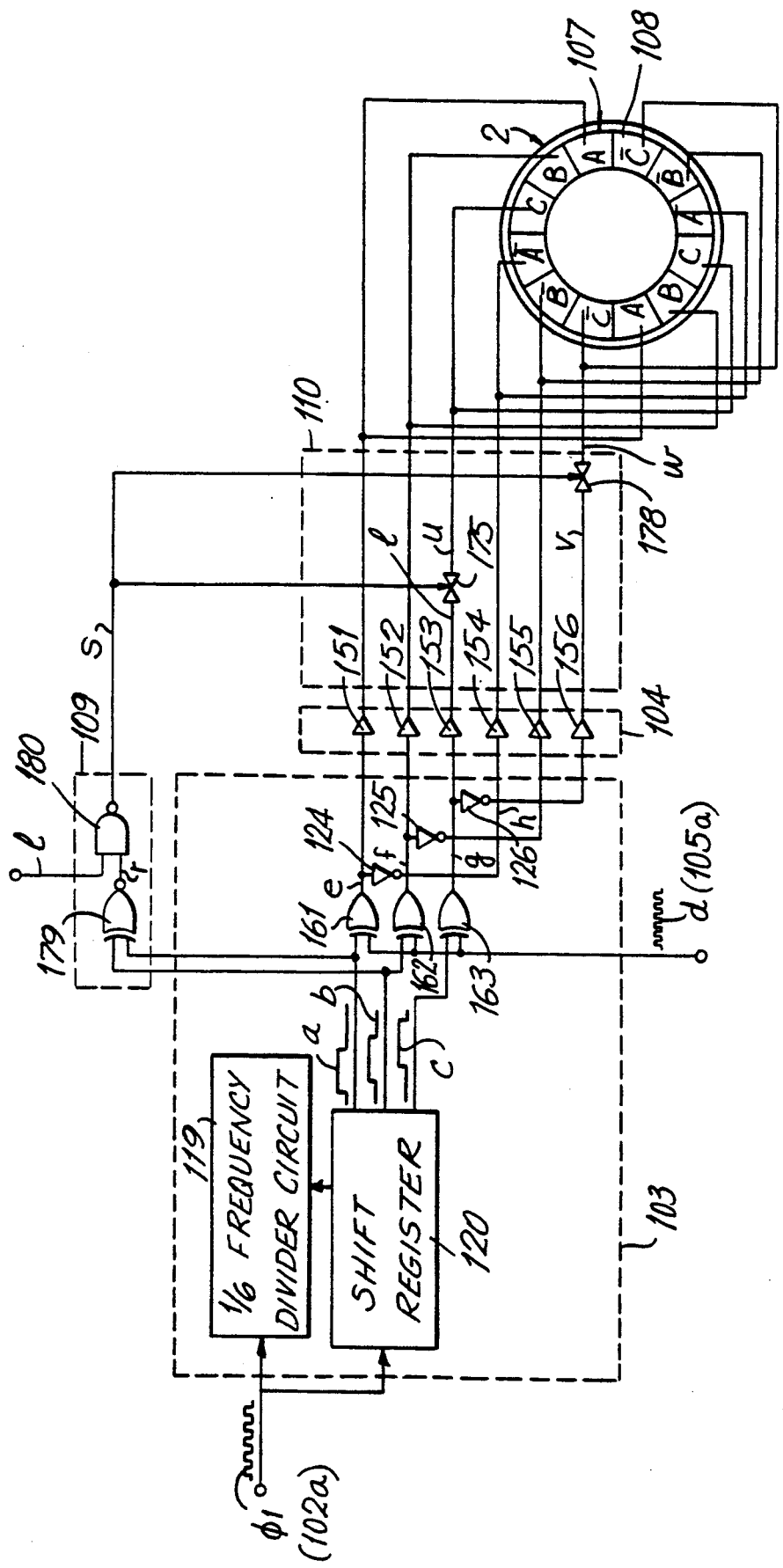
FIG. 21 is a combination block and circuit diagram of the drive control unit of FIG. 1 in accordance with another alternative embodiment of the invention.
Figure 22:
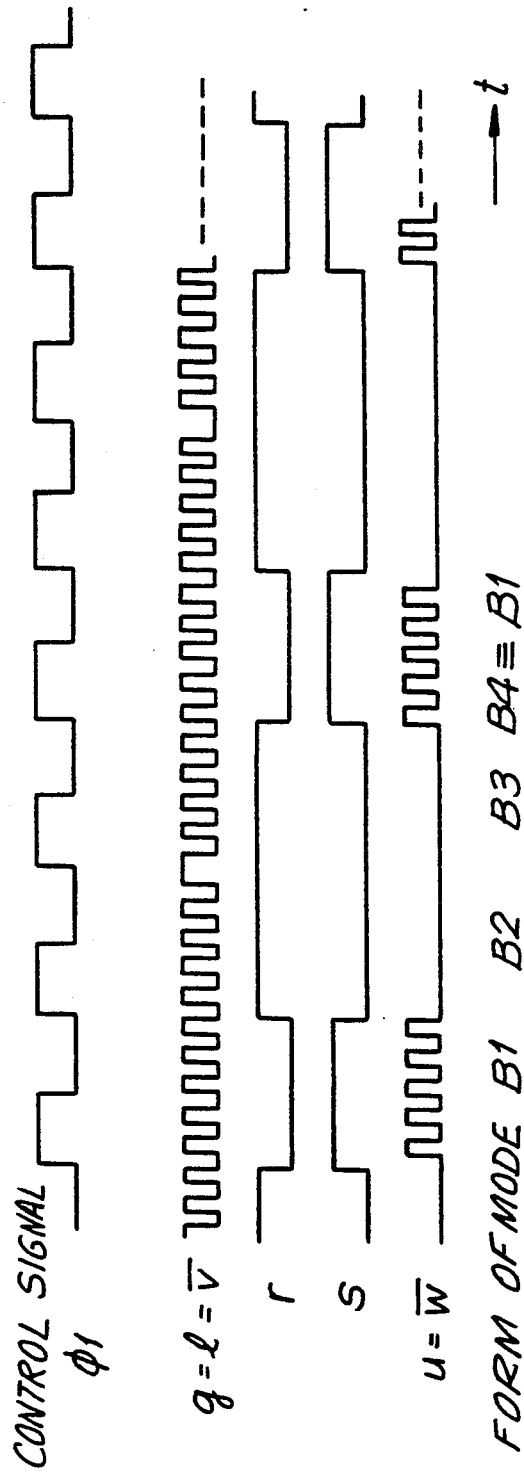
FIG. 22 is a timing chart of various signals supplied to and produced by the drive control unit of FIG. 21.

FIG. 21 illustrates a drive control unit in accordance with still another alternative embodiment of the invention in which a 3/2 step operation is provided Gate control circuit 109 now includes an exclusive NOR circuit 179 and a NAND gate 180. Gate circuit 110 includes transmission gates 175 and 178 for controlling application (i.e. turning ON/OFF) of the drive voltages to vibrators C and $\overline{C}$, respectively. FIG. 22 is a timing chart for the drive control unit of FIG. 21.

Signals a and b produced by shift register 120 are applied to exclusive NOR circuit 179 of gate control circuit 109. When step switching signal λ is at H logic level, NAND gate 180 inverts an output signal r from exclusive NOR circuit 179 producing an output signal s. The leading edge of signal s is in synchronism with signal a and has a pulse width of 1 second. A pair of drive voltages u and w passing through gates 175 and 178 are applied to vibrators C and $\overline{C}$, respectively.

Figure 23:
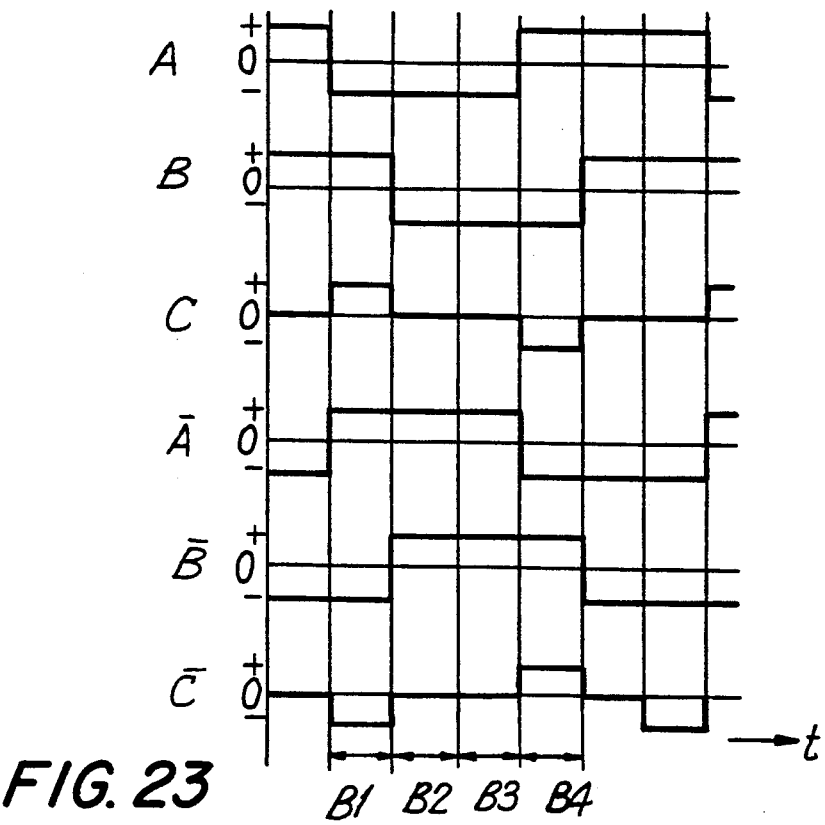
FIG. 23 is a timing chart of the phase relationships between the driving voltages produced by the drive control unit of FIG. 21.
Figure 24:
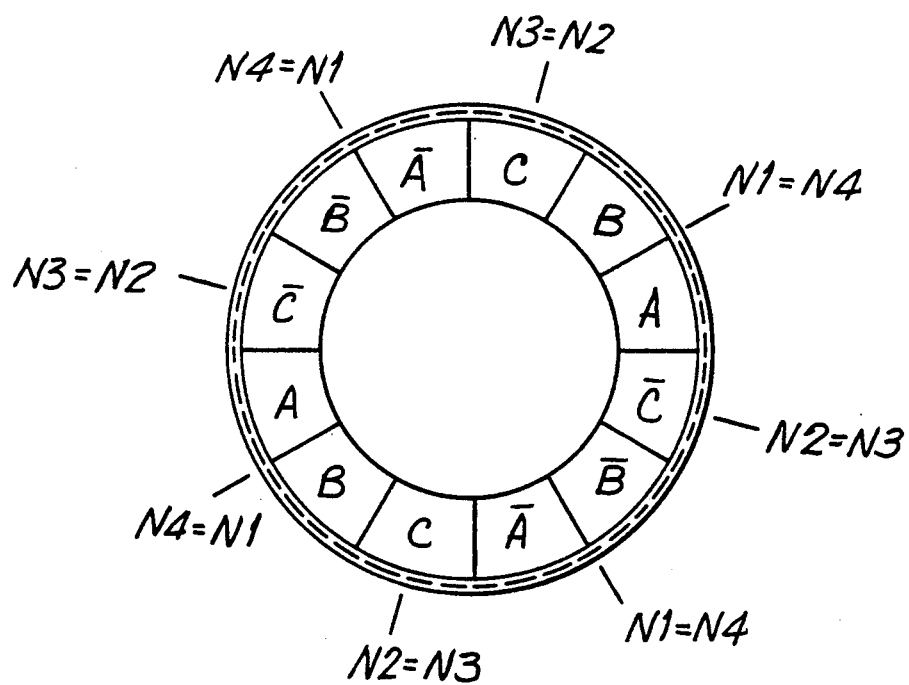
FIG. 24 is a diagrammatic view of the vibrators illustrating the nodal positions based on the timing chart of FIG. 23.

FIG. 23 is a timing chart showing the phase relationship between the driving voltages applied to vibrators 108. FIG. 24 shows the positions of nodes N based on FIG. 23.

In vibration mode B1, nodes N1 are produced between vibrators A and B and between vibrators $\overline{A}$ and $\overline{B}$. In the vibration mode B2, no drive voltage is applied to vibrators C and C. Therefore nodes N2 are produced in the central portions of vibrators C and $\overline{C}$. In vibration mode B3, no drive voltage is applied to vibrators C and $\overline{C}$ so that nodes N3 are also produced in the central portions of vibrators C and $\overline{C}$ (i.e., nodes N3 are in the same positions as nodes N2). In vibration mode B4, similar to vibration mode B1, the driving voltage is applied to each of the vibrators. Nodes N4 are produced between vibrators A and B between the vibrators $\overline{A}$ and $\overline{B}$. In like manner, successive nodes are produced.

The nodes produced by the drive control unit of FIG. 21 are at intervals of 3/2 step. Rotor 1 moves in response to the shifting of nodes N, that is, rotor 1 is driven in 3/2 steps.

Figure 25:
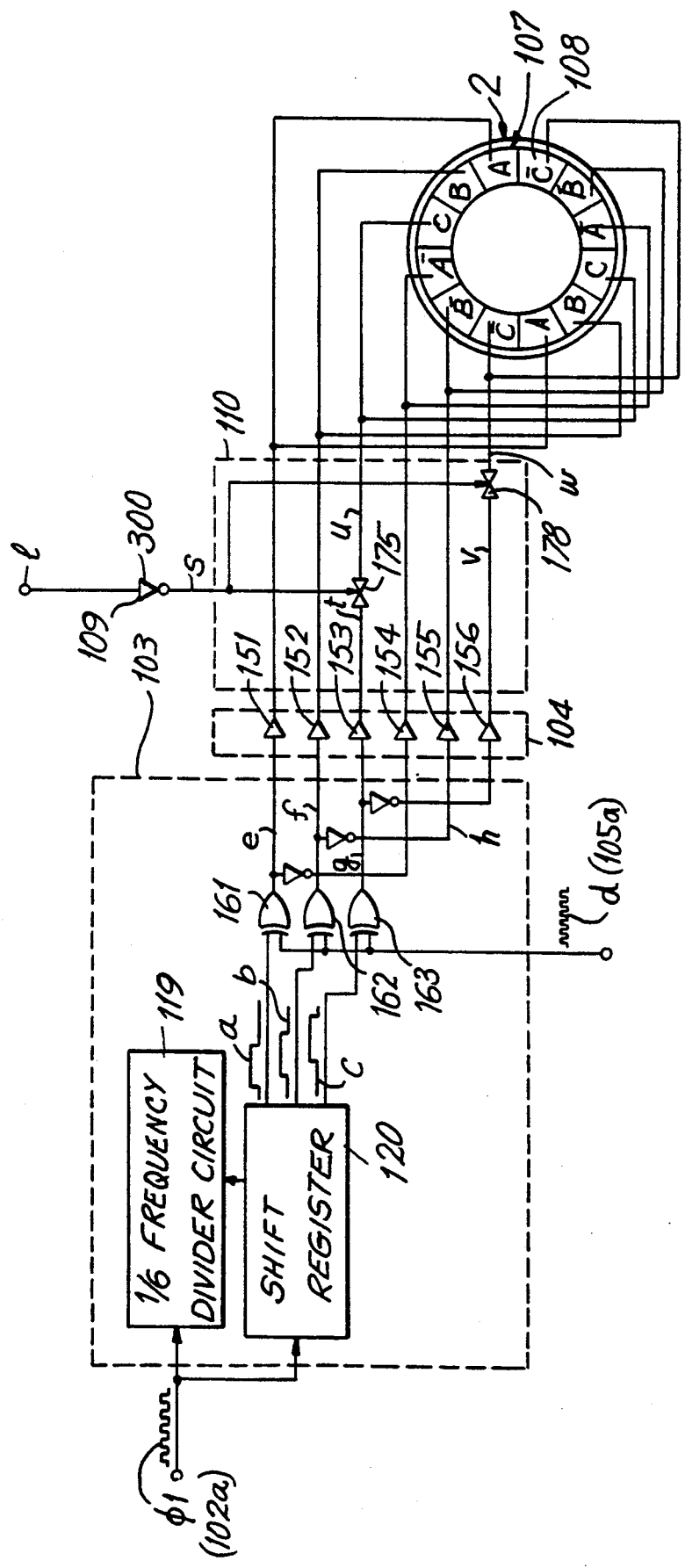
FIG. 25 is a combination block and circuit diagram of the drive control unit of FIG. 1 in accordance with another alternative embodiment of the invention.

FIG. 25 illustrates a drive control unit in accordance with still another alternative embodiment of the invention in which no drive voltage is applied to vibrators C and $\overline{C}$ in achieving a 3/2-step driving. Gate control circuit 109 includes an inverter 300. When step switching signal λ is at a H logic level, the output of inverter 300 goes to a L logic level. Transmission gates 175 and 178 are closed preventing application of drive voltages to vibrators C and C, respectively.

Figure 26:
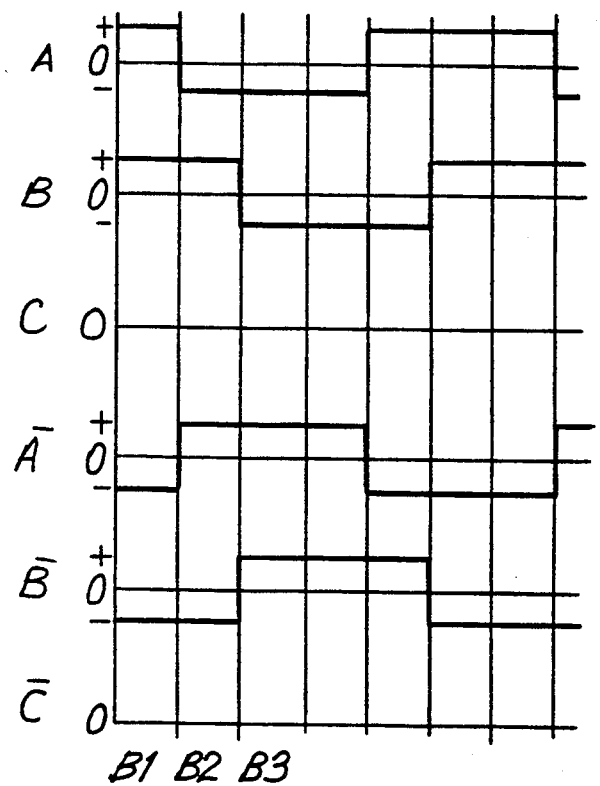
FIG. 26 is a timing chart of the phase relationships between the driving voltages produced by the drive control unit of FIG. 25.
Figure 27:
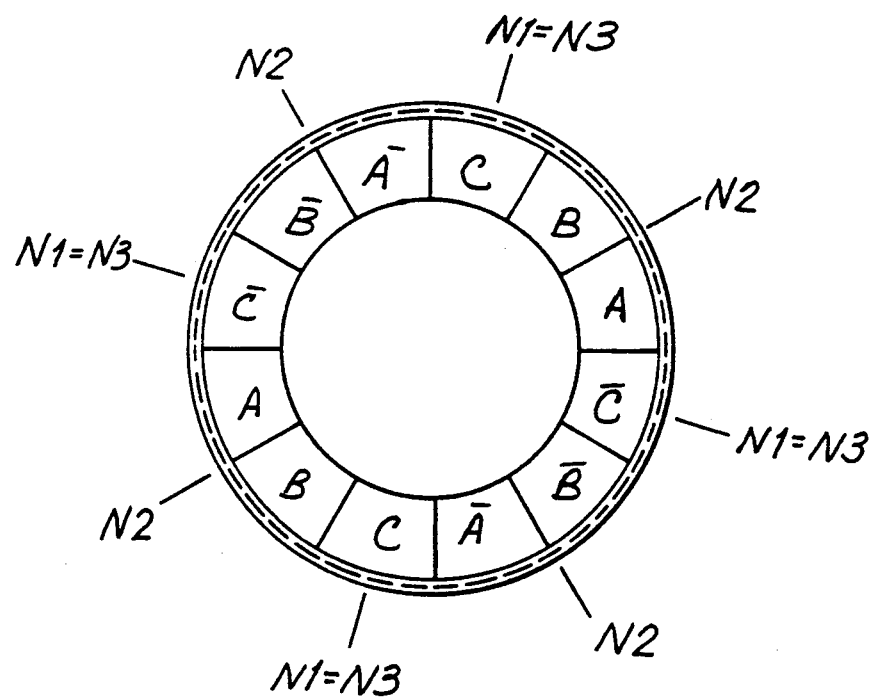
FIG. 27 is a diagrammatic view of the vibrators showing the nodal positions based on the timing chart of FIG. 26.

FIG. 26 is a timing chart showing the phase relationship between the driving voltages of FIG. 25. FIG. 27 shows the positions of the nodes based on FIG. 26. In vibration mode B1 of FIG. 26, positive-phase driving voltages are applied to vibrators A and B and negative-phase driving voltages are applied to vibrators $\overline{A}$ and $\overline{B}$. Nodes N1 are produced in the central portions of vibrators C and C. In vibration mode B2, positive phase driving voltages are applied to vibrators B and $\overline{A}$ and negative phase driving voltages are applied to vibrators $\overline{B}$ and A, producing nodes N2 between vibrators A and B and between vibrators $\overline{A}$ and $\overline{B}$.

In vibration mode B3, negative-phase driving voltages are applied to vibrators A and B and positive-phase driving voltages are applied to vibrators $\overline{A}$ and $\overline{B}$. Nodes N3 are produced in the central portions of vibrators C and $\overline{C}$. Rotor 1 is therefore driven in a 3/2 step.

Figure 28:
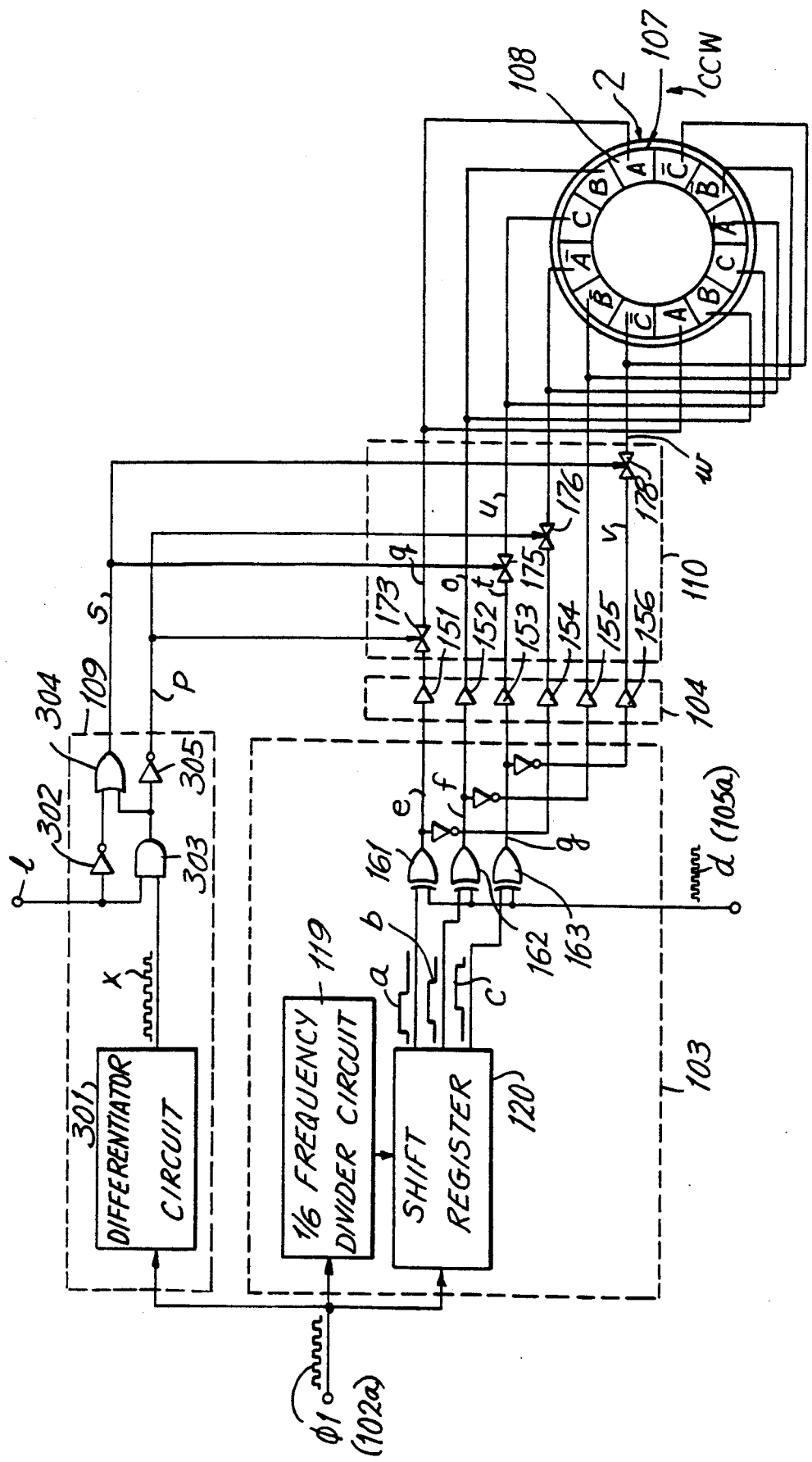
FIG. 28 is a combination block and circuit diagram of the drive control unit of FIG. 1 in accordance with another alternative embodiment of the invention.

FIG. 28 illustrates a drive control unit in accordance with still another alternative embodiment of the invention. The embodiments shown in FIGS. 21 and 25 are examples of 3/2-step driving. The direction of driving, however, is not fixed. The drive control unit of FIG. 28 establishes the driving direction. Gate control circuit 109 now also includes a differentiator 301, inverters 302 and 305, an AND circuit 303 and an OR circuit 304. Gate circuit 110 includes transmission gates 173, 175, 176 and 178.

Figure 29:
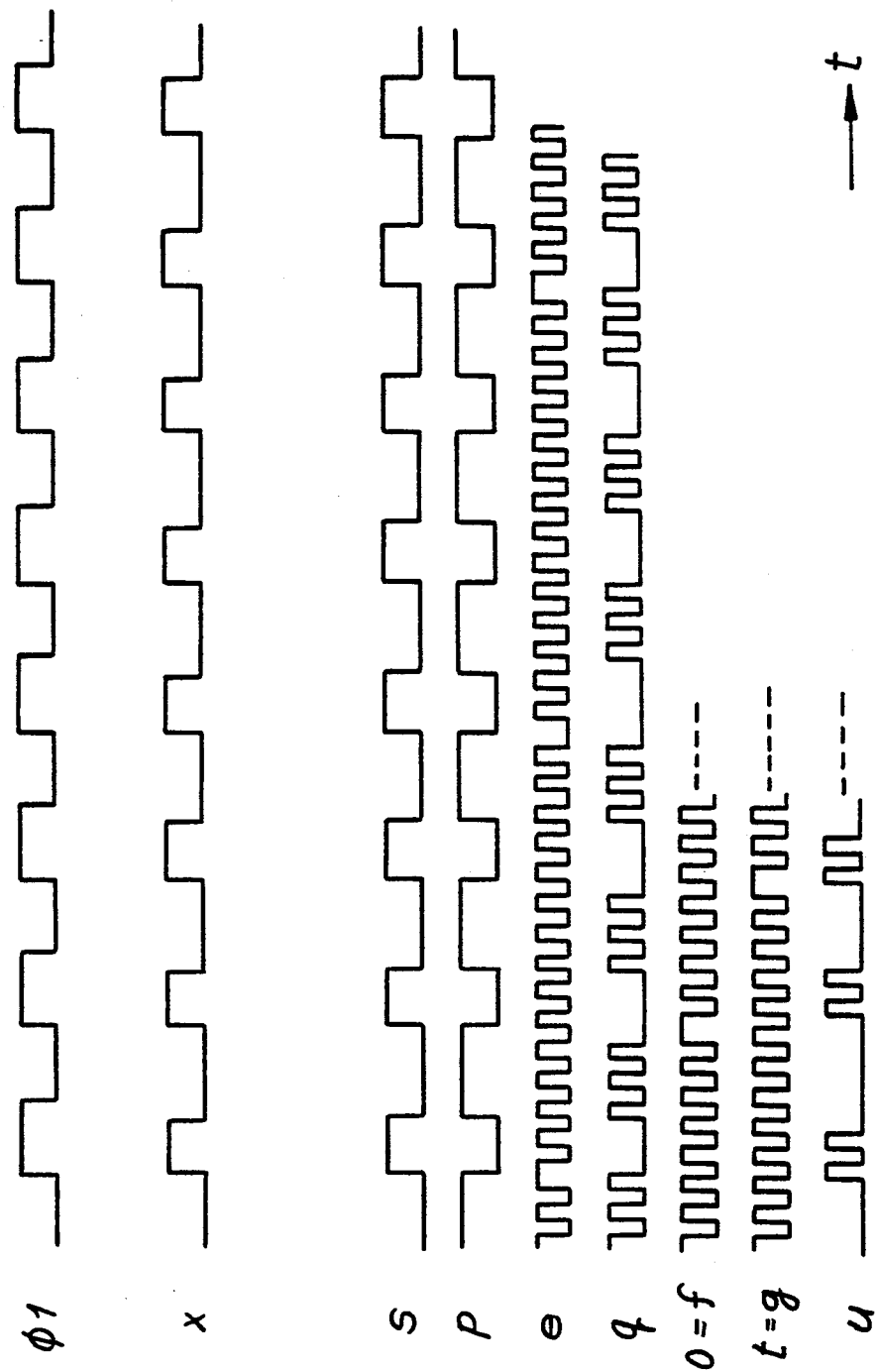
FIG. 29 is a timing chart of the various signals supplied to and produced by the drive control unit of FIG. 28.

FIG. 29 is a timing chart showing the operation of the drive control unit of FIG. 28. A 1 Hz control signal $\phi_1$ is differentiated by differentiator 301. A differentiated signal x produced by differentiator 301 is applied with step switching signal λ to AND circuit 303. When step switching signal λ is at a H logic level, differentiated signal x is produced by AND circuit 303. Signal x is then inverted by inverter 305. Gate control signal p of inverter 305 is applied to transmission gates 173 and 176. Since gate control signal p is at a L logic level, no drive voltage is applied to vibrators A and $\overline{A}$ when the positive-going transition of the 1 Hz control signal $\phi_1$ occurs.

Step switching signal λ is also applied to inverter 302. The outputs of AND circuit 303 and inverter 302 are applied as inputs to OR circuit 304. When the output of AND circuit 303 remains at a H logic level, the output of OR circuit 304 is supplied as a H logic level gate signal to transmission gates 175 and 178. Driving voltages are applied to vibrators C and $\overline{C}$. Accordingly, vibrators C and $\overline{C}$ are driven during the short period of time during which vibrators $\overline{A}$ and A are not driven.

Figure 30A:
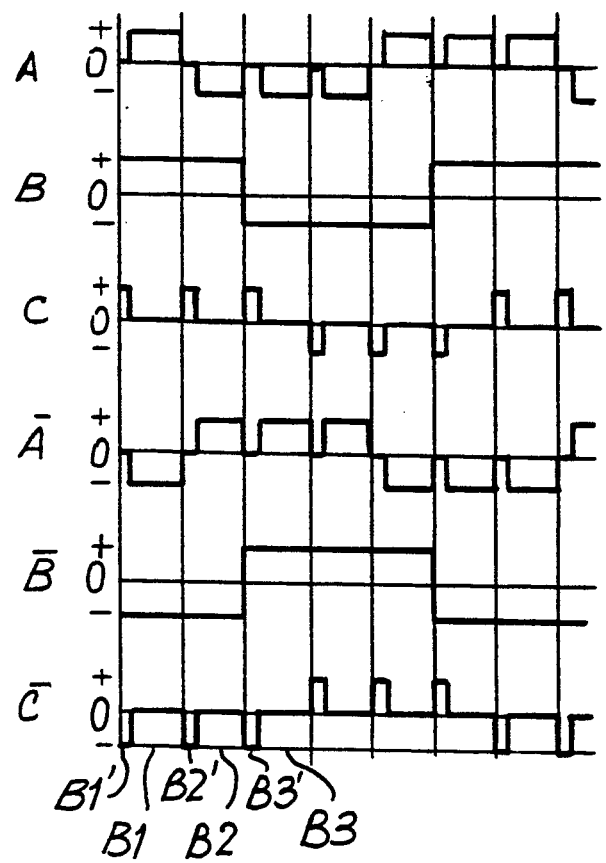
FIG. 30a is a timing chart of the phase relationships between the driving voltages produced by the drive control unit of FIG. 28.
Figure 30B:
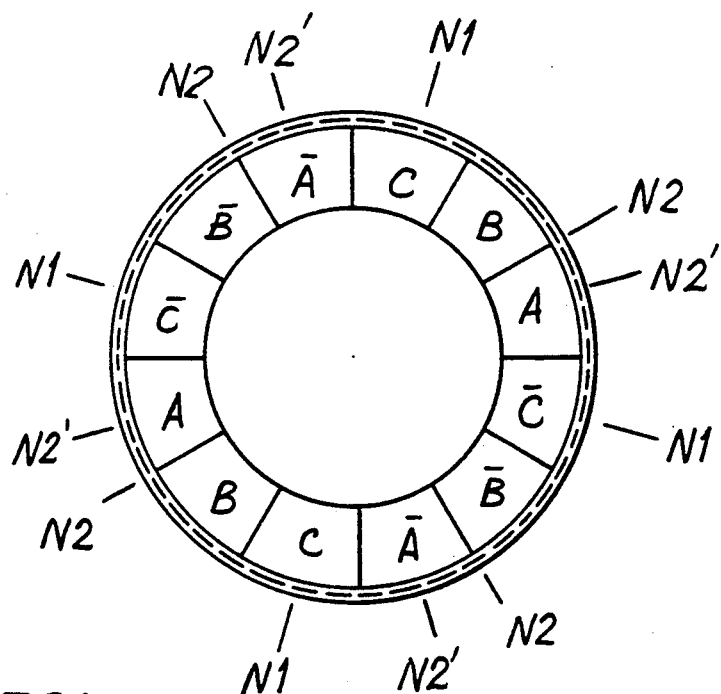
FIG. 30b is a diagrammatic view of the vibrators showing their nodal positions based on the timing chart of FIG. 29.
Figure 30C:
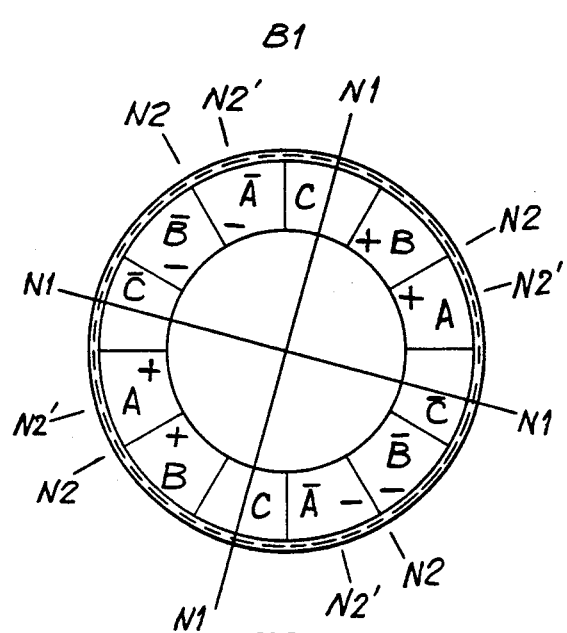
FIGS. 30c, 30d, 30e and 30f are diagrammatic views of the vibrators showing their nodal positions and driving voltages during vibration nodes B1, B2', B2 and B3', respectively.
Figure 30D:
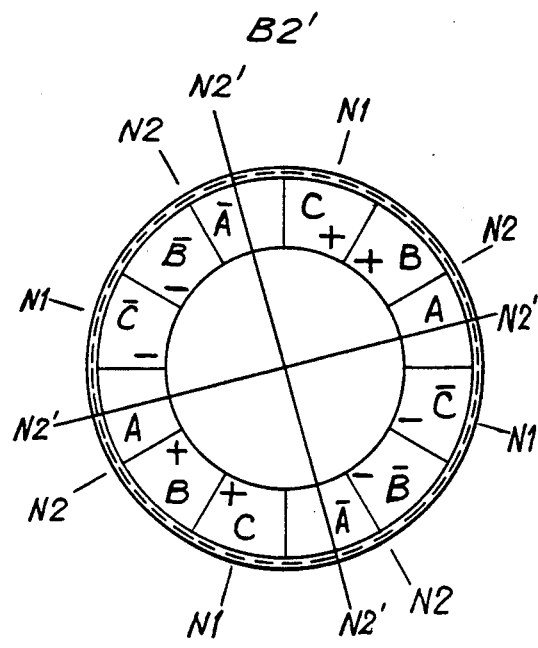
Figure 30E:
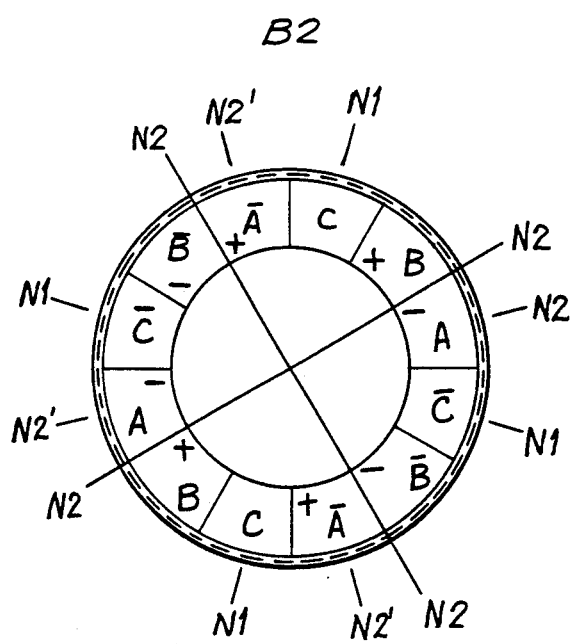
Figure 30F:
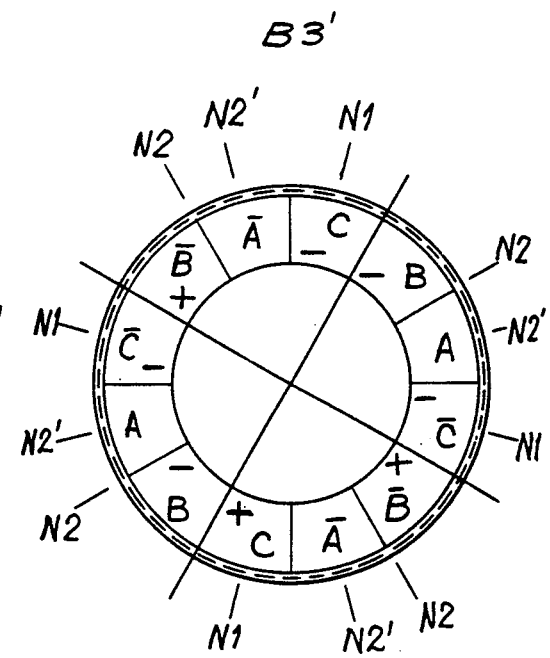

FIG. 30a is a timing chart of the phase relationship between the driving voltages. FIG. 30b diagrammatically shows the position of nodes N. In vibration mode B1, positive-phase driving voltages are applied to vibrators A and B, negative-phase driving voltages are applied to vibrators $\overline{A}$ and $\overline{B}$ and no driving voltage is applied to vibrators C and $\overline{C}$. Nodes N1 are produced in the central portions of vibrators C and $\overline{C}$. In vibration mode B2′, no driving voltage is applied to vibrators A and $\overline{A}$, positive-phase driving voltages are applied to vibrators B and C and negative-phase driving voltages are applied to vibrators $\overline{B}$ and $\overline{C}$. Nodes N2′ are produced in the central portions of vibrators A and $\overline{A}$. The projection of rotor 1 moves from the positions of nodes N1 to the positions of nodes N2′. In vibration mode B2, no driving voltage is applied to vibrators C and $\overline{C}$, positive-phase driving voltages are applied to vibrators B and $\overline{A}$ and negative-phase driving voltages are applied to vibrators $\overline{B}$ and A. Nodes N2 are produced between vibrators A and B and between vibrators $\overline{A}$ and $\overline{B}$.

Nodes N produced during vibration modes B1′, B2′, B3′, etc., are provided before vibration modes B1, B2, B3, etc., respectively. Accordingly, node N is provided for a short period of time prior to node N. Rotation of rotor in the desired direction is therefore ensured.

The foregoing embodiments have been described for ½-step (half-step) or 3/2-step drive control. It is to be understood, however, that 5/2, 7/2, etc. step drive control can be provided in accordance with the invention. For example, 5/2 or 7/2 step driving is achieved by increasing the number of vibrators 108, adjusting the number of vibrators 108 to which no driving voltage is applied and changing the time period during which no driving voltage is applied to one or more selected vibrators 108.

FIGS. 30c, 30d, 30e and 30f diagrammatically illustrate both the nodal positions and voltage phases of the driving voltages during certain vibration modes of FIG. 30. More particularly, vibration modes B1, B2′, B2 and B3 are shown in FIGS. 30c, 30d, 30e and 30f, respectively.

Figure 31:
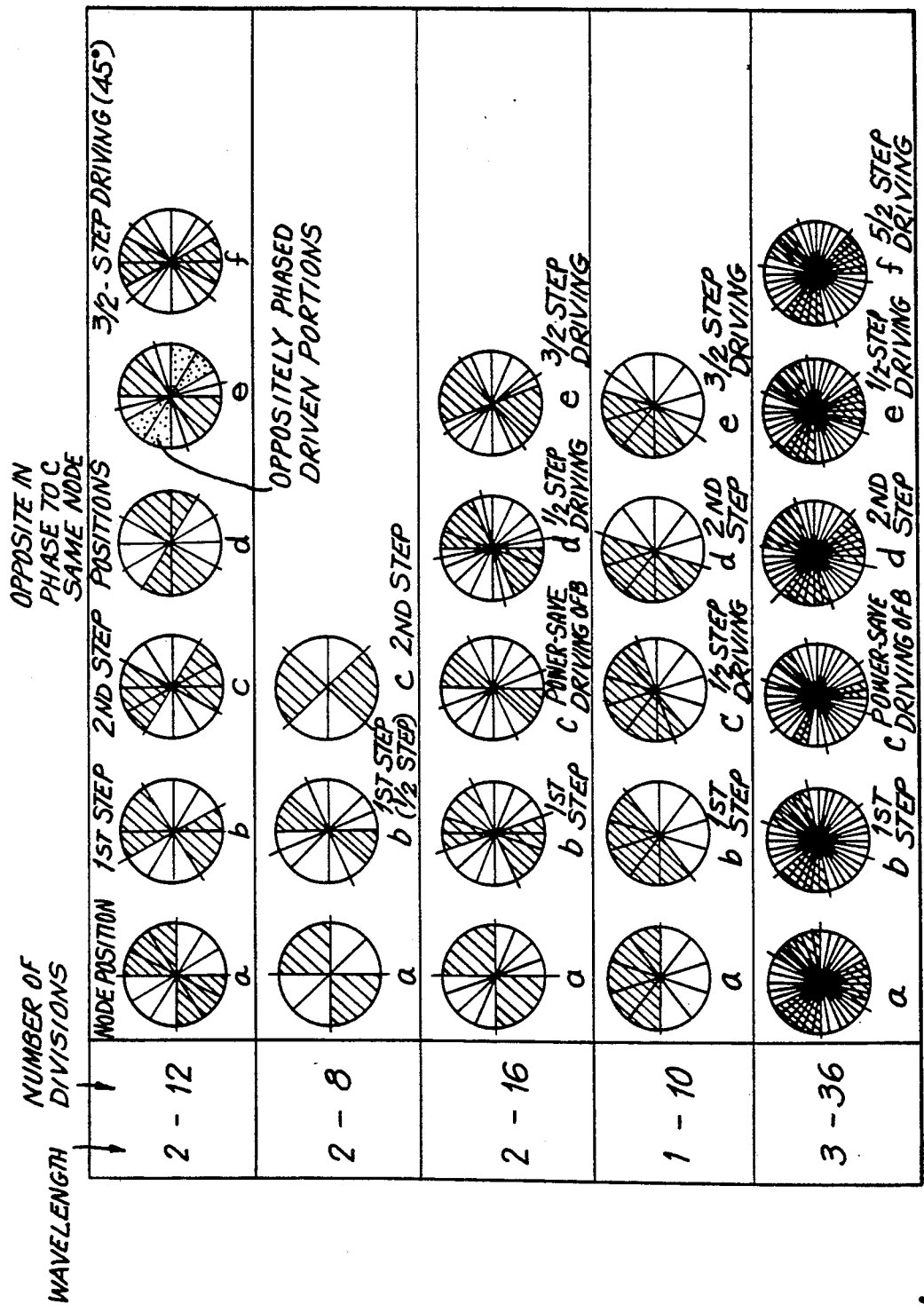
FIG. 31 are additional diagrammatic views of the vibrators for various stepping drives.

FIG. 31 illustrates different types of stepping drives. Stepping drives for certain wavelengths and divisions of stator 2 are shown in FIG. 31.

Figure 32:
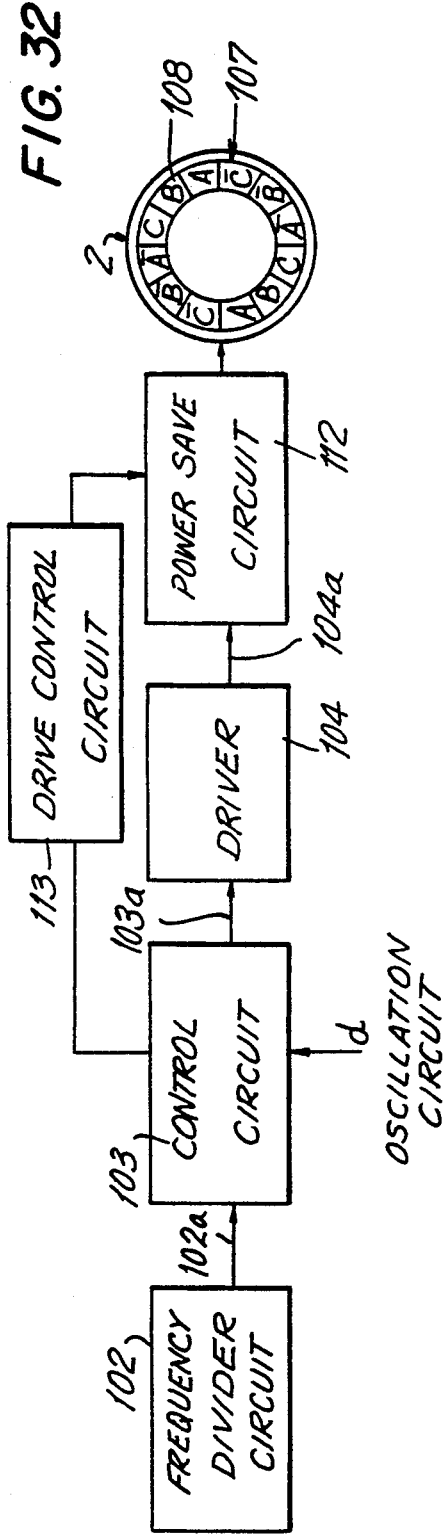
FIG. 32 is a block diagram of a drive control unit for an ultrasonic step motor in accordance with a further alternative embodiment of the invention.
Figure 33:
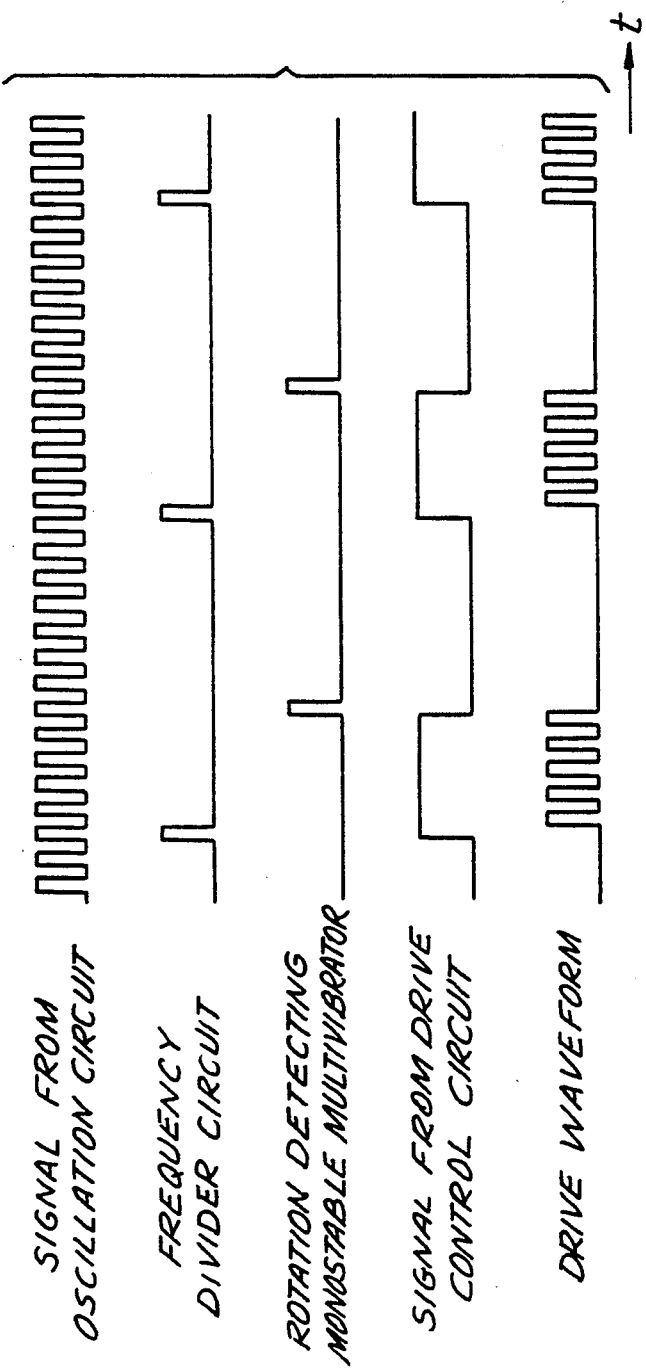
FIG. 33 is a timing chart of the signals supplied to and produced by the drive control unit of FIG. 32.

FIG. 32 is a block diagram of a drive control unit in accordance with still another alternative embodiment of the invention. The device of FIG. 32 includes frequency divider circuit 102, control circuit 103, driver 104, a power save circuit 112 and a drive control circuit 113. FIG. 33 is a timing chart showing the operation of the drive control unit of FIG. 32.

As shown in FIGS. 32 and 33, in response to signal 102a from frequency divider circuit 102 and oscillation signal d from oscillation circuit 105, control circuit 103 supplies control signals 104a to driver 104. Driver 104 applies driving voltages 104a to vibrators 108 through power circuit 112. After the lapse of a predetermined period of time from the positive-going transition of drive signal 104a or following confirmation of a predetermined amount (e.g. angle or distance) of rotation by rotor 1, drive control circuit 113 closes the gates of power save circuit 112 thereby preventing the application of driving voltages 104a to vibrating unit 107. Confirmation of rotor 1 moving a predetermined magnitude is determined based on the output from an encoder (not shown).

The time required for rotor to move one step is determined based on, for example, previous movement of rotor 1 by one step. Following confirmation of rotor 1 moving one step through detection of movement by en encoder, application of the driving voltages is interrupted thereby substantially reducing the power consumed by the drive control device.

Figure 34:
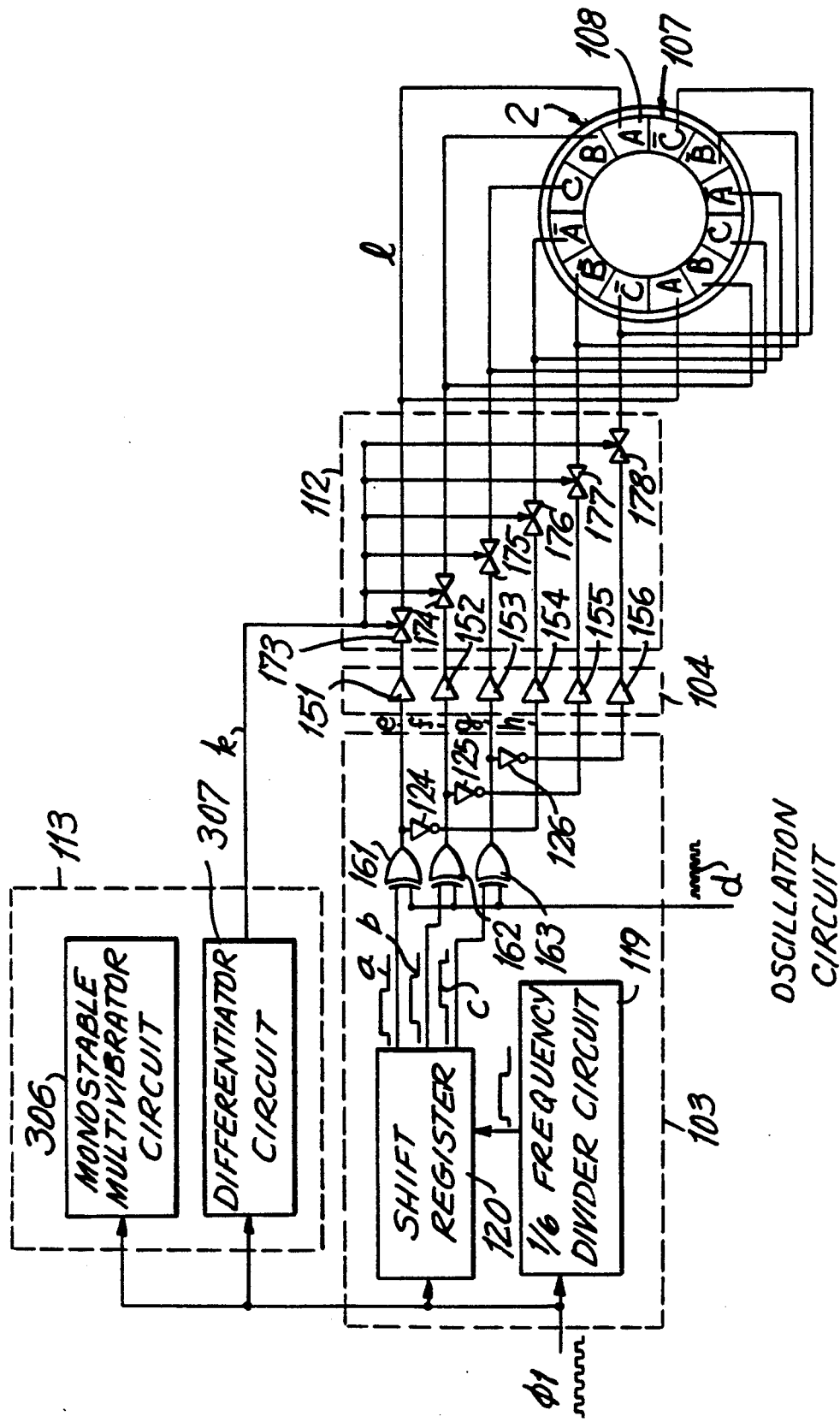
FIG. 34 is a combination block and circuit diagram of the drive control unit of FIG. 32 in accordance with another alternative embodiment of the invention.

FIG. 34 is a block and circuit diagram illustrating the drive control unit of FIG. 32. Power save circuit 112 includes transmission gates 173-178 and is similar in construction to gate circuit 110. Drive control circuit 113 includes a monostable multivibrator circuit 306 and a differentiator 307. The output of differentiator 307 turns transmission gates 173-178 of the power save circuit 112 ON and OFF.

The drive control unit of FIG. 34 provides one-step (30°) per second driving of an ultrasonic step motor having a 2λ vibration mode of 12-division steps per rotation.

Figure 35:
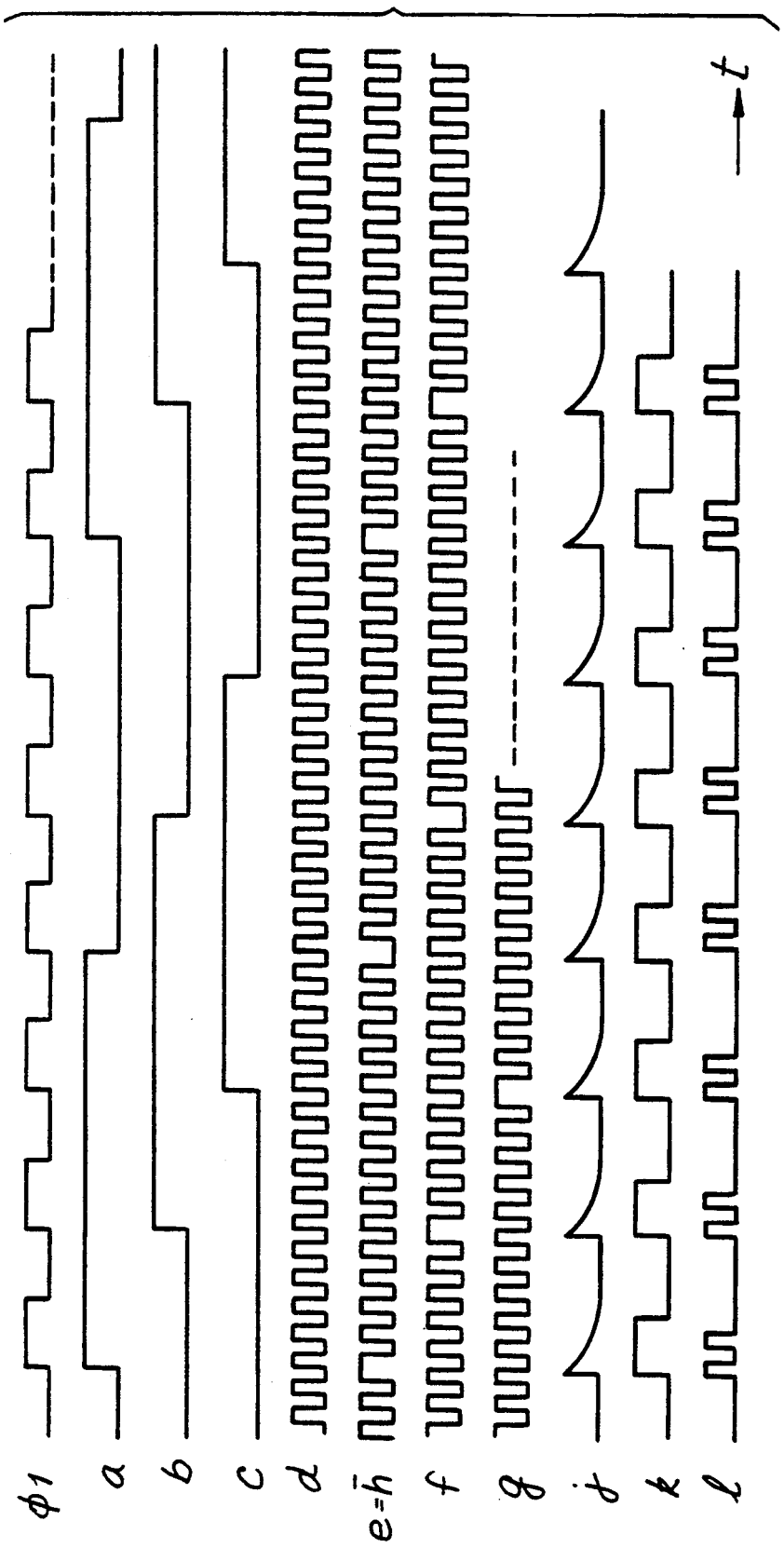
FIG. 35 is a timing chart of the signals supplied to and produced by the drive control unit of FIG. 34.

FIG. 35 is a timing chart showing the operation of the drive control unit of FIG. 34. The 1 Hz control signal $\phi_1$ from frequency divider circuit 102 is applied to 1/6 frequency divider circuit 119 and shift register 120. The 1/6 frequency divided signal produced by 1/6 frequency divider circuit 119 is supplied to shift register 120. Shift register 120 produces 1/6 Hz signals a, b and c which are respectively shifted sequentially by 1 second and which are each inverted in phase every 3 seconds. Signal a and oscillation signal d are supplied as inputs to exclusive OR circuit 161 which provides output signal e. Signal e is supplied to buffer 151 of driver 104. Inverter 124 inverts signal e producing signal h which is provided to buffer 154. Signal b and oscillation signal d are supplied as inputs to exclusive OR circuit 162. Signal c and oscillation signal d are supplied as inputs to exclusive OR circuit 163. Circuits 162 and 163 produce output signals f and g which are supplied as inputs to buffers 152 and 153 of driver 104, respectively. Inverters 125 and 126 invert signals f and g and supply their inverted signals to buffers 155 and 156 of driver 104, respectively.

1 Hz control signal $\phi_1$ is also supplied to monostable multivibrator circuit 306 so that each time a pulse of control signal $\phi_1$ is applied, monostable multivibrator circuit 306 generates and applies a pulse signal to differentiator 307. A gate control signal k at a H logic level for a given time interval is supplied to power save circuit 112. When gate control signal k is at a H logic level, the driving voltages from driver 104 are successively applied to vibrators 108 of stator 2 resulting in rotor 1 moving one step. Upon expiration of the given time interval, gate control signal k assumes a L logic level. Gates 173-178 of power save circuit 112 are closed.

The driving voltages from driver 104 no longer are applied to vibrators 108. To move rotor 1 an additional step, the foregoing operation is repeated.

Figure 36:
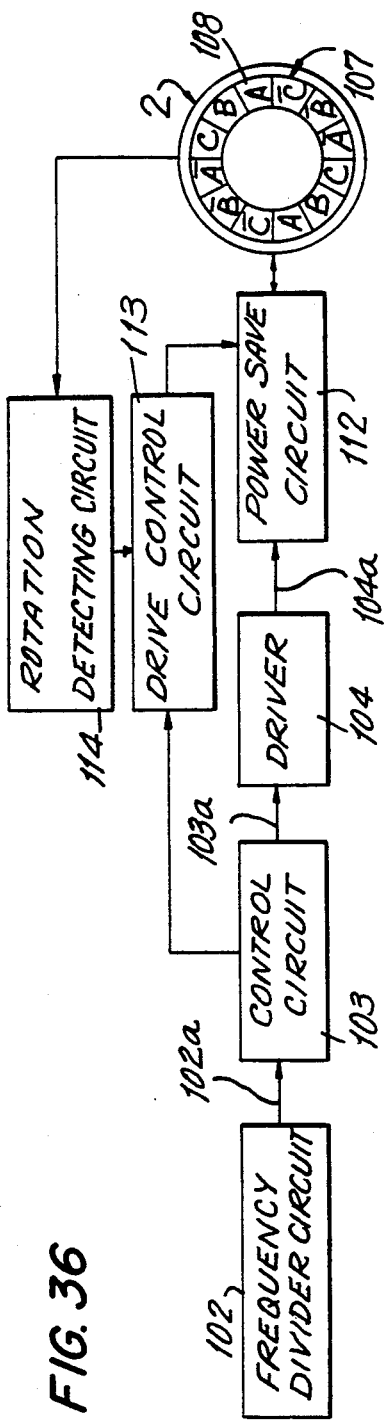
FIG. 36 is a block diagram of a drive control unit for an ultrasonic step motor in accordance with yet another alternative embodiment of the invention.

FIG. 36 is a block diagram of a drive control unit in accordance with still another alternative embodiment of the invention in which application of the driving voltages is interrupted following rotation of rotor 1 by a predetermined amount. The device control unit of FIG. 36 includes a rotation detecting circuit 114 for detecting rotation of rotor 1. Drive control circuit 113 produces a gate signal for opening the gates of power save circuit 112 during the time interval from a positive going transition of control signal 103a of control circuit 103 until application of an output signal from rotation detecting means 114. After rotor 1 has moved one step, driving voltages are no longer applied to vibrating unit 107.

Figure 37:
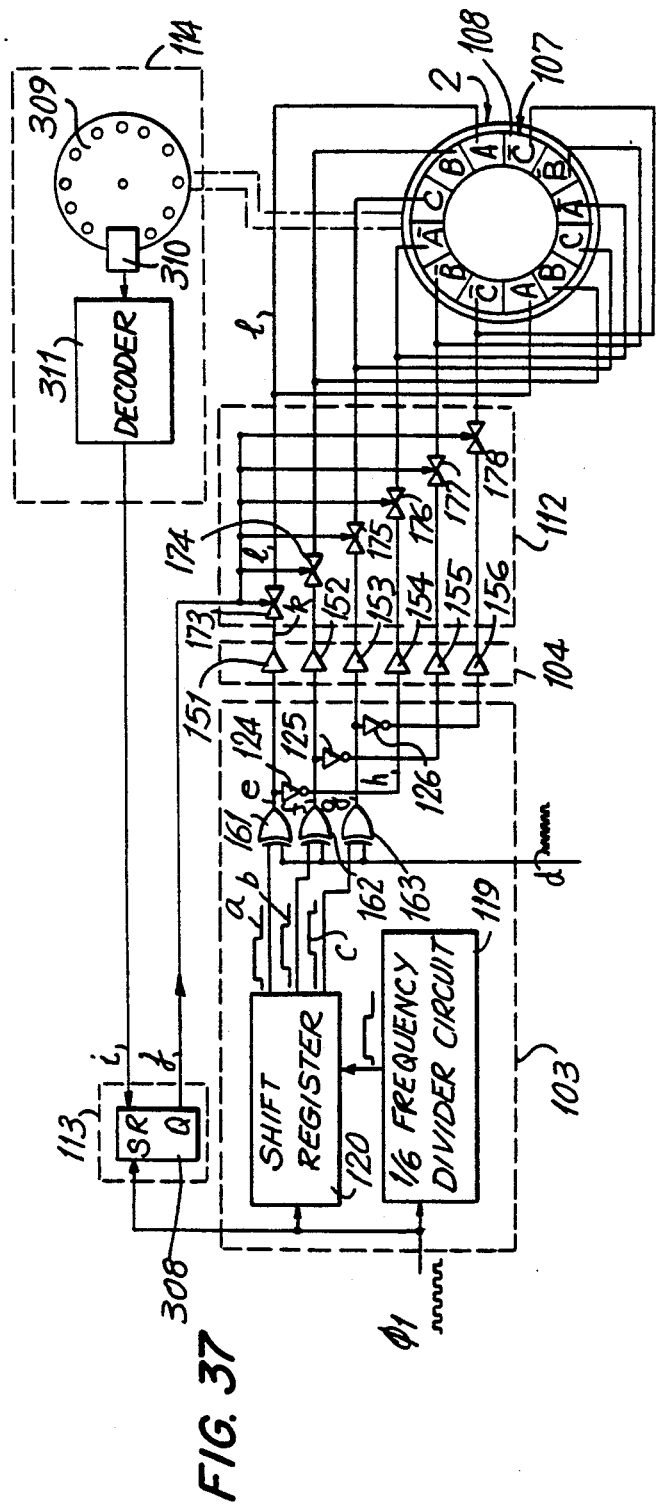
FIG. 37 is a combination block and circuit diagram of the drive control unit of FIG. 36 in accordance with another alternative embodiment of the invention.

FIG. 37 is a block and circuit diagram of the drive control unit of FIG. 36. Drive control circuit 113 includes a flip-flop circuit 308. Rotation detecting means 114 includes a disc 309 mechanically coupled to rotor 1, a light emitter/receiver 310 and a decoder 311.

Figure 38:
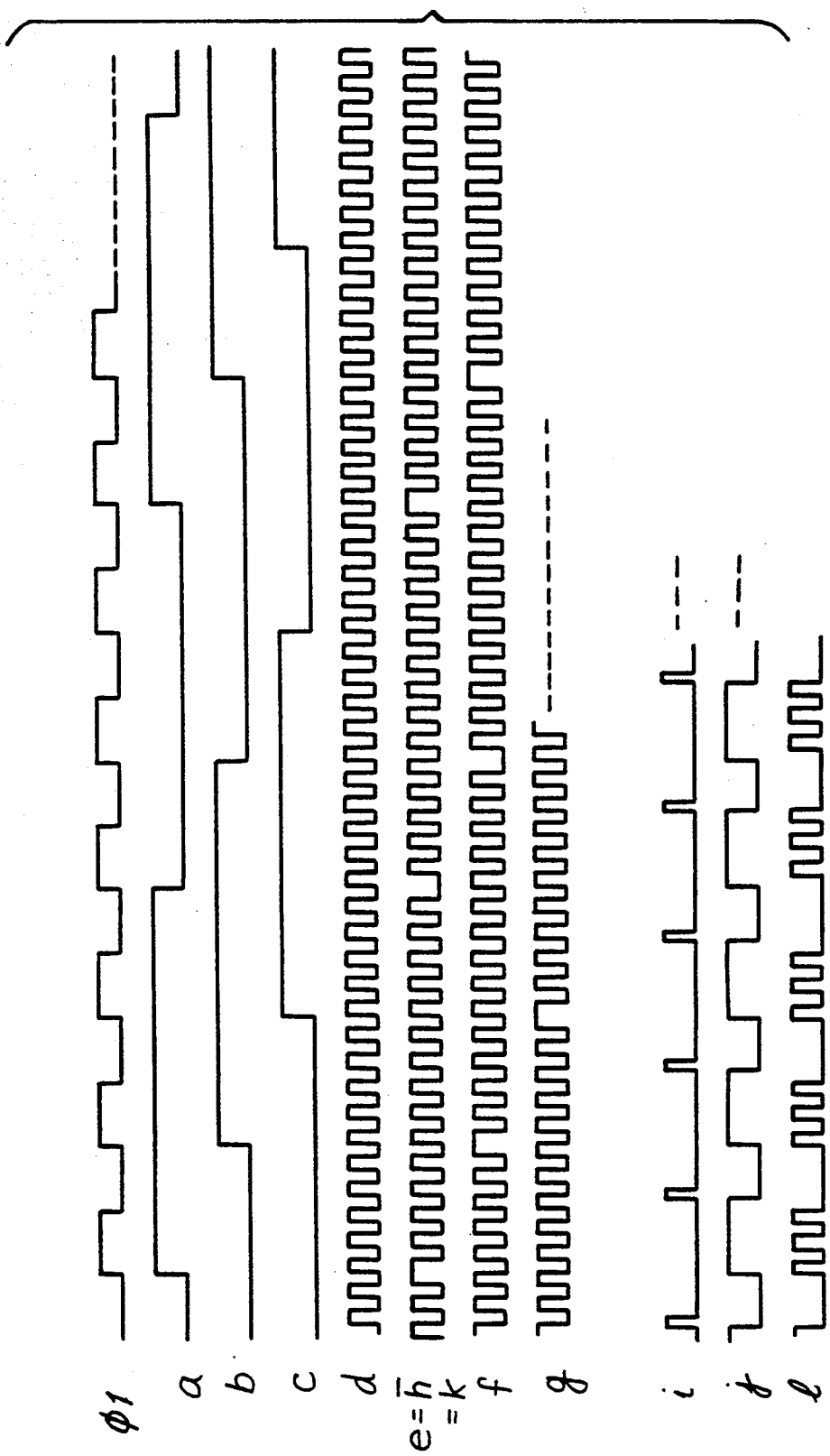
FIG. 38 is a timing chart of signals supplied to and produced by the drive control unit of FIG. 37.

FIG. 38 is a timing chart showing the operation of the drive control unit of FIG. 37. Control signal $\phi_1$ is applied to the set(S) terminal of flip-flop circuit 308 so that flip-flop 308 is set once a second. When an output signal j of flip-flop circuit 308 assumes a H logic level, the gates of power save circuit 112 open. Accordingly, the driving voltages applied to vibrators 108 cause vibrators 108 to vibrate in a first direction resulting in the production of nodes in stator 2. Rotor 1 moves relative to the nodes in a direction essentially orthogonal to the first direction making a single step. Disc 309 rotates in response to the rotor stepping movement. Light emitter/receiver 310 detects rotation of disc 309.

The output of light emitter/receiver 310 is applied to the reset (R) terminal of flip-flop circuit 308 through decoder 311. Output signal j changes from the H logic level to the L low level. The gates of power save circuit 112 are closed thereby interrupting application of the driving voltages. For example, an output of buffer 151 is applied to vibrator A only when transmission gate 173 is open, that is, when gate signal j is at the H logic level the driving voltage is applied to vibrators A.

Figure 39:
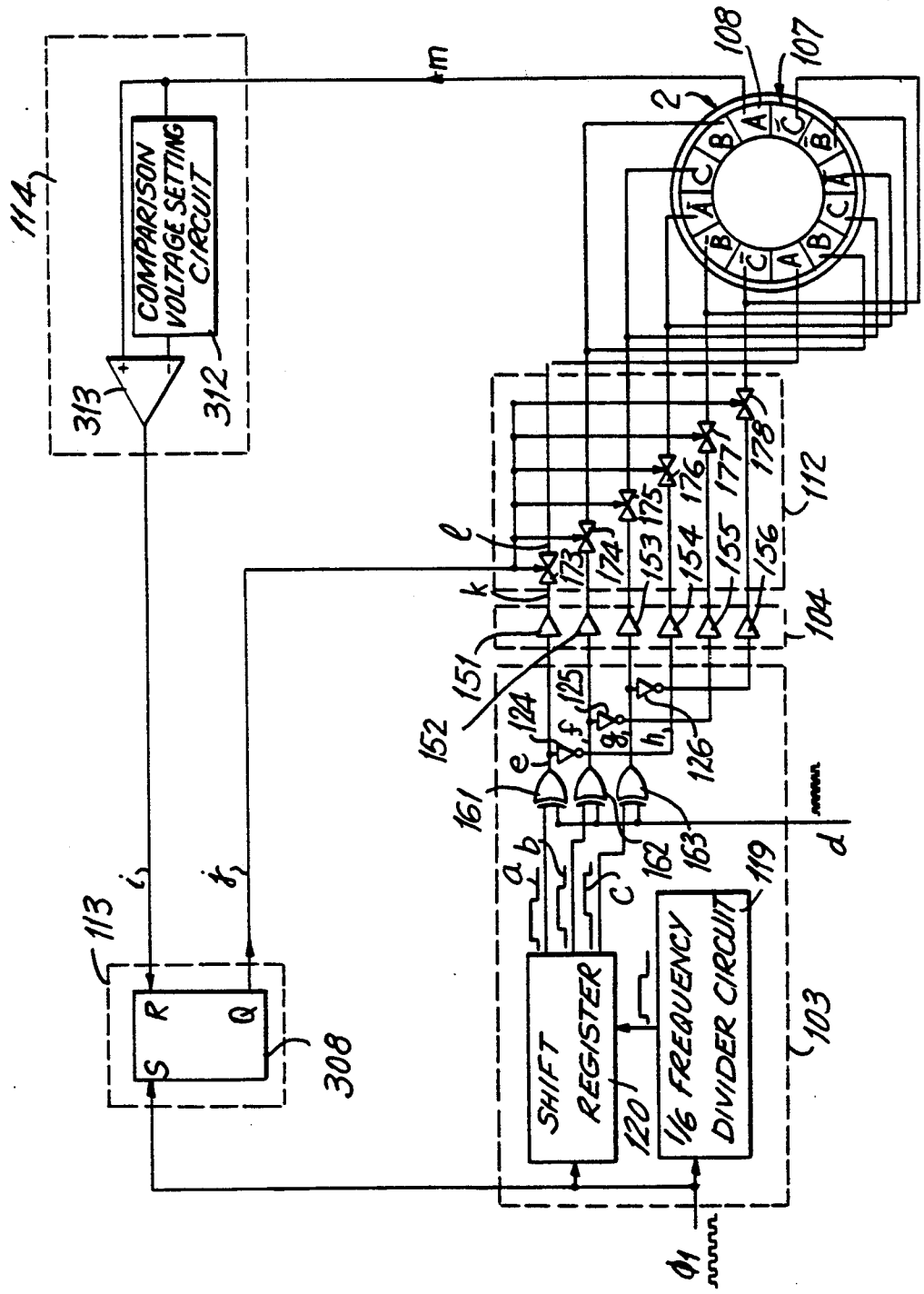
FIG. 39 is a combination block and circuit diagram for the drive control unit of FIG. 36 in accordance with another alternative embodiment of the invention.

FIG. 39 is a block and circuit diagram of the driving control unit of FIG. 36 in accordance with another alternative embodiment of the invention. In the driving control unit of FIG. 39, each time an induced voltage in a vibrator 108 to which a driving voltage is being applied reaches a given voltage, rotor 1 is considered to have moved one step. After each step, application of the driving voltages is discontinued. Rotation detecting means 114 now includes a comparison voltage setting circuit 312 and a comparator 313.

Figure 40:
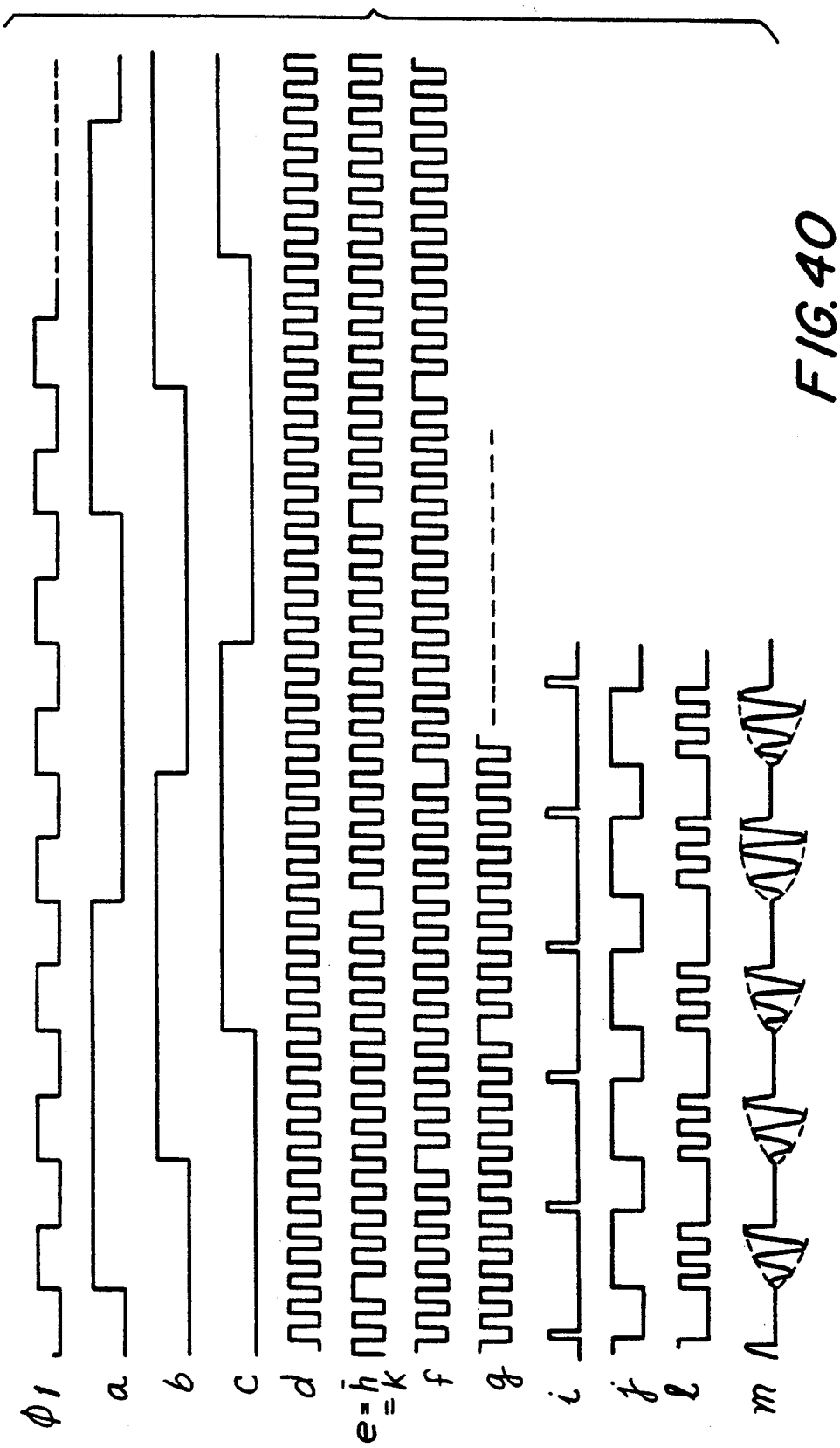
FIG. 40 is a timing chart of the signals supplied to and produced by the drive control unit of FIG. 39.

As shown in FIG. 40, operation of the driving control unit in FIG. 39 is essentially the same as the driving control unit of FIG. 37. As vibrators 108 are being driven (i.e., upon vibration of vibrators 108), an induced voltage m of one of the plurality of vibrators 108 is detected. Induced voltage m is compared with a predetermined reference voltage of comparison voltage setting circuit 312 by comparator 313. If induced voltage m is greater than the predetermined reference voltage, a reset signal i is applied to the reset (R) terminal of flip-flop circuit 308. Output signal j of flip-flop circuit 308 assumes a L logic level whereby the gates of power save circuit 112 are closed. The driving voltages are therefore no longer applied to vibrators 108. The induced voltage level is unstable and at a relatively low level during movement of rotor 1. As the projections of rotor 1 approach the nodal positions of stator 2, the induced voltage increases and stabilizes.

Alternatively, rotation detecting means 114 also can be designed so as to sample and hold the immediately preceding induced voltage and compare the same with the current induced voltage level to detect rotation of rotor 1. By interrupting the application of driving voltages once rotor 1 has completed its step movement, the drive control unit can be operated at a reduced power level.

Figure 41:
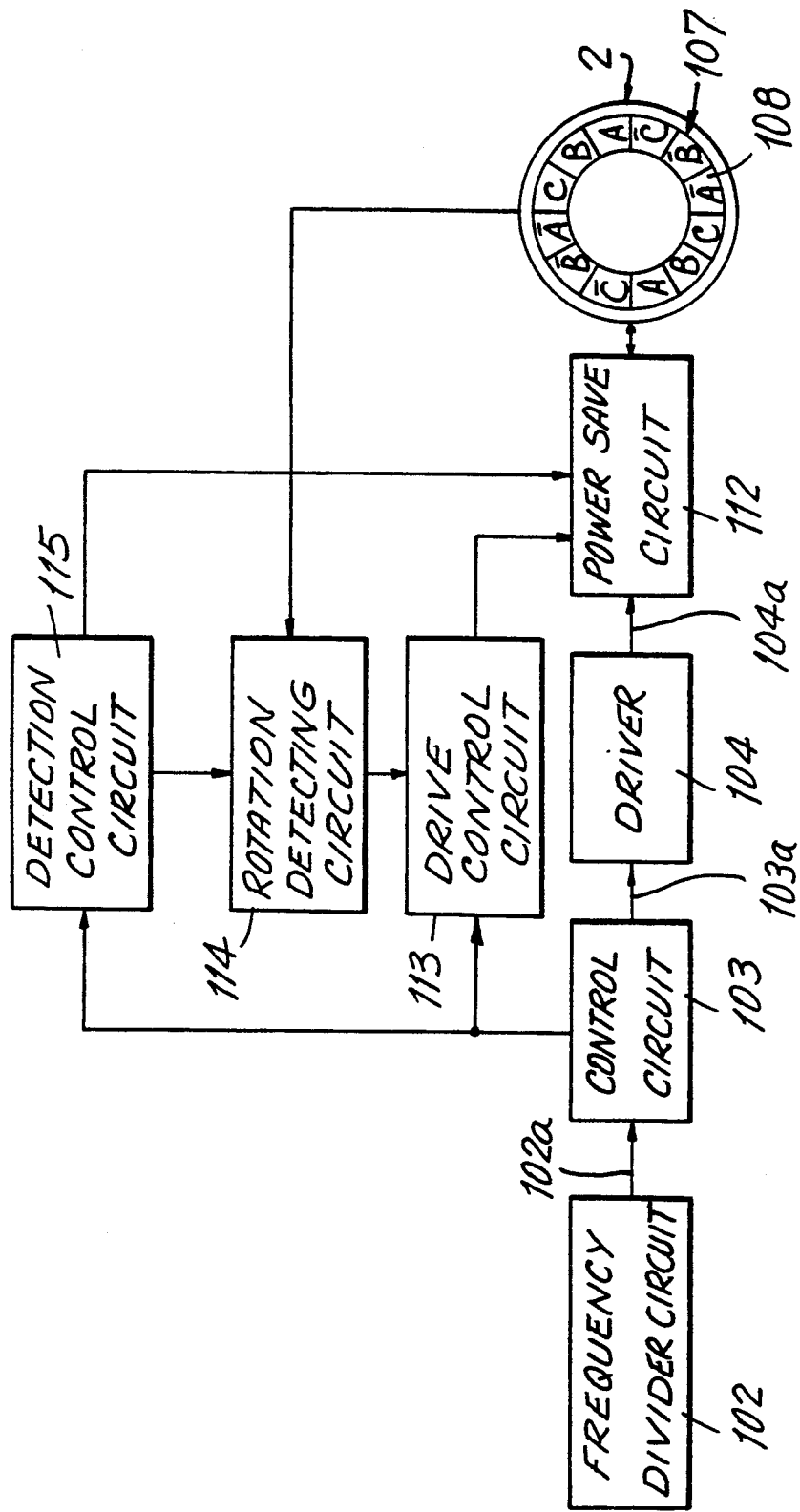
FIG. 41 is a block diagram of a drive control unit for an ultrasonic step motor in accordance with still another embodiment of the invention.

FIG. 41 is a block diagram of another drive control unit in accordance with still another alternative embodiment of the invention. The drive control unit of FIG. 41 as compared to the drive control unit of FIG. 36 includes a detection control circuit 115. When rotation of rotor 1 has not been confirmed following the elapse of a given time interval, a driving voltage is applied to the vibrator to trigger rotation detecting circuit 114.

Figure 42:
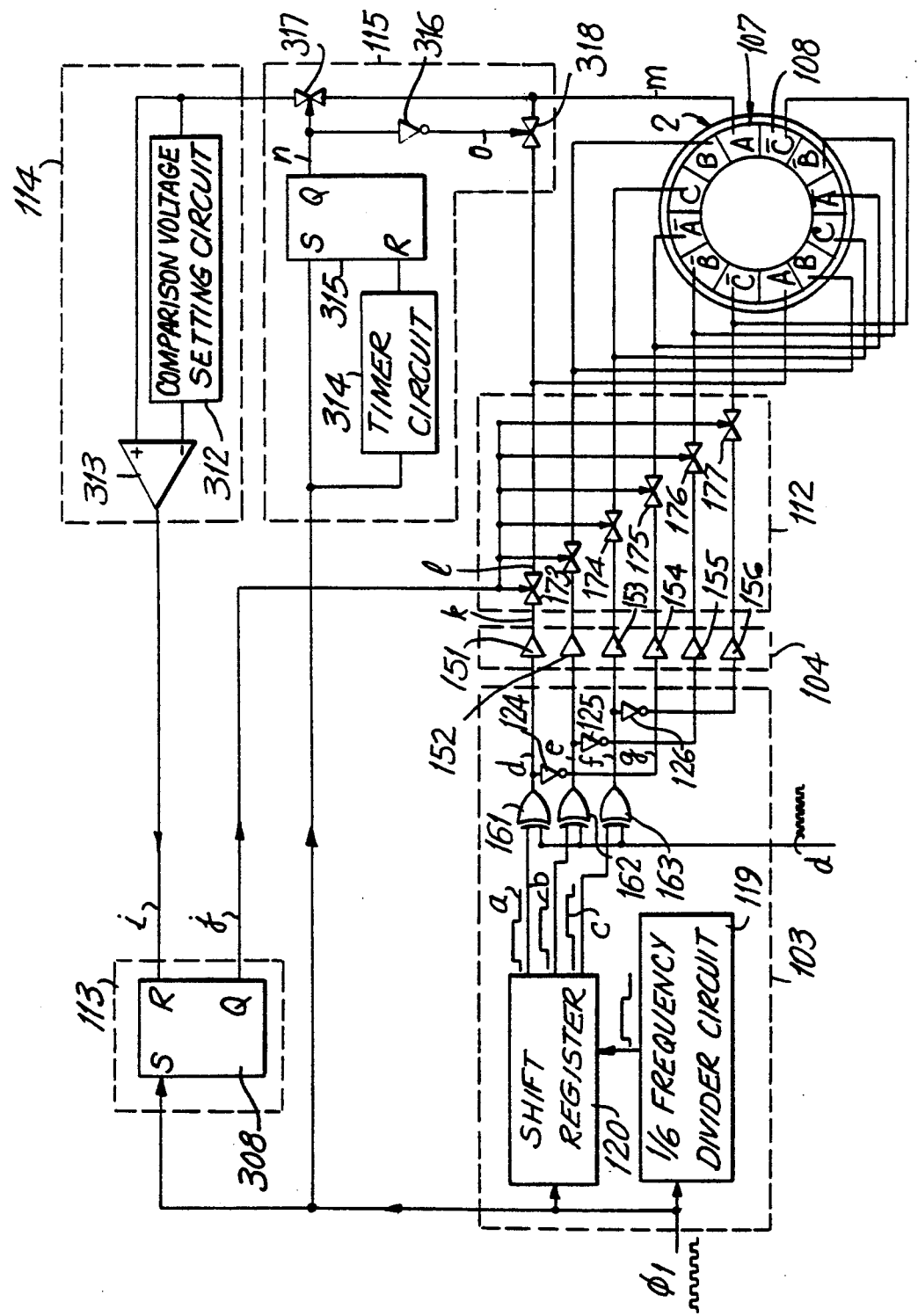
FIG. 42 is a combination block and circuit diagram of the drive control unit of FIG. 41 in accordance with another alternative embodiment of the invention.
Figure 43:
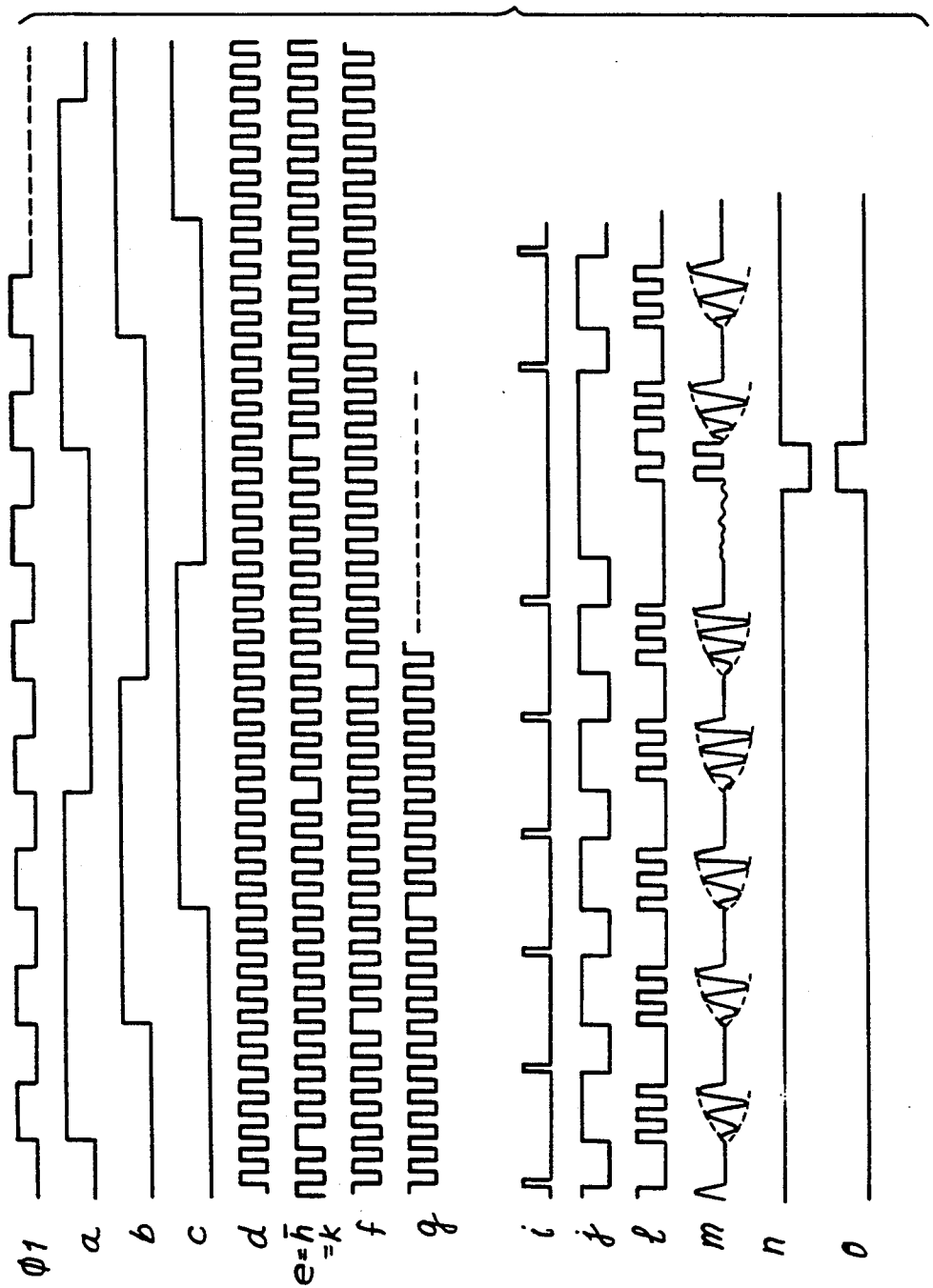
FIG. 43 is a timing chart of the signals supplied to and produced by the drive control unit of FIG. 42.

In FIG. 42, detection control circuit 115 includes a timer circuit 314, a flip-flop circuit 315, an inverter 316 and a pair of transmission gates 317 and 318. As shown in FIG. 43, the steady-state operation of the drive control unit of FIG. 42 is the same as the steady-state operation of the drive control unit of FIG. 39. During operation of timer circuit 314, that is, prior to the elapse of a given time interval following application of a driving signal, flip-flop circuit 315 sets each time a pulse of control signal $\phi_1$ is applied. Output signal n assumes a H logic level which is supplied as a gate signal to transmission gate 317. Gate 317 opens and a gate signal o is supplied through inverter 316 to transmission gate 318 which closes. As a result, no driving voltage is supplied to vibrator A and induced voltage m of vibrator A is supplied to rotation detecting circuit 114 similar to the drive control unit of FIG. 39.

When the given time interval has elapsed, timer circuit 314 times out. Flip-flop circuit 315 is reset. Output signal n of flip-flop 315 assumes a L logic level. Transmission gate 317 closes and transmission gate 318 opens. The drive voltage from buffer 151 is applied to vibrator A. The drive voltages are also applied to all other vibrators to achieve maximum (full) driving power. In other words, when rotor 1 has failed to move by a given amount (e.g., one step) after the expiration of a given period of time following the start of each stepping period, all vibrators are driven so as to move rotor 1 by one step.

Figure 44:
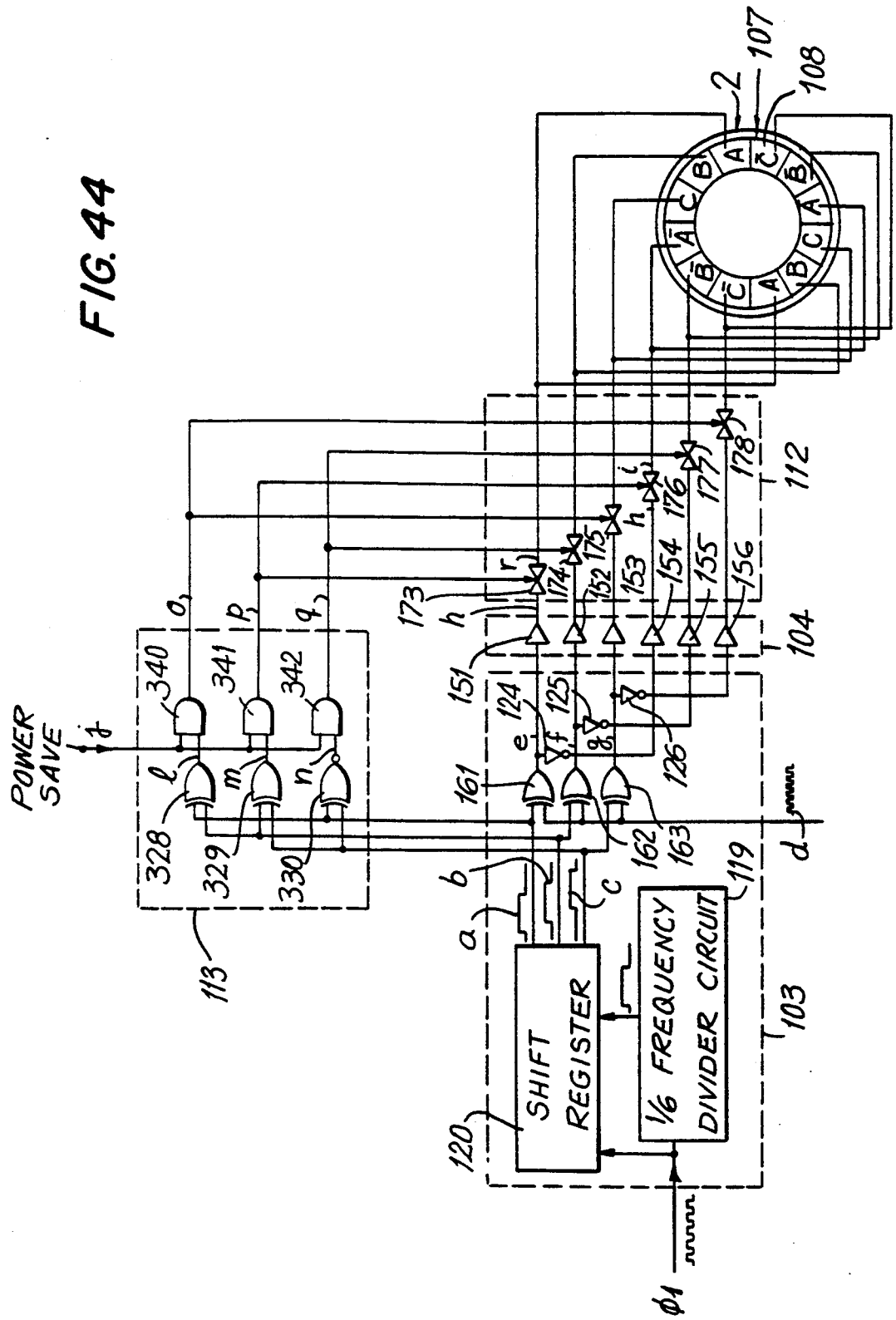
FIG. 44 is a combination block and circuit diagram of a drive control unit in accordance with another alternative embodiment of the invention.

FIG. 44 illustrates a drive control unit in accordance with still another alternative embodiment of the invention. Driving of the vibrators in this embodiment is interrupted when the antinodes in the vibration mode occur to ensure low power driving. Drive control circuit 113 includes exclusive OR circuits 328 and 329, an exclusive NOR circuit 330 and a pair of AND circuits 340-342.

Figure 45:
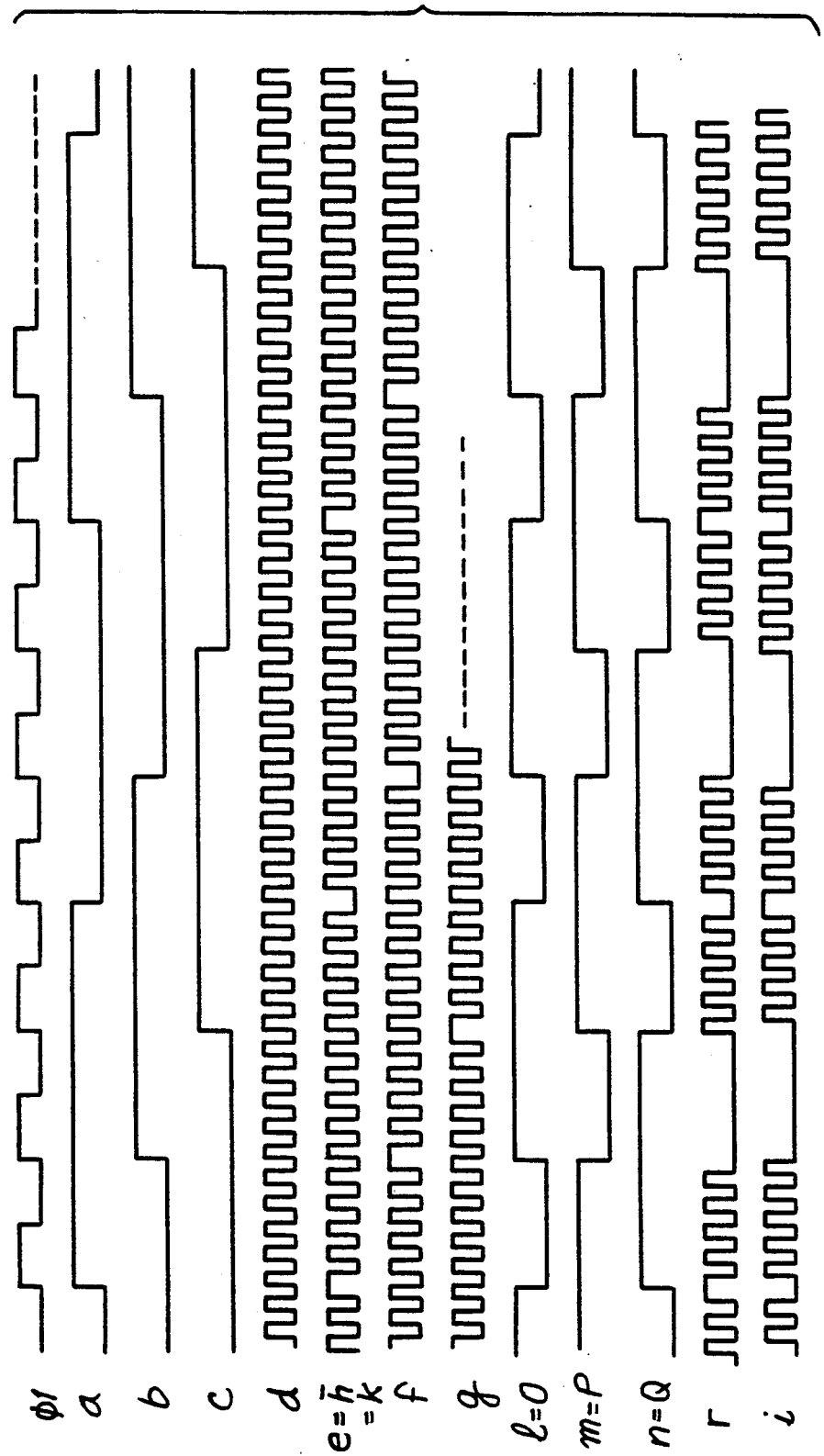
FIG. 45 is a timing chart of the signals supplied to and produced by the drive control unit of FIG. 44.

Referring now to FIGS. 44 and 45, exclusive OR circuit 329 of drive control circuit 113 receives signals a and b. An output signal m of exclusive OR circuit 329 is supplied to AND circuit 341. When power save signal j assumes a H logic level, output signal m is supplied as a gate signal to transmission gates 173 and 176 and drive voltages r and i are produced by these gates, respectively Gates 173 and 176, however, interrupt application of drive voltages r and i during the central waveform portions for each of these drive signals, respectively (i.e., the portions corresponding to the antinode portions of the vibration mode). Therefore, no drive voltages are applied to vibrators A and $\overline{A}$ during these antinode portions of the vibration mode. Similarly, no drive voltages are applied to vibrators B, $\overline{B}$, C and $\overline{C}$ during the antinode portions of the vibration mode. Since no drive voltages are applied to vibrators positioned at the vibratory antinodes of stator 2, during a portion of the vibration mode, low power driving is achieved.

Figure 46:
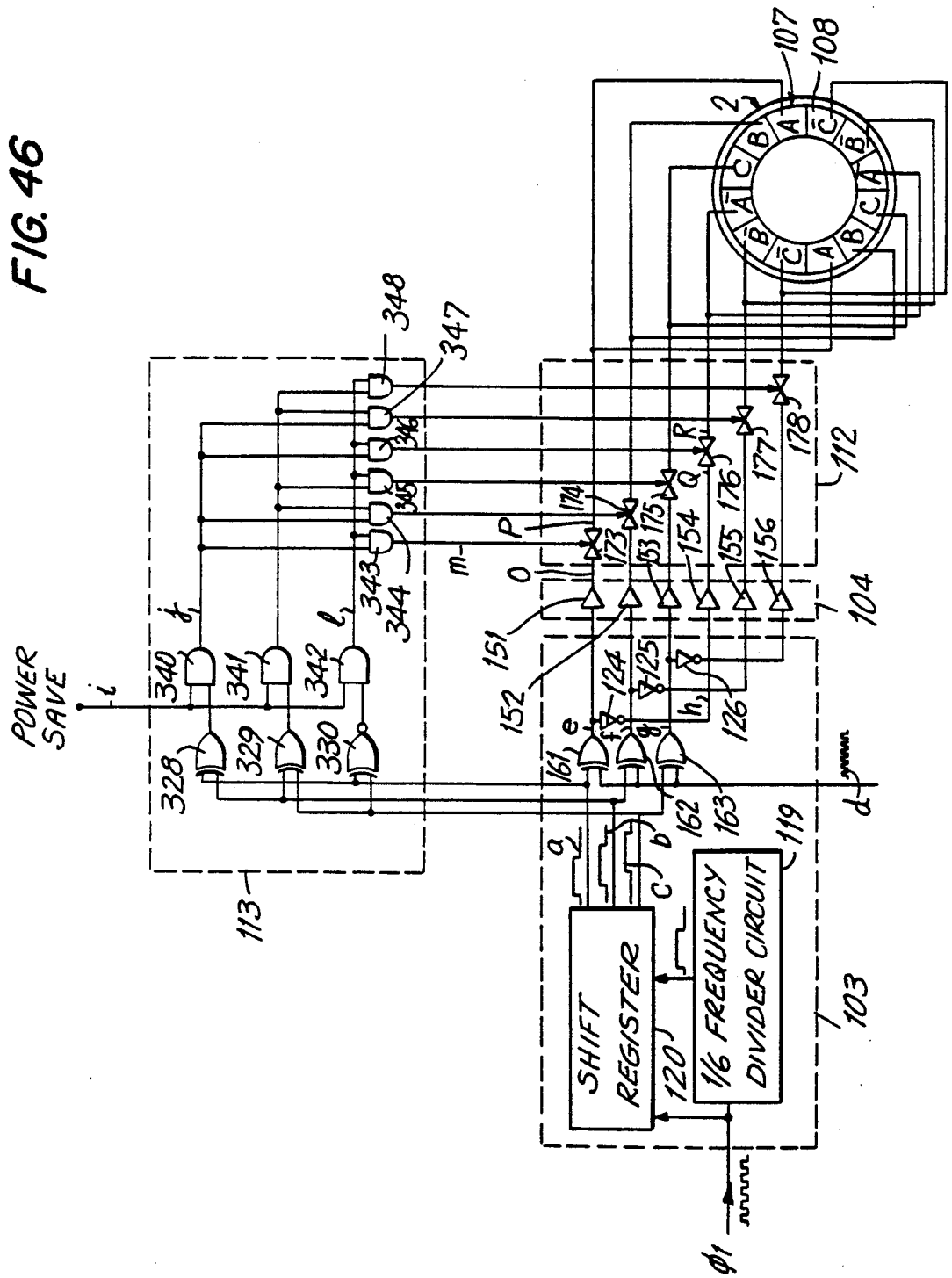
FIG. 46 is a combination block and circuit diagram of a drive control unit in accordance with still another alternative embodiment of the invention.

FIG. 46 is a combination block and circuit diagram of a drive control unit in accordance with still another alternative embodiment of the invention. This embodiment differs from the embodiment of FIG. 44 in that the drive voltages are applied only to vibrators positioned at the antinode portions of stator 2 during each vibration mode. Drive control circuit 113 now also includes AND gates 343-348 as compared to drive control circuit 113 of FIG. 44.

Figure 47:
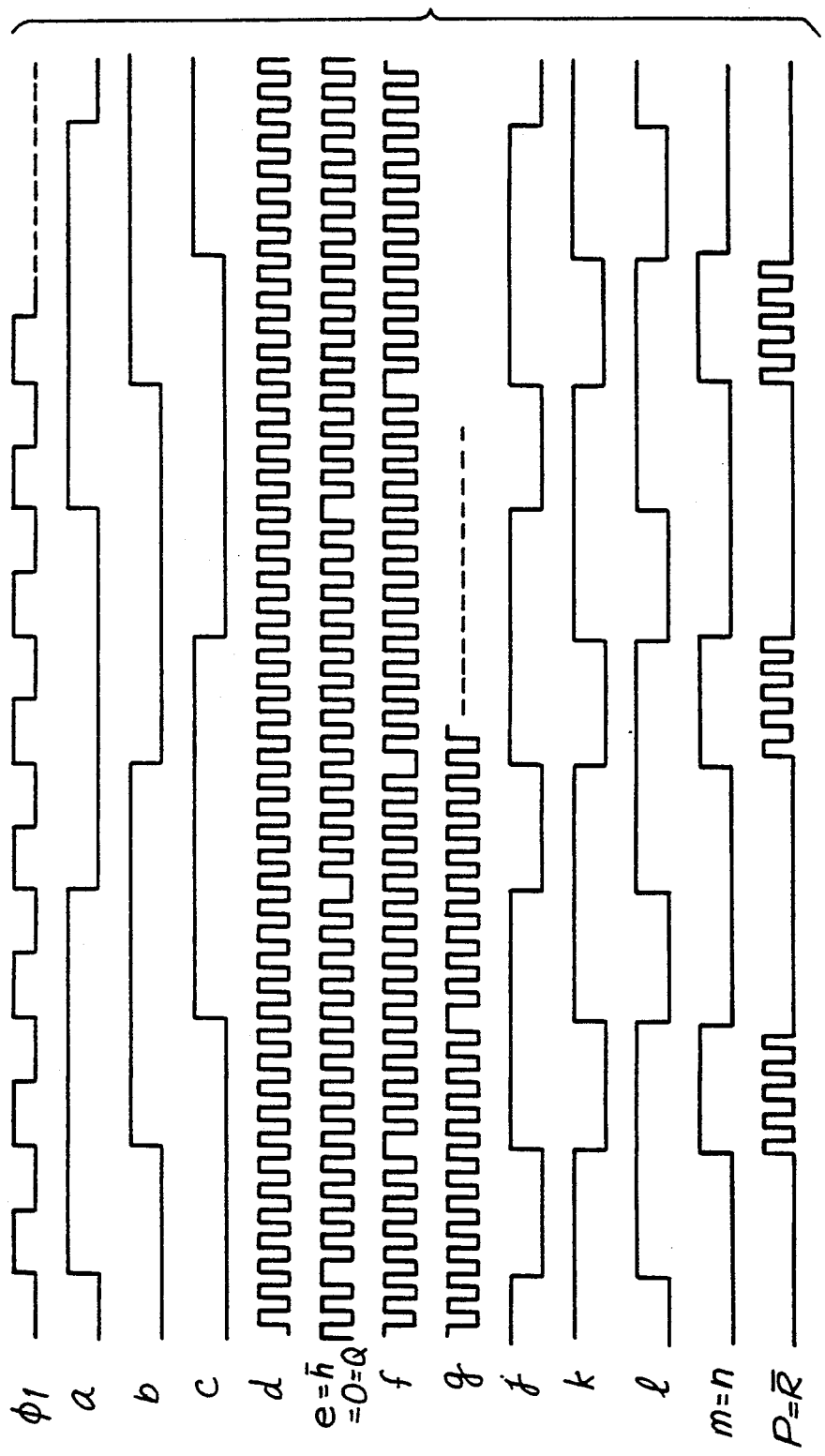
FIG. 47 is a timing chart of the signals supplied to and produced by the drive control unit of FIG. 46.

FIG. 47 illustrates the signals received and produced by the drive control unit of FIG. 46. AND circuit 343 receives output j of AND circuit 340 and output λ of AND circuit 342. When output signal m occurs, the driving voltage p is applied to vibrators A and the driving voltage R is applied to vibrators so as to produce the antinodes in stator 2. The occurrence of output signal m supplied as a gate signal to the transmission gate 173 corresponds to the central waveform portion of signal a as shown in FIG. 47 and application of the driving voltages to the central portions of vibrators A and $\overline{A}$. Driving voltages are similarly applied for only a limited time interval to vibrators B, $\overline{B}$, C and $\overline{C}$ in producing the antinodes associated with each vibrator.

The embodiments of FIGS. 44 and 46 are designed to selectively interrupt application of driving voltages to corresponding vibrators. A reduction in the power level and output torque results. Power consumption by the drive control unit is increased in proportion to the number of vibrators driven.

As can be readily appreciated, the number of vibrator positions for providing a desired vibration mode are limited. A vibration mode, however, can be achieved by driving one or more vibrators. For example, a vibration mode can be produced by driving in opposite phase relation vibrators A, B and C relative to vibrators $\overline{A}$, $\overline{B}$ and $\overline{C}$, respectively. Vibrator pairs A, C and $\overline{A}$, $\overline{C}$ as shown in FIG. 44 or B, B and $\overline{B},\overline{B}$ can be driven simultaneously. The same vibration mode also can be produced by driving each of the vibrators at different times. For example, vibrators A and C can be driven at different times. Similarly, only one of the grouped vibrators B, $\overline{B}$; A, B; or A, B, C need be driven at one time. It can therefore be readily appreciated that in accordance with the invention a number of different combinations of vibrators which can be driven at one time can be used to achieve a desired vibration mode; it being understood that the different combinations is not limited to those combinations disclosed in the embodiments described herein.

Figure 48:
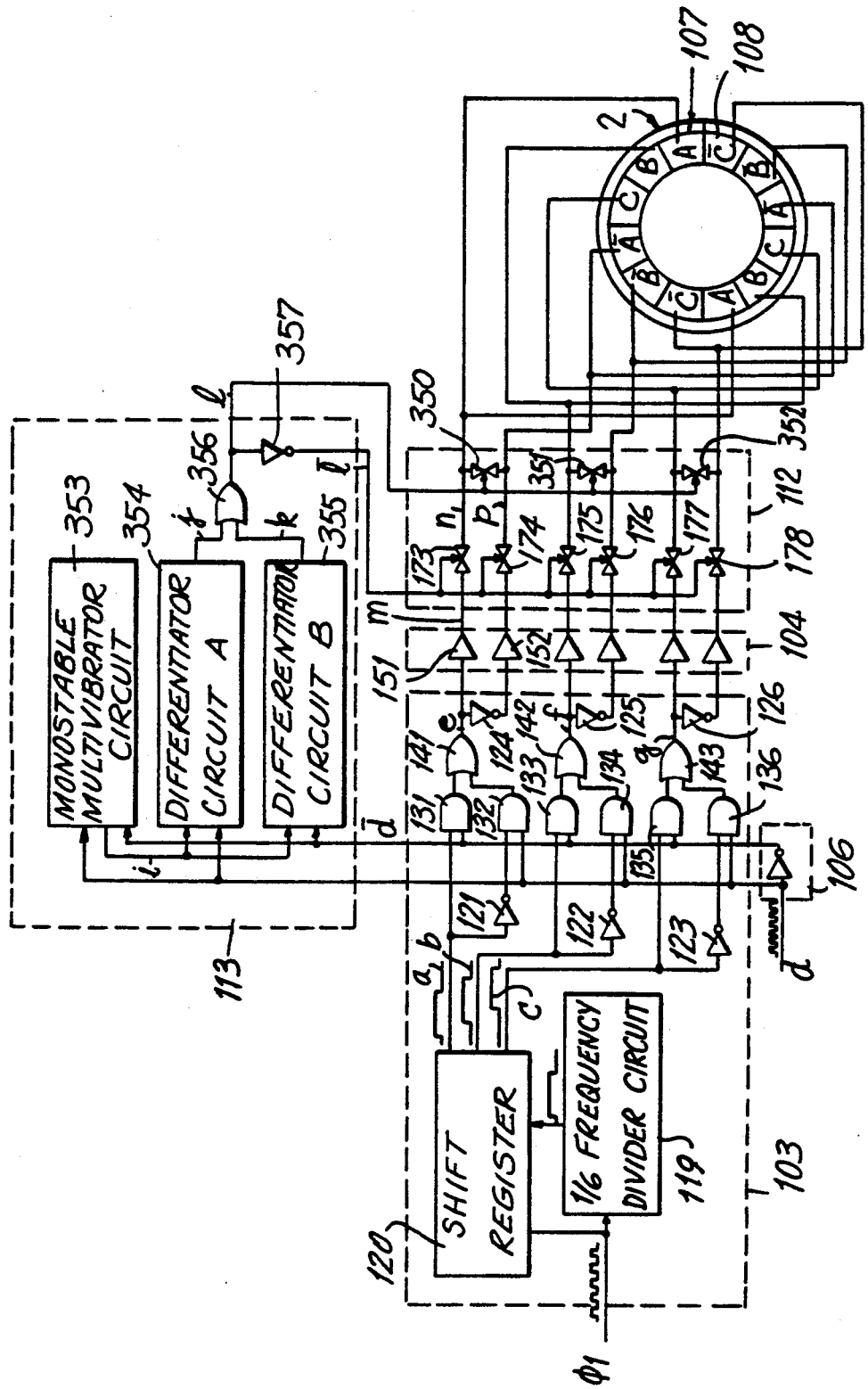
FIG. 48 is a combination block and circuit diagram of a drive control unit in accordance with another alternative embodiment of the invention.

FIG. 48 is a block and circuit diagram of a drive control unit in accordance with still another alternative embodiment of the invention in which pairs of vibrators of opposite phase are short circuited to transfer their charges. Such short circuiting occurs when the phases of the driving voltages is to be reversed thereby reducing power consumption.

In FIG. 48, control circuit 103 is the same as described in connection with FIG. 16. Power save circuit 112 includes transmission gates 173-178 and 350-352. Drive control circuit 113 includes a monostable multivibrator circuit 353, a pair of differentiator circuits 354 and 355, an OR gate 356 and an inverter 357.

Figure 49:
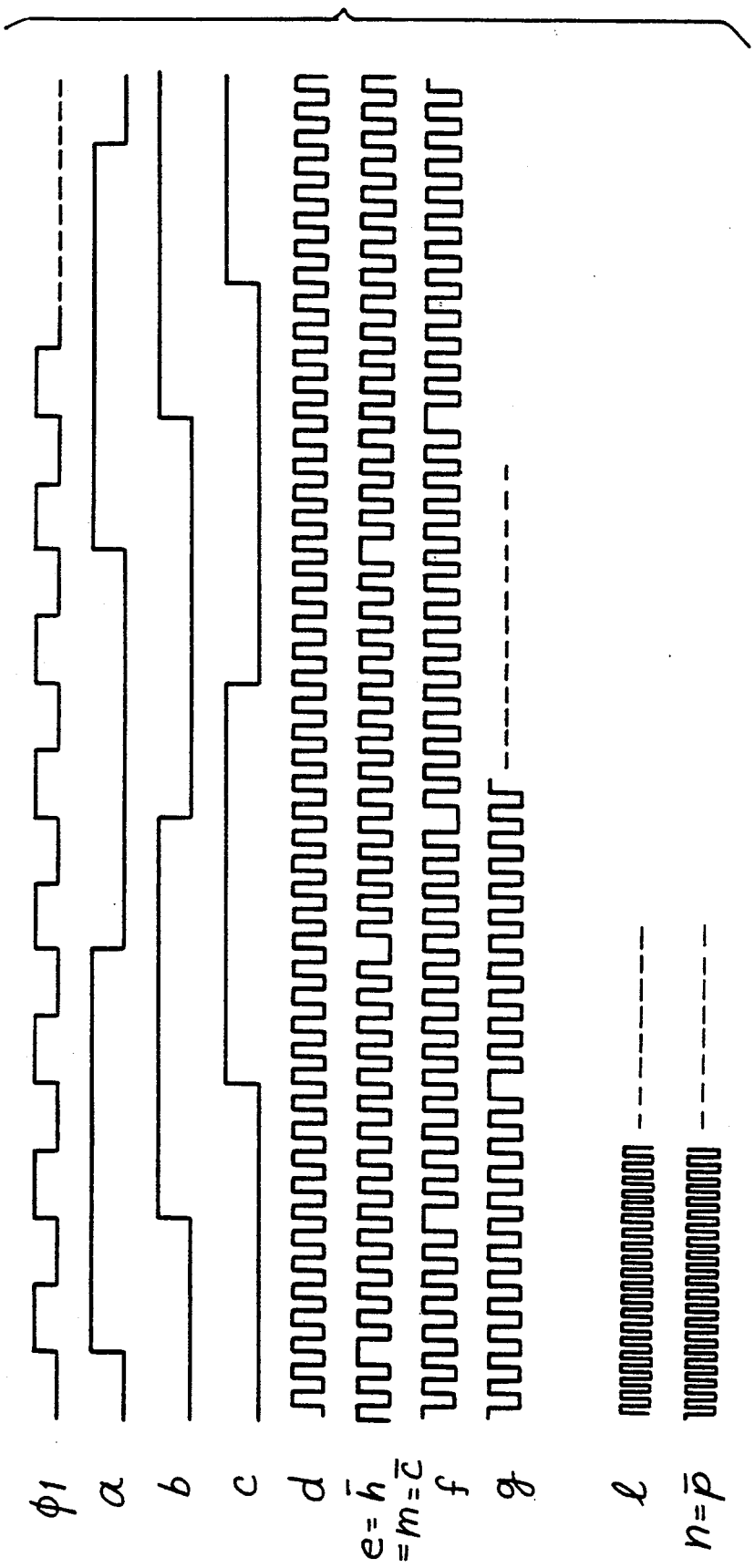
FIG. 49 is a timing chart of signals supplied to and produced by the drive control unit of FIG. 48.
Figure 50:
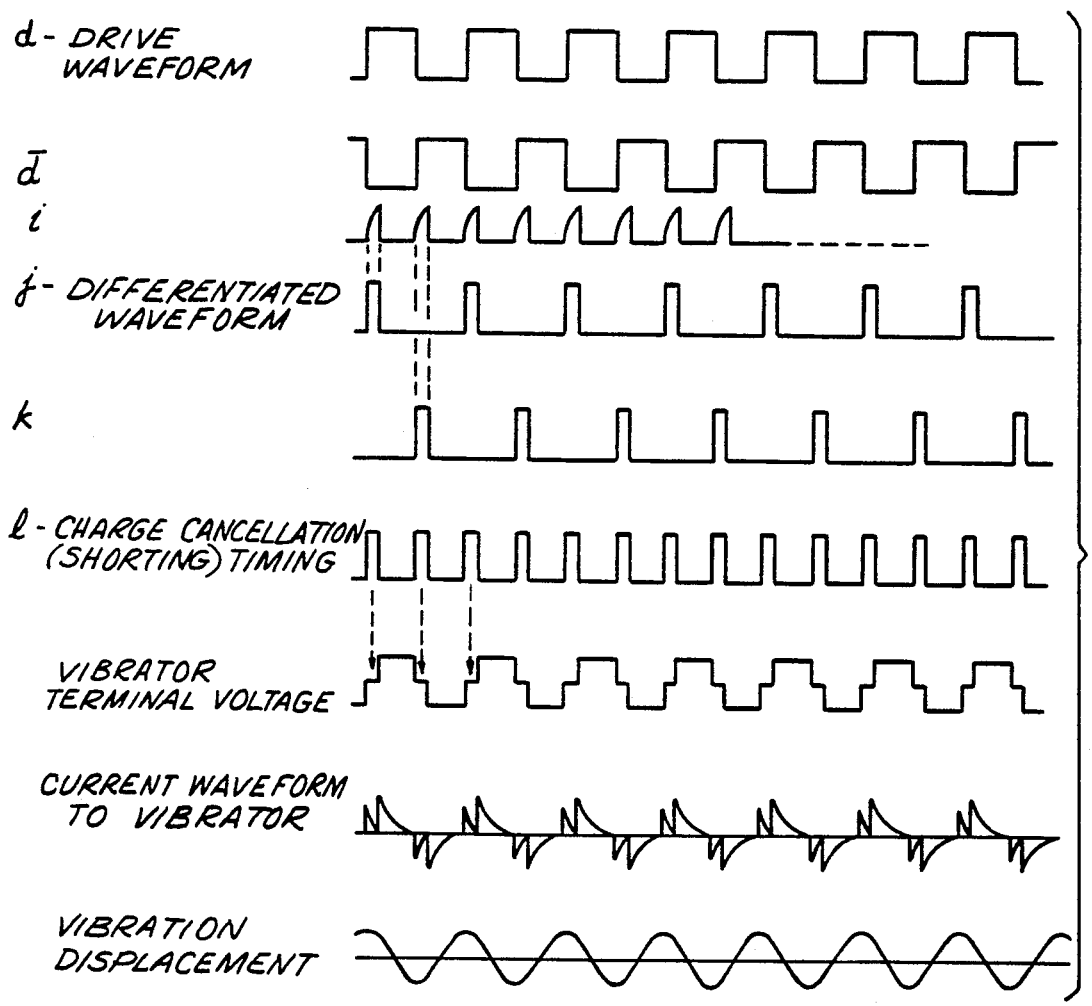
FIG. 50 is a timing chart of additional signals supplied to and produced by the drive control unit and of the vibratory displacement by the stator of FIG. 48.

FIGS. 49 and 50 are timing charts illustrating the signals supplied to and produced and the vibratory displacement of stator 2 caused by the drive control unit of FIG. 48. Control circuit 103 receives control signal $\phi_1$ and oscillation signal d and produces phase-controlled drive control signals e, f, g, ... in the same manner as discussed above in connection with FIG. 46. Monostable multivibrator circuit 353 of drive control circuit 113 receives oscillation signal d and output signal $\overline{d}$ of phase inverting circuit 106 and produces pulse signals i. Pulse signals i serve as input signals applied to differentiator circuits 354 and 355. Oscillation signal d is also applied to differentiator circuit 354 to generate a differentiated signal j. Inverted signal $\overline{d}$ is also applied to differentiator circuit 355 to generate a differentiated signal k.

Signals i and j are applied to OR gate 356 which in turn generates a gate control signal λ. The leading edge of gate control signal 1 occurs at the same time as the leading edge or the falling edge of oscillation signal d. Gate control signal λ is applied to transmission gates 350-352. Accordingly, each pair of vibrators A and $\overline{A}$, B and $\overline{B}$ and C and $\overline{C}$ are short-circuited. Transfer of charges from one vibrator to the other vibrator within the same pair of vibrators during phase reversal of these vibrators results.

Gate control signal λ is also supplied to transmission 173-178 through inverter 357. Therefore, when short gates circuiting of the vibrators occurs, transmission gates 173-178 are closed interrupting the application of driving voltages from driver 104 to vibrators 108.

When gate control signal λ is not at a H logic level (i.e., elapse of short-circuiting period) but rather assumes a L logic level, transmission gates 173-178 open and transmission gates 350-352 close. The driving voltages are now applied to vibrators 108. Terminal voltages, current waveforms and vibration displacement of one of the plurality of vibrators 108 are shown in FIGS. 49 and 50.

Figure 51:
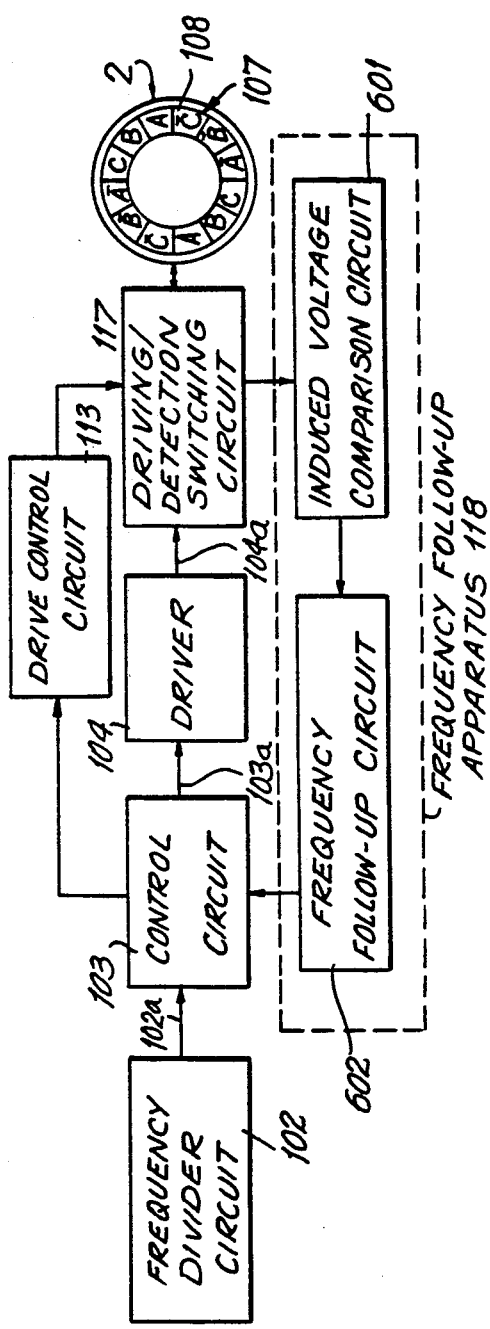
FIG. 51 is a block diagram of a drive control unit for an ultrasonic step motor in accordance with a further alternative embodiment of the invention.

FIG. 51 is a block diagram of a drive control unit in accordance with still another alternative embodiment of the invention in which adjustments are made to oscillation signal d to achieve maximum induced voltage. The drive control unit in accordance with this embodiment of the invention now also includes a driving/detection switching circuit 117 and a frequency follow-up apparatus 118. Frequency follow-up apparatus 118 includes an induced voltage comparison circuit 601 and a frequency follow-up circuit 602. Switching between applying a driving voltage to vibrator 108 and detection of the induced voltage in vibrator 108 is accomplished by driving/detection switching circuit 117.

The induced voltage is compared with a given reference voltage in induced voltage comparison circuit 601. The oscillation frequency of frequency follow-up circuit 602 is based on this comparison. Since the induced voltage increases to a maximum value when the vibrator is at its resonant frequency, the oscillation frequency and therefore the frequency of the driving voltage is adjusted to the resonant frequency of the vibrator. Stator 2 vibrates at a resonant frequency which is the same as the resonant frequency of each vibrator. Therefore by adjusting the induced voltage to a maximum level, efficient vibratory motion of stator 2 will be achieved.

Figure 52:
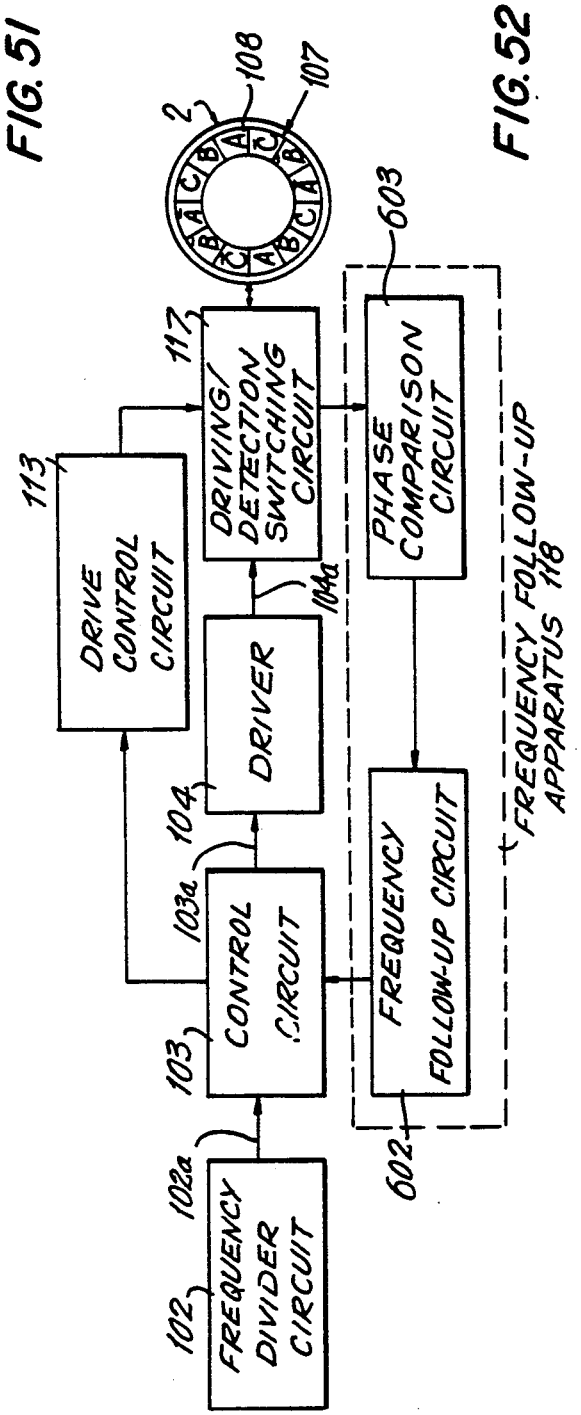
FIG. 52 is a block diagram of a drive control unit for an ultrasonic step motor in accordance with still another alternative embodiment of the invention.

FIG. 52 is a block diagram of a drive control unit in accordance with still another alternative embodiment of the invention. In this embodiment, frequency follow-up apparatus 118 includes a phase comparison circuit 603 and frequency follow-up circuit 602. The oscillation frequency and therefore the frequency of the driving voltages are adjusted to obtain a phase difference between the driving voltage and detected induced voltage of approximately 90°. When the phase difference is 90°, stator 2 is vibrating at its resonant frequency.

Figure 53:
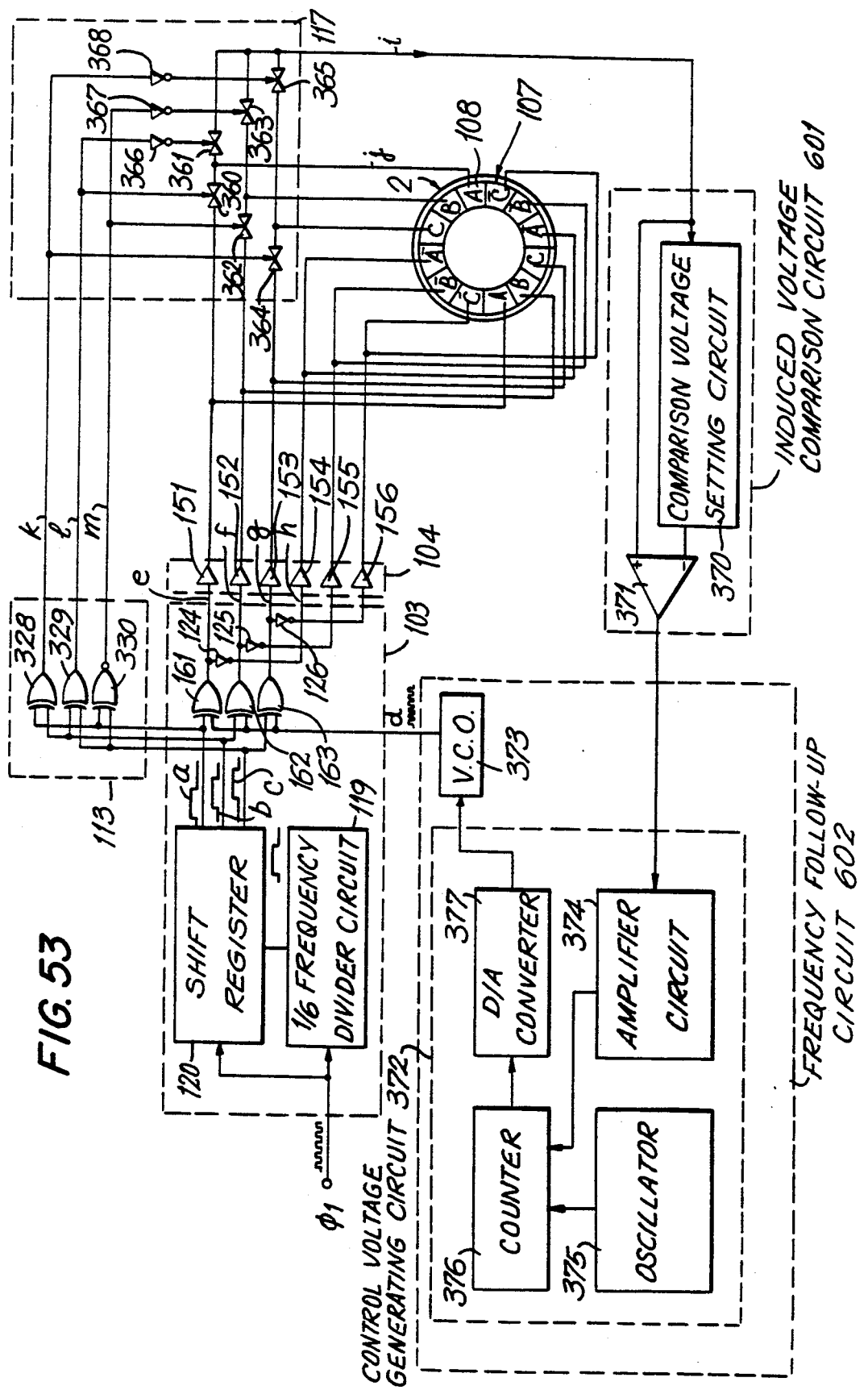
FIG. 53 is a combination circuit and block diagram for the drive control unit of FIG. 51 in accordance with another alternative embodiment of the invention.

FIG. 53 is a combination block and circuit diagram in accordance with the embodiment of FIG. 51. Driving/detection switching circuit 117 includes a plurality of transmission gates 360-365 and a plurality of inverters 366-368. Drive control circuit 113 includes a pair of exclusive OR circuits 328 and 329 and an exclusive NOR circuit 330. Induced voltage comparison circuit 601 includes a comparison voltage setting circuit 370 and a subtractor 371. Comparison voltage setting circuit 370 sequentially stores the peak voltage (e.g., maximum induced voltage) of the preceding period. Frequency follow-up circuit 602 includes a control voltage generating circuit 372 and an oscillator 373. Control voltage generating circuit 372 includes an amplifier circuit 374, an oscillator 375, a counter 376 and a digital to analog (D/A) converter 377.

The driving control unit of FIG. 53 provides one-step (30°) per second driving of an ultrasonic step motor having a 2λ vibration mode of 12-division/steps per rotation.

Figure 54:
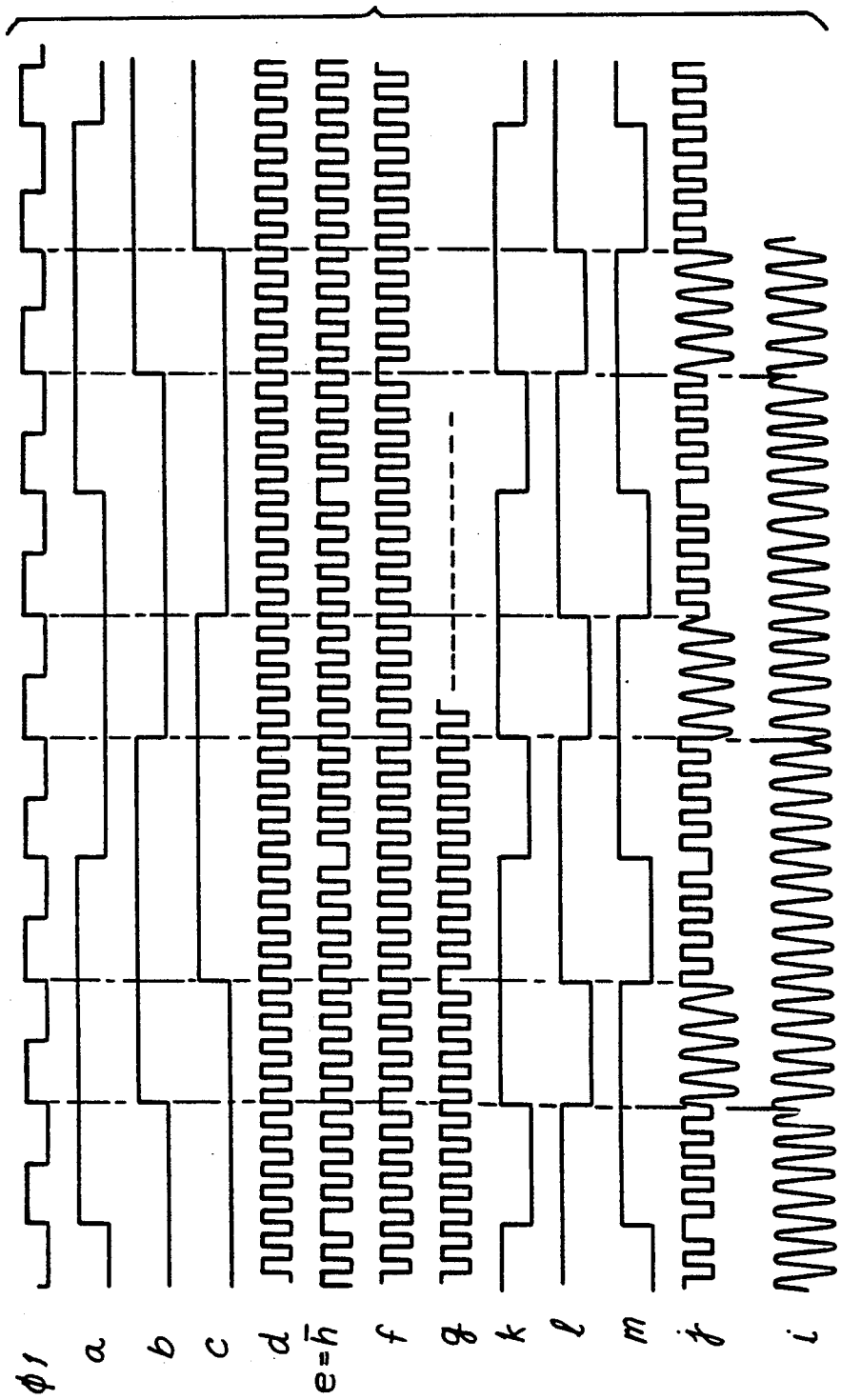
FIG. 54 is a timing chart of the signals supplied to and produced by the drive control unit of FIG. 53.

FIG. 54 is a timing chart showing the operation of FIG. 53. Drive control circuit 113 receives output signals a, b, and c of shift register 120 producing signals k, 1, and m, respectively. Signals k, 1, and m are applied as gate signals to transmission gates 364, 360 and 362 and are gate signals to the transmission gates 365, 361 and 363 through inverters 368, 366 and 367, respectively. As shown in FIG. 54, signals k, 1 and m assume a H logic level for 2 seconds of a period (e.g., a step) and then assume a L logic level for the remaining 1 second of the period. Therefore, for the first 2 seconds, transmission gates 360, 362 and 364 are open and driving voltages are applied to vibrators 108. During the remaining 1 second, transmission gates 361, 363 and 365 are open permitting detection of the induced voltages as vibrators 108 vibrate. The induced voltages are detected, for example, from terminal voltage j of vibrator A. The induced voltage is detected during the time interval corresponding to the central waveform portion of signal a, that is, during the central waveform period applied to a vibrator which produces an antinode in stator 2.

Subtractor 371 of induced voltage comparison circuit 601 determines the difference between the peak voltage of the preceding period and the induced voltage resulting from opening transmission gates 361, 363 and 365. The difference signal is supplied to frequency follow-up circuit 602 where it is amplified by amplifier circuit 74 and applied to counter 376.

Counter 376 counts oscillation signals (e.g., pulses) from oscillator 375. When the induced voltage reaches a maximum value and the difference signal is 0, counter 376 stops counting. The output of counter 376 is converted to an analog signal by D/A converter 377 and then supplied as a control signal to oscillator 373. Oscillator 373, which is preferably a voltage controlled type oscillator, produces an oscillation signal d having an oscillation frequency corresponding to the control signal. Oscillation signal d and therefore the driving voltages are at the resonant frequency of stator 2 and vibrators 108 and are applied to vibrators 108. Vibrators 108 are therefore efficiently driven.

Figure 55:
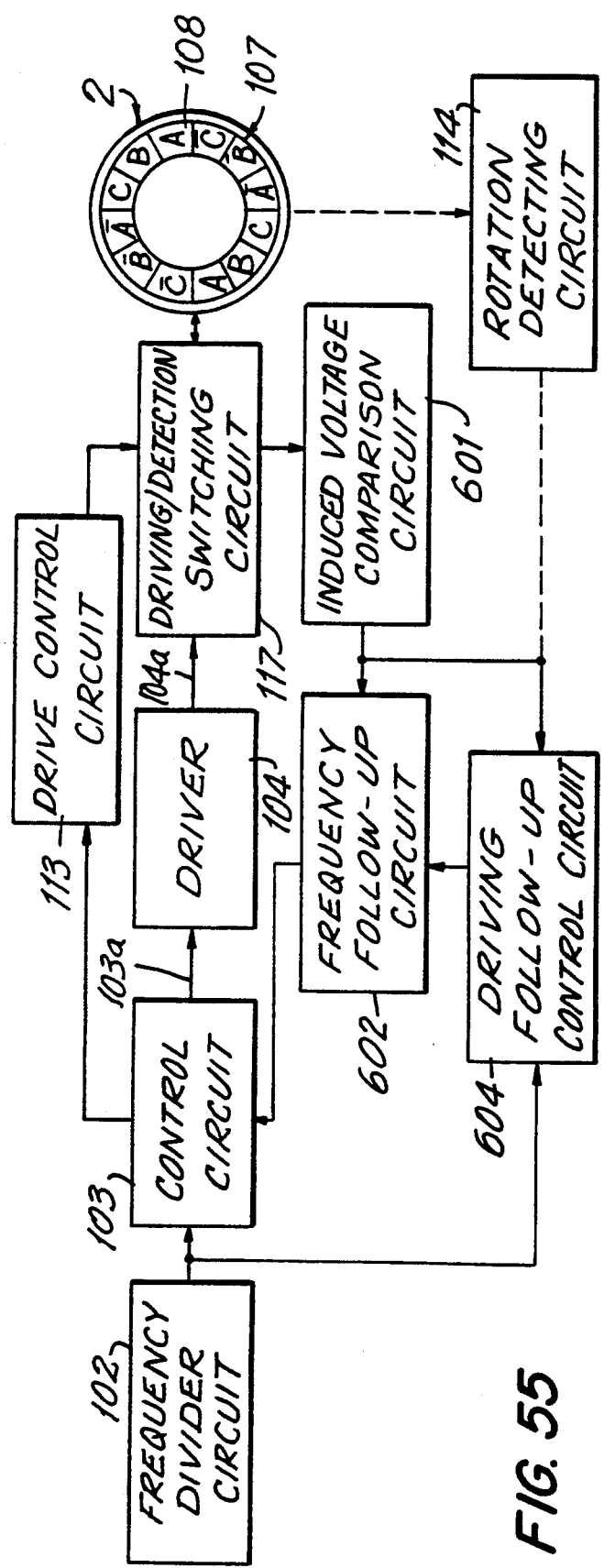
FIG. 55 is a block diagram of a drive control unit for an ultrasonic step motor in accordance with yet another alternative embodiment of the invention.

FIG. 55 is a circuit diagram of a drive control unit for an ultrasonic step motor in accordance with still another alternative embodiment of the invention. Since the induced voltages of the vibrators vary in magnitude during rotation, a complete revolution of rotor 1 is first detected by a rotation detecting device (e.g. an encoder) followed by frequency correction to the driving voltages.

As shown in FIG. 55, a rotation detecting device 114 is mechanically connected to rotor 1. In response to the output of rotation detecting device 114, a driving follow-up control circuit 604 initiates operation of frequency follow-up circuit 602.

Figure 56:
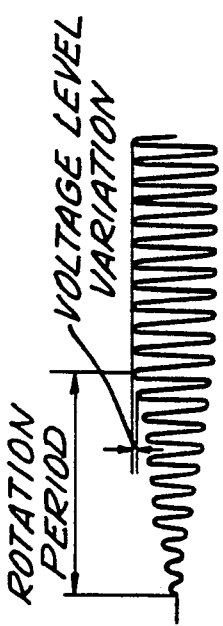
FIG. 56 is a timing chart of the voltage induced in a vibrator of FIG. 55.

FIG. 56 is a timing chart of the induced voltage in vibrator 108. When rotation of rotor 1 begins, an induced voltage is generated. After rotor 1 has rotated one step, the induced voltage no longer varies and remains constant. After confirming that rotor 1 has moved one step based on the rotation output of rotation detecting device 114, driving follow-up control circuit 604 drives frequency follow-up circuit 602. The drive control unit of FIG. 55 otherwise operates in the same manner as the drive control unit of FIG. 53.

Figure 57:
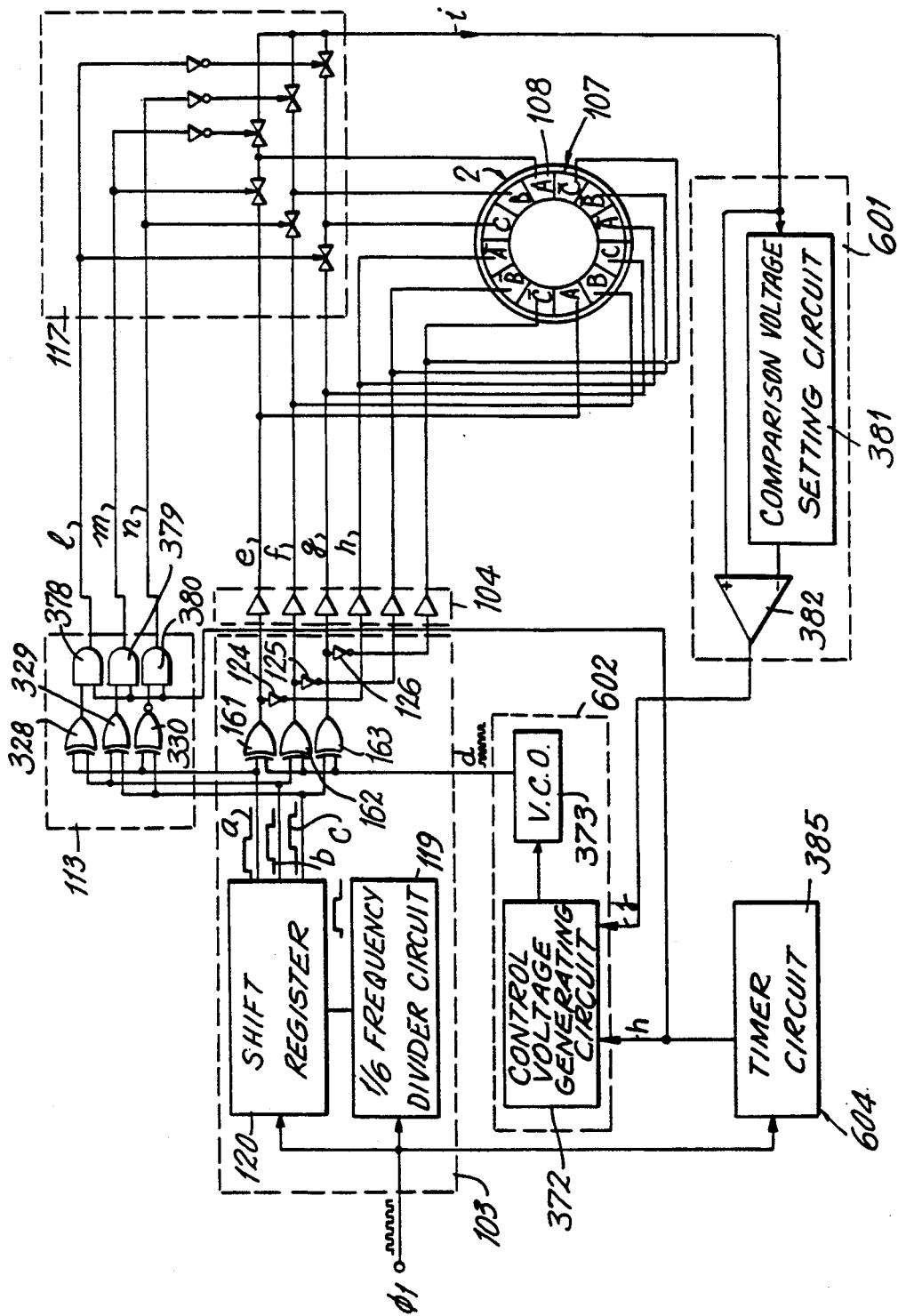
FIGS. 57, 59, 61, 63 and 65 are combination block and circuit diagrams of drive control units for ultrasonic step motor in accordance with additional alternative embodiments of the invention.

FIG. 57 is a circuit diagram of a drive control apparatus for a surface driven stepping motor in accordance with yet another alternative embodiment of the invention. This embodiment differs from the previous embodiment in that frequency follow-up circuit 602 is driven at intervals during a predetermined time period. A timer circuit 385 serving as the driving follow-up control circuit 604 receives control signal $\phi_1$. Frequency follow-up operation occurs only at certain intervals of a given time period (e.g., after rotor 1 is considered to have completed moving one step). Drive control circuit 113 includes AND gates 378-380 and exclusive OR circuits 328-330. The output of timer circuit 385 serves as inputs to AND gates 378-380.

Figure 58:
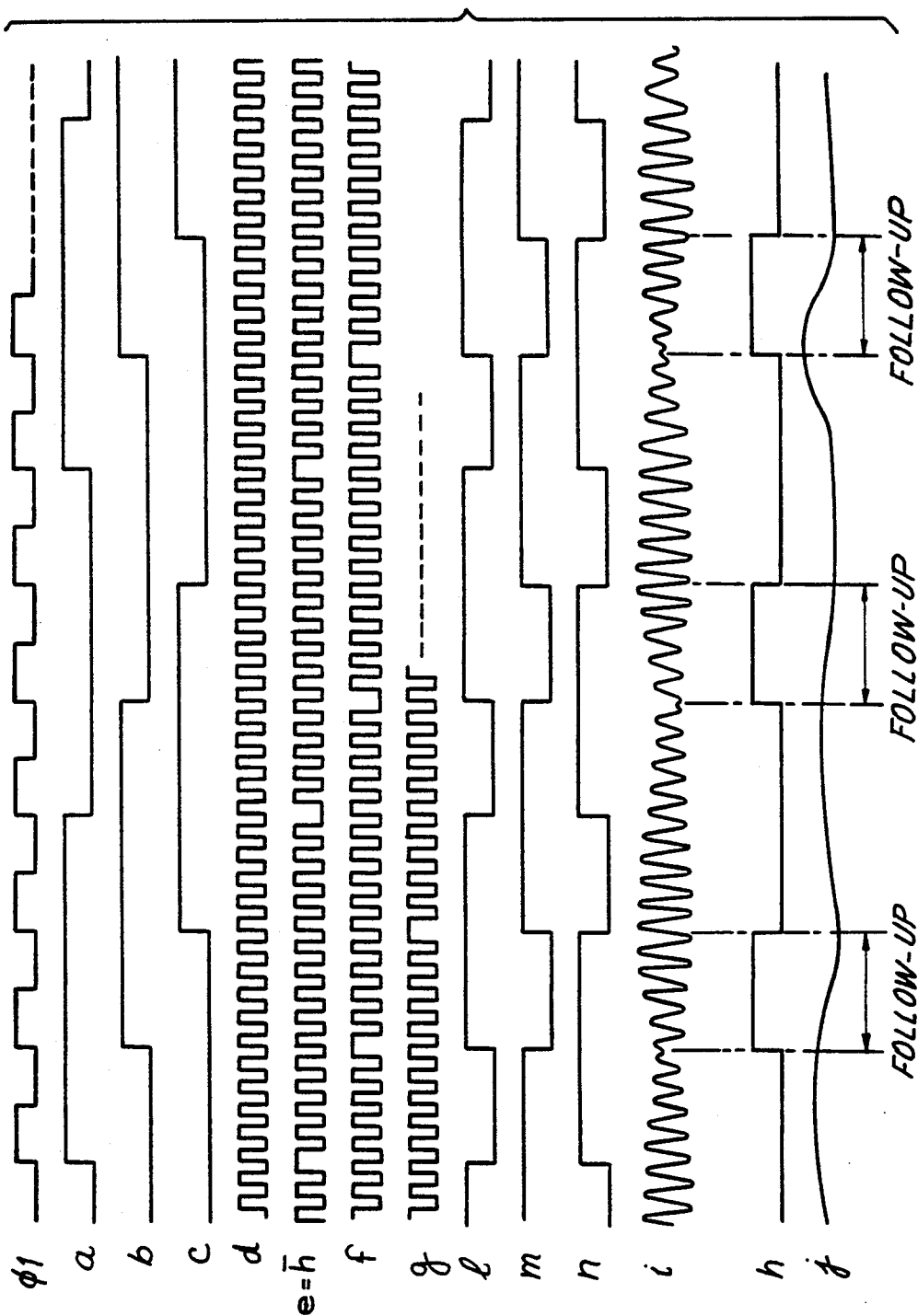
FIGS. 58, 60, 62, 64 and 66 are timing charts of signals supplied to and produced by the drive control units of FIGS. 57, 59, 61, 63 and 65, respectively.

FIG. 58 is a time chart showing the operation of this embodiment of the invention. Frequency follow-up apparatus 602 is driven at intervals of a given time period based on control signal $\phi_1$, that is, for 1 out of every 3 seconds (i.e., out of every 3 steps). Output signal j of induced voltage comparison circuit 601 increases when the induced voltage detected by induced voltage comparison circuit 601 has been reduced from its maximum value. Control voltage generating circuit 372 controls oscillator 373 so as to reduce this difference to zero ("0").

Figure 59:
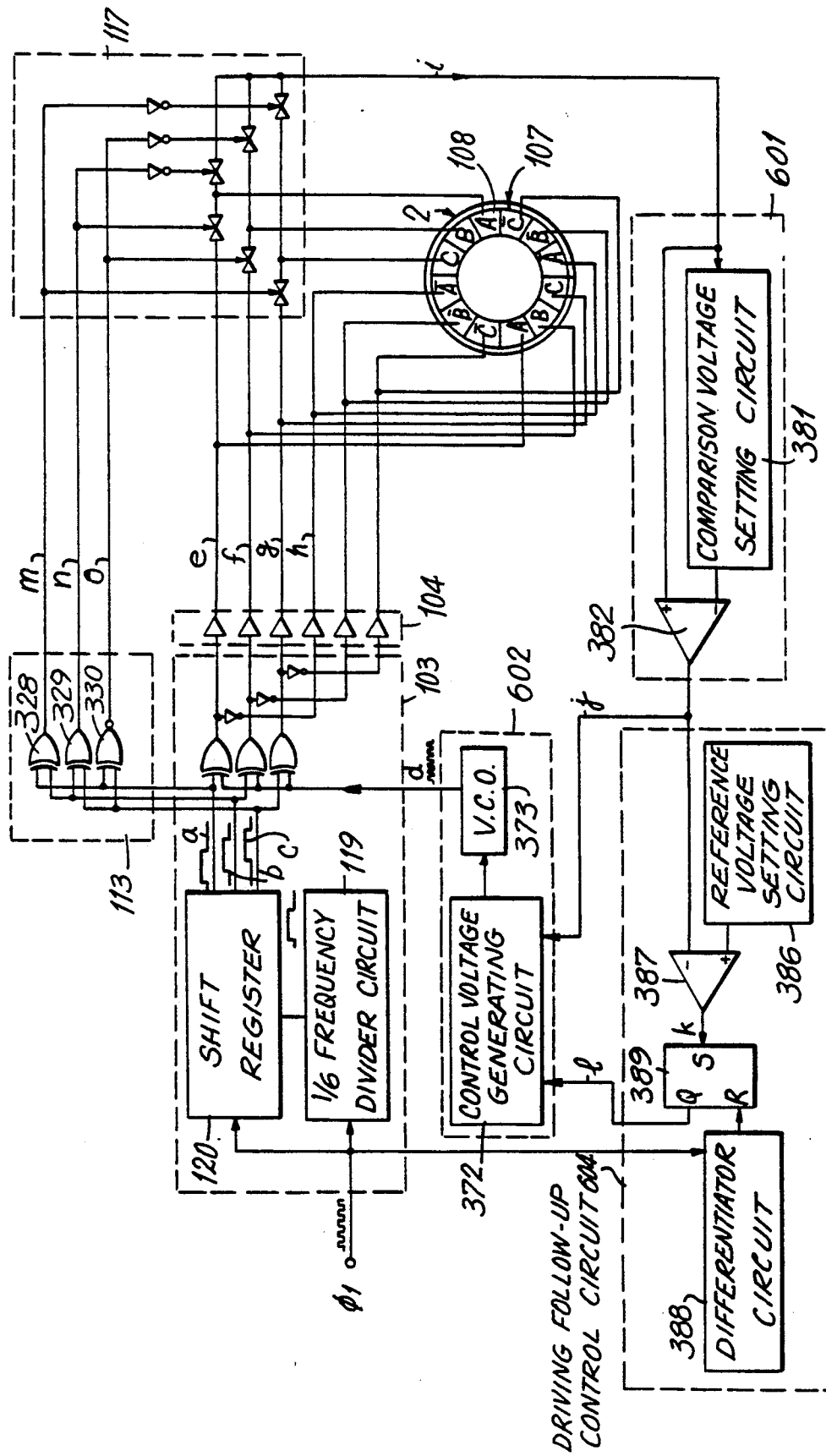

FIG. 59 is a block and circuit diagram showing a drive control apparatus for an ultrasonic step motor in accordance with a further alternative embodiment of the invention. In accordance with this embodiment only after movement of rotor 1 by one step has been determined is control voltage generating circuit 372 driven. Such determination is based on whether the difference between the induced voltage of the preceding period and the current induced voltage has been reduced.

Figure 60:
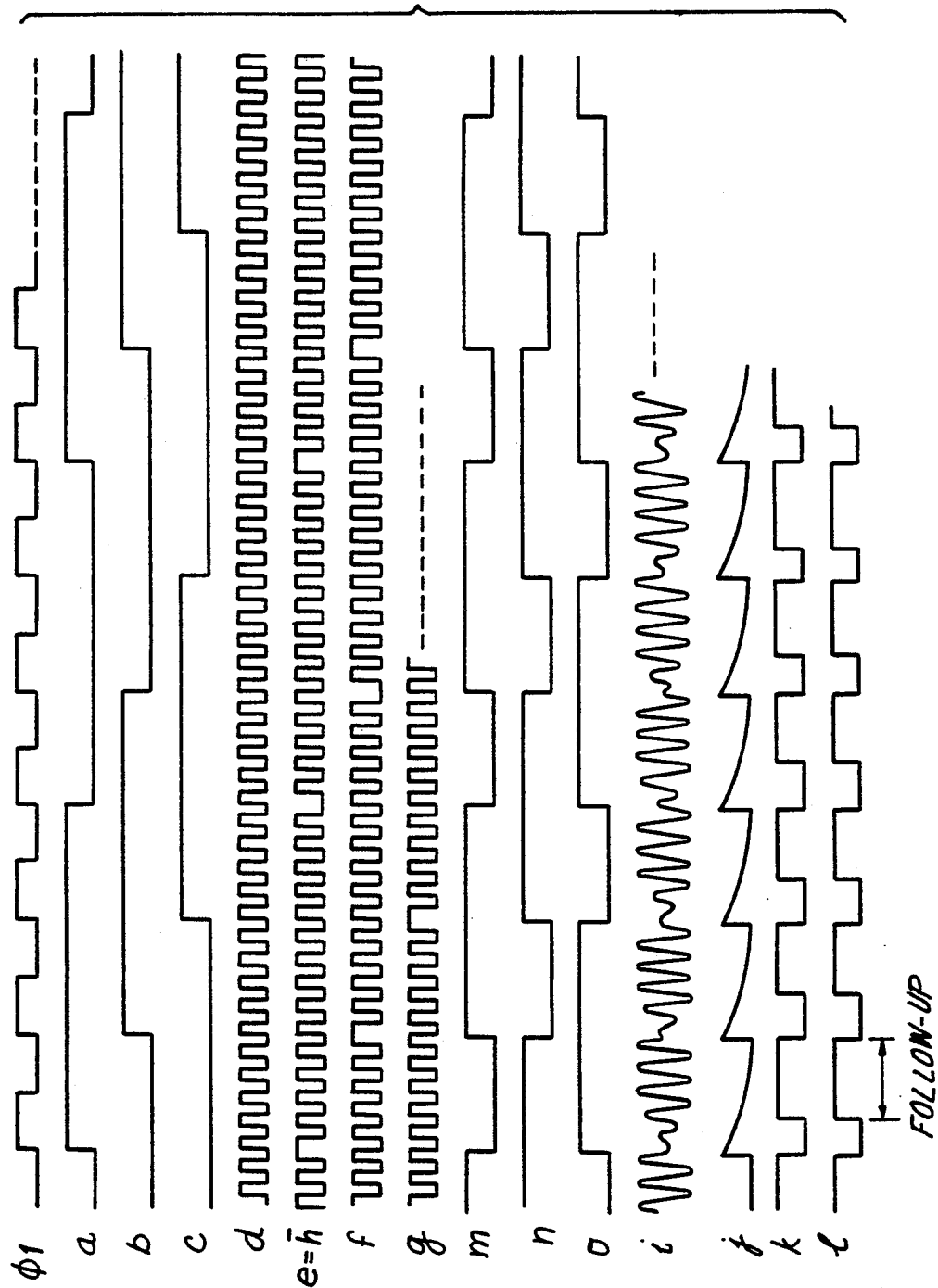

In FIG. 59, driving follow-up control circuit 604 includes a reference voltage setting circuit 386, a comparator circuit 387, a differentiator circuit 388 and a flip-flop circuit 389. FIG. 60 is a timing chart showing the operation of this embodiment. Differentiator circuit 388 differentiates control signal $\phi_1$ and applies this differentiated signal to a reset (R) terminal of flip-flop circuit 389 thereby resetting the Q output of flip-flop circuit 389. Comparator 387 compares the output of induced voltage comparison circuit 601 (i.e., which subtracts the present induced voltage from the previously stored induced voltage) and the voltage of reference voltage setting circuit 386. When the preset voltage is greater, a set signal k is applied to the set (S) terminal of flip-flop circuit 389.

The output of flip-flop circuit 389 assumes a H logic level. Control voltage generating circuit 372 begins the frequency follow-up operation when drive signal λ is at an H logic level. Output signal j of induced voltage comparison circuit 601 is applied as a control signal to control voltage generating circuit 372. The oscillation frequency of oscillator 373 is therefore controlled based on the applied control signal.

Figure 61:
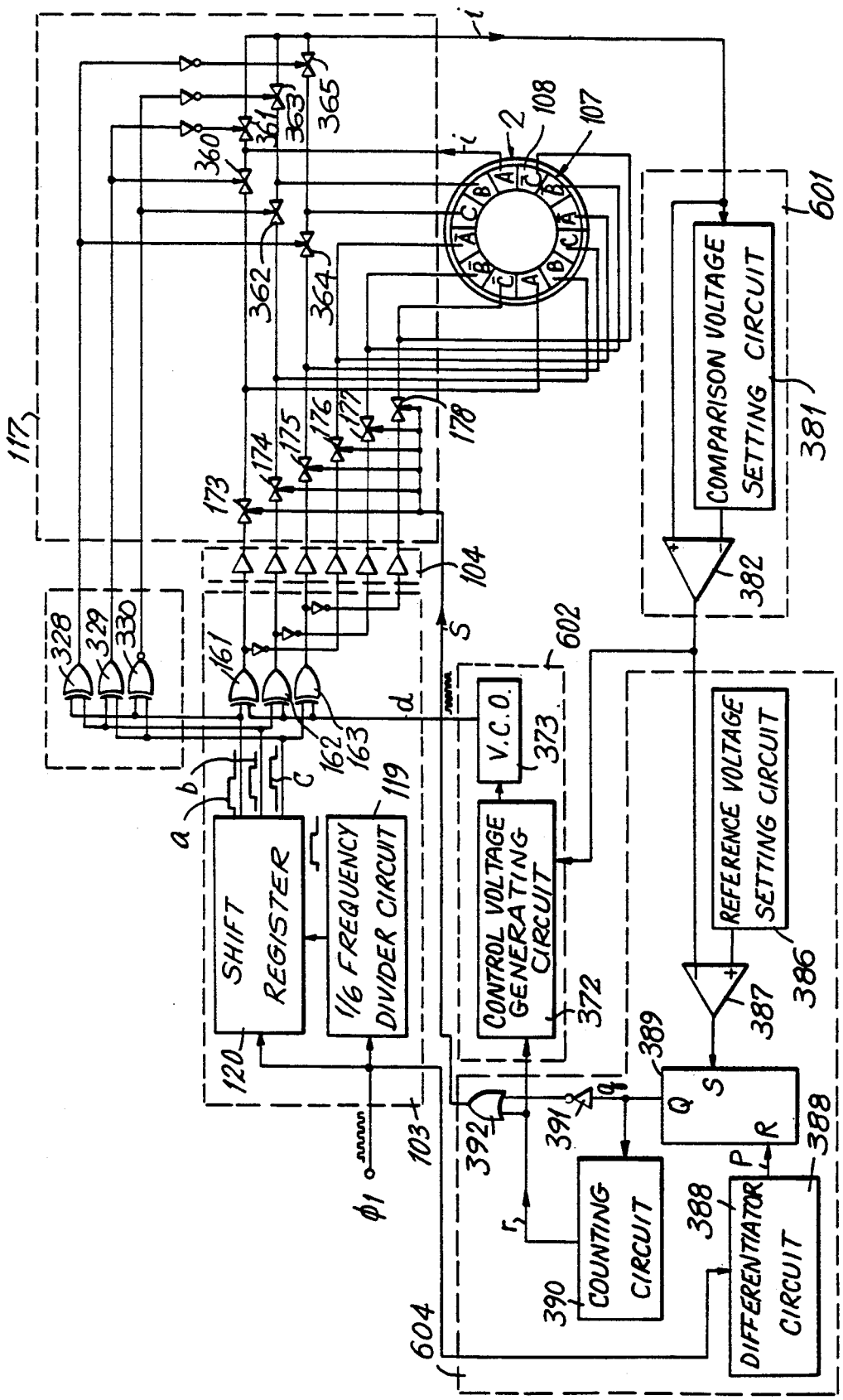
Figure 62:
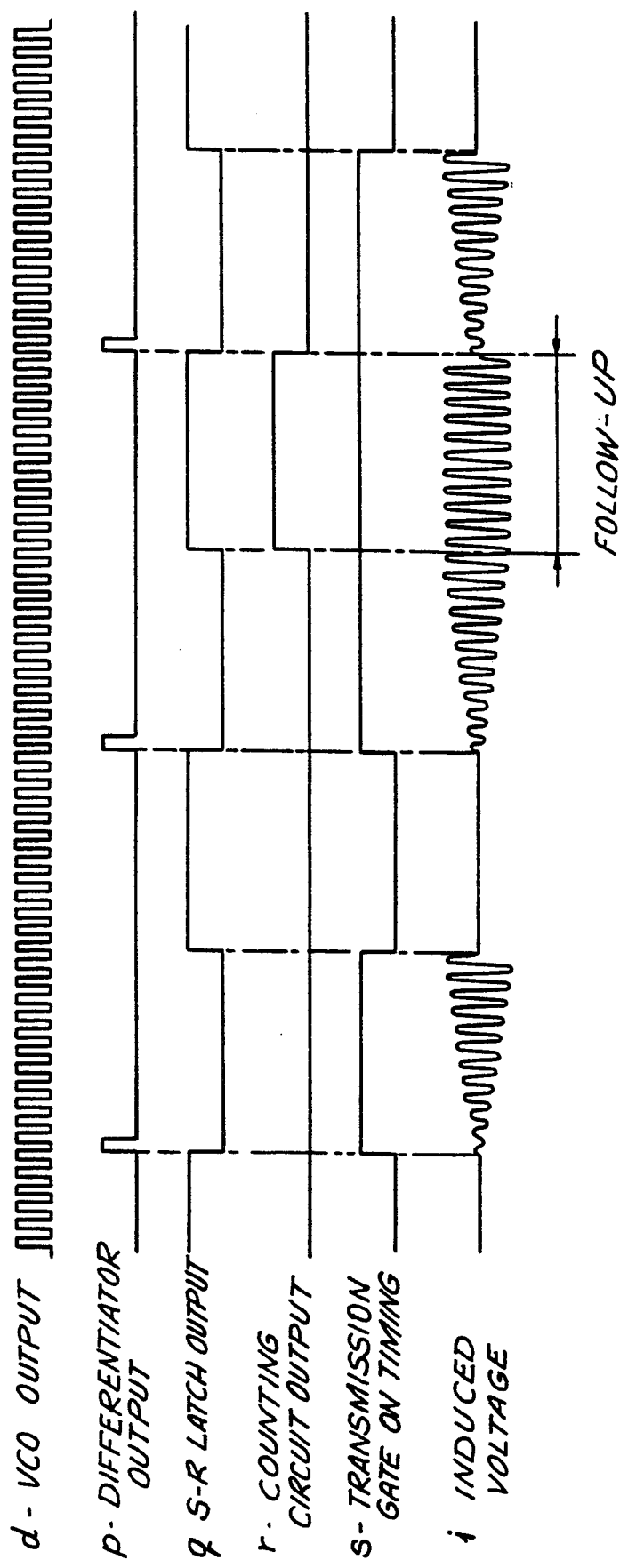

FIG. 61 is a circuit diagram showing the construction of a drive control unit for an ultrasonic step motor in accordance with yet another alternative embodiment of the invention. This embodiment differs from the previous embodiment in that application of the driving voltages is interrupted when it is determined that the rotor 1 has moved one step. Frequency follow-up takes place at a suitable period after rotor 1 has moved one step.

Driving follow-up control circuit 604 includes a reference voltage generating circuit 386, a comparator 387, a differentiator circuit 388, a flip-flop circuit 389, a counting circuit 390, an inverter 391 and an OR gate 392.

Control signal $\phi_1$ is differentiated by differentiator 388 and the resulting differentiated output p is applied to the reset (R) terminal of flip-flop circuit 389. The Q output of flip-flop circuit 389 assumes a L logic level and a gate control signals s is supplied to driving/detection switching circuit 117 through inverter 391 and OR gate 392. Transmission gates 173-178 open and the driving voltages from driver 104 are applied to vibrators 108.

Once rotor 1 rotates so that induced voltage i from one of the plurality of vibrators 108 increases, the output of induced voltage comparison circuit 601 decreases. The output of comparator 387 now assumes a H logic level which is applied as a set signal to the set (S) terminal of flip-flop circuit 389. The Q output of flip-flop 389 assumes a H logic level. Gate control signals s changes from a H logic level to a L logic level. Transmission gates 173-178 close thereby interrupting application of the driving voltages to vibrators 108. In other words, when the induced voltage of vibrators 108 reach a predetermined level, application of the driving voltages is interrupted.

Counting circuit 390 counts the number of H logic levels outputted by flip-flop circuit 389. Once a predetermined value is reached, a H logic level counting output signal is produced by counting circuit 389. The counting output signal is supplied as a gate control signal s to transmission gates 173-178 through OR gate 392 as a drive signal to control voltage generating circuit 372. Control voltage generating circuit 372 controls the oscillation frequency of oscillator 373 in accordance with the output signal of induced voltage comparison circuit 601. Oscillation signal d of oscillator 373 is then applied as driving voltages to vibrators 108 through control circuit 103, driver 104 and transmission gates 173-178. Driving voltages at this oscillation frequency are therefore applied to vibrators 108.

Figure 63:
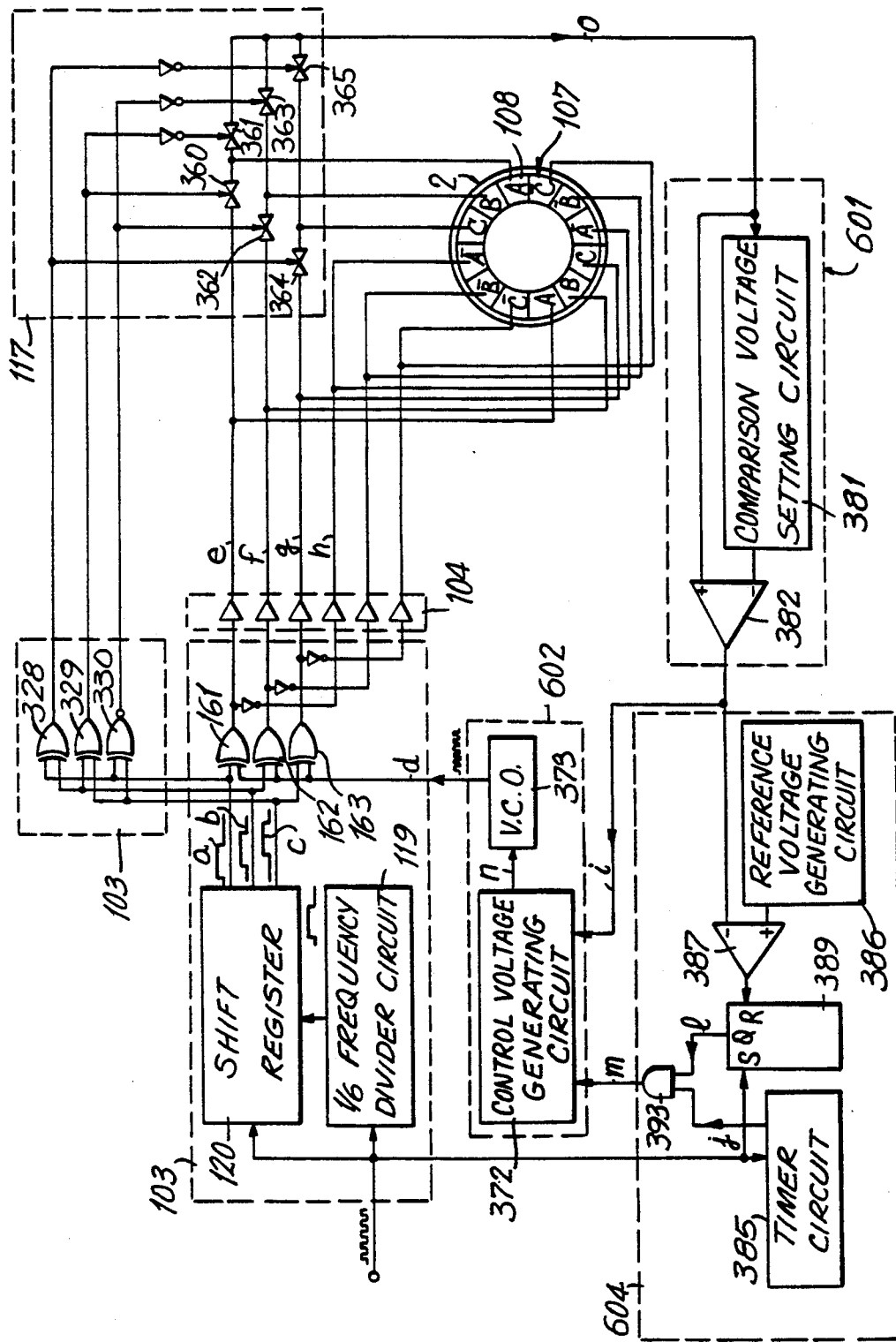

FIG. 63 is a block and circuit diagram of a drive control unit for an ultrasonic step motor in accordance with still another alternative embodiment of the invention. In this embodiment frequency follow-up is initiated if rotation of rotor 1 is not completed within a given period of time. Driving follow-up control circuit 604 includes a reference voltage generating circuit 386, a comparator 387, a timer circuit 385, a flip-flop circuit 389 and an AND gate 393.

Figure 64:
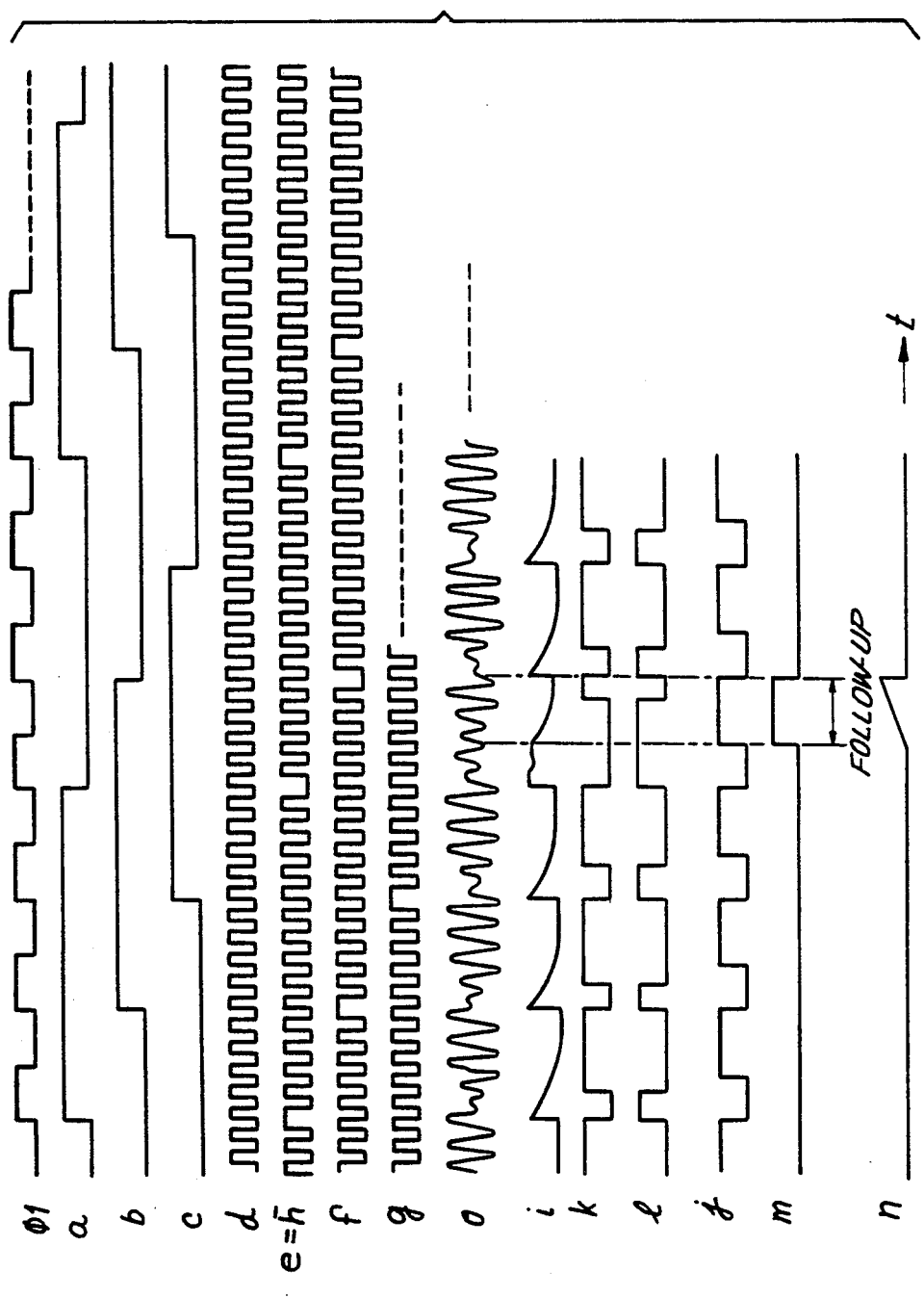

FIG. 64 is a time chart showing operation of the drive control unit of FIG. 63. Flip-flop circuit 389 receives control signal $\phi_1$ at its set (S) terminal and produces output signal λ which assumes a H level. Output signal j of timer circuit 385 is held at a L logic level until the elapse of a predetermined period of time following receipt of a first pulse of control signal $\phi_1$ by timer circuit 385. Output signal m of AND gate 393 remains at a L logic level during this predetermined period of time. As rotor 1 rotates so that the induced voltage reaches a predetermined magnitude, the output signal of comparator 387 assumes a H logic level and is applied to the reset (R) terminal of flip-flop circuit 389. Output signal j of timer circuit 385 then assumes a H logic level. Output signal l now assumes a L logic level and output signal m of AND gate 393 remains at a L logic level. Frequency follow-up operation is therefore not effected.

When the induced voltage, however, does not attain the predetermined magnitude following elapse of the predetermined period of time, output signal j of timer circuit 385 assumes and maintains a H logic level. Output signal l of flip-flop circuit 389 remains at a H logic level. Output signal m of AND gate 393 therefore assumes a H logic level and is applied as a drive signal to control voltage generating circuit 372. Control voltage generating circuit 372 generates a control signal n, based on output signal i of the induced voltage comparison circuit 601, which controls the oscillation frequency of oscillator 373.

Figure 65:
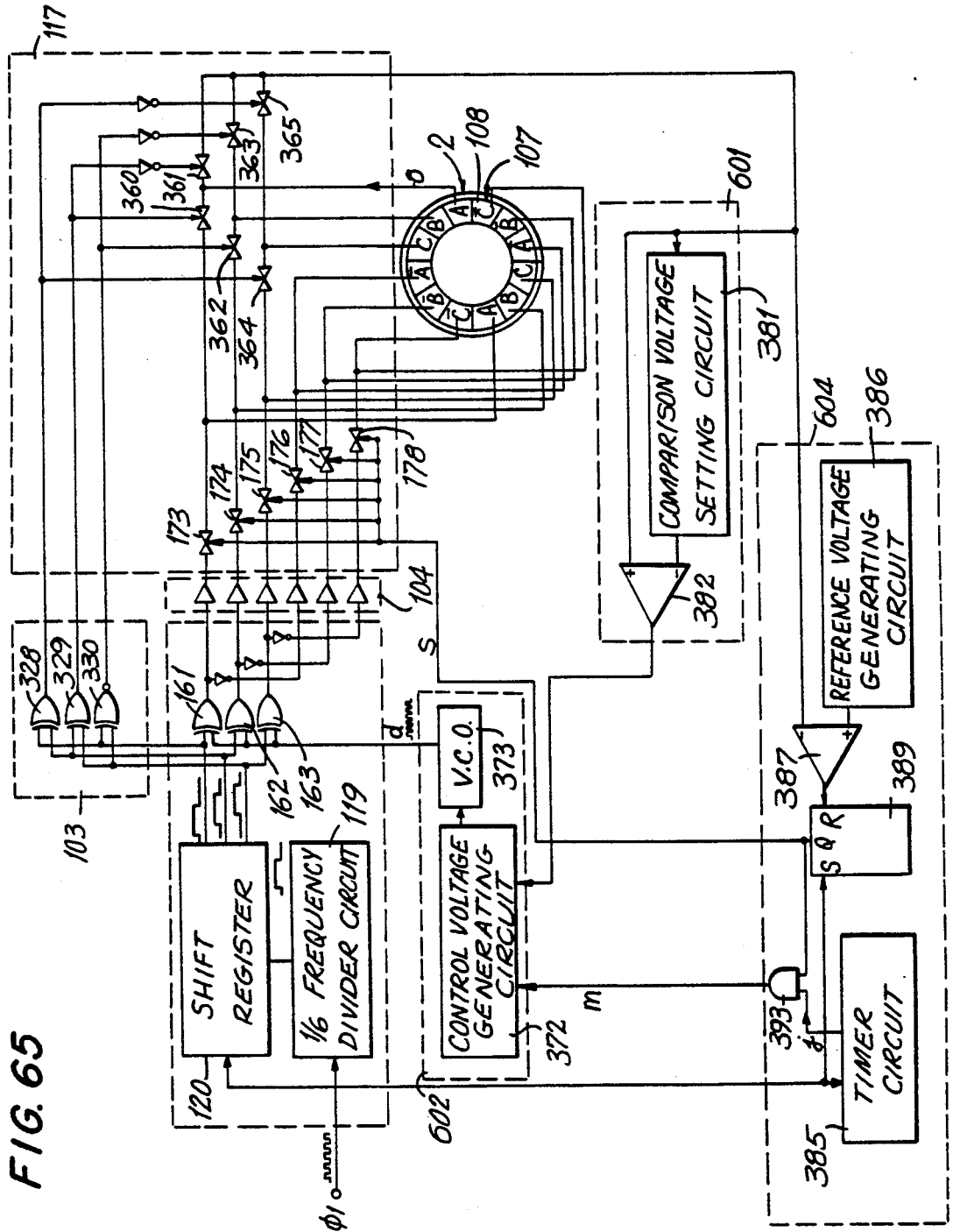

FIG. 65 is a combination block and circuit diagram of a drive control unit for an ultrasonic step motor in accordance with still another alternative embodiment of the invention. In this embodiment when the induced voltage reaches a reference voltage, rotor 1 is considered to have moved one step. Vibrators 108 are no longer driven. When rotor 1 has failed to rotate within a predetermined period of time, the frequency follow-up operation is begun. Driving follow-up control circuit 604 includes a timer circuit 385, a reference voltage generating circuit 386, a comparator 387 and an AND gate 393.

Figure 66:
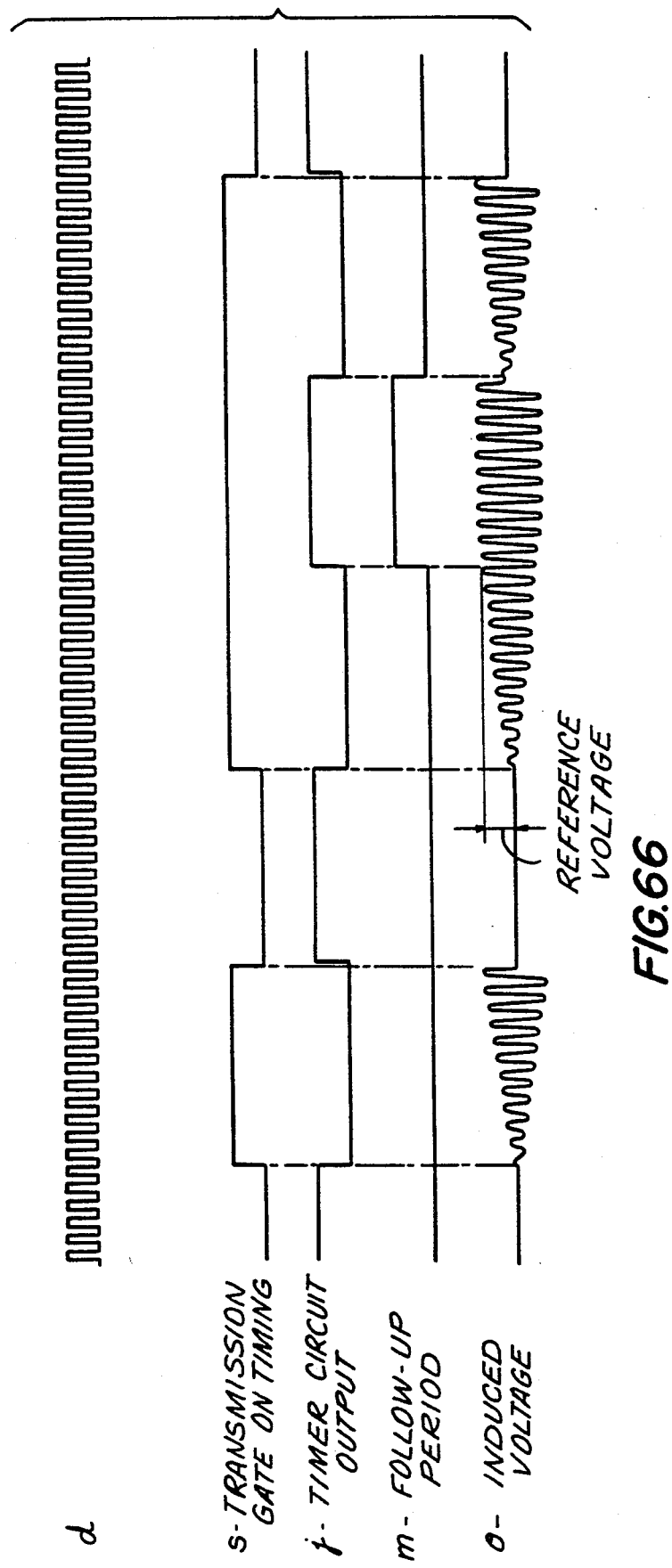

Referring now to both FIGS. 65 and 66, the flip-flop circuit 389 receives control signal $\phi_1$ at its set(S) terminal. The Q output signal of flip-flop circuit 389 assumes a H logic level and is applied as a gate control signal s to driving/detection switching circuit 117. Transmission gates 173-178 open; driving voltages are applied to vibrators 108. When timer circuit 385 receives control signal $\phi_1$ to initiate time measurement, output signal j of timer circuit 385 maintains a L logic level until a predetermined period of time has closed. Output signal m of AND gate 393 remains at the L logic level. Consequently, frequency correction by frequency follow-up circuit 602 does not occur.

When the induced voltage of vibrators 108 is lower than the reference voltage of reference voltage generating circuit 386 and before the predetermined period of time has elapsed as measured by timer circuit 385 (at which time output signal j assumes a H logic level), the output of comparator 387 assumes a H logic level. Flip-flop circuit 389 resets and therefore the Q terminal assumes a L logic level. Transmission gates 173-178 close. Application of the driving voltages to vibrators 108 is interrupted. Outputs signal j (at a H logic level) of timer circuit 385 and the output signal S (at a L logic level) of flip-flop circuit 389 are applied to AND gate 393. Signal m remains at a L logic level. Frequency correction by frequency follow-up circuit 602 is not carried out.

When induced voltage of vibrator 108 does not exceed the reference voltage of reference voltage generating circuit 386 and output signal of timer circuit 385 has assumed a H logic level (i.e., the predetermined period of time has elapsed), the output of the comparator 387 remains at the L logic level. Flip-flop circuit 389 is therefore not reset and this output remains at the H logic level. Output signal m of AND gate 393 now assumes a H logic level and drives frequency follow-up circuit 602. Control signal generating circuit 372 also receives the output signal of induced voltage comparison circuit 601 and now supplies a control voltage to oscillator 373. Oscillator 373, which is preferably a voltage controlled oscillator, produces oscillation signal d at an oscillation frequency in accordance with control voltage $\phi_1$ to control circuit 103. Driving voltages at the oscillation frequency of oscillator 373 are therefore applied to vibrators 108 so that stator 2 vibrates at its resonant frequency. Efficient vibratory motion of stator 2 results.

As now can be readily appreciated, the invention provides an ultrasonic step motor in which variation in the length of a step can be easily controlled based on the driving signals applied to the vibrators. The step motor in accordance with the invention, as compared to a conventional step motor, operates at a reduced power level providing far more efficient operation. To ensure that the stator vibrates at its resonant frequency, the driving signals applied to the vibrators are at substantially the same frequency as the resonant frequency of stator 2 (i.e., vibrators 108 are vibrating at the resonant frequency of stator 2).

It will thus be seen that the objects set forth above and those made apparent from the preceding description are efficiently attained and, since certain changes may be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all generic and specific features of the invention herein described and all statements of the scope of the invention, which as a matter of language, might be said to fall therebetween.

What is claimed is:

1. A step motor, comprising:
    first means operable for vibrating in a first direction at a frequency which produces at least two vibratory nodes positioned on said first means;
    vibrator means for excitation of said first means;
    drive means for driving said vibrator means so as to control the number and position of vibratory nodes produced by said first means;
    second means operable for movement relative to said vibratory nodes in a second direction essentially orthogonal to said first direction through contact with said first means; and
    projection means formed on said second means extending toward said first means, said projection means operable for contact with said first means whereby said projection means move in said second direction.

2. The step motor of claim 1, wherein the first means vibrates at its resonant frequency.

3. The step motor of claim 2, wherein the vibrator means is operable for vibrating at the resonant frequency of the first means.

4. The step motor of claim 1, wherein the drive means selectively displaces the position of the vibrating nodes to displace the second means in steps.

5. The step motor of claim 3, wherein the second means includes projection means extending toward said first means, said projection means operable for contact with said first means whereby said projection means move in said second direction.

6. The step motor of claim 1, wherein said vibrator means includes more than one vibrator connected to said first means.

7. The step motor of claim 3, wherein said vibrator means includes more than one vibrator connected to said first means.

8. The step motor of claim 5, wherein said vibrator means includes more than one vibrator connected to said first means.

9. The step motor of claim 1, further including supply means for providing supply voltages of positive and negative polarity, said drive means producing driving signals based on said supply voltages.

10. The step motor of claim 3, further including supply means for providing supply voltages of positive and negative polarity, said drive means producing driving signals based on said supply voltages.

11. The step motor of claim 5, further including supply means for providing supply voltages of positive and negative polarity, said drive means producing driving signals based on said supply voltages.

12. The step motor of claim 6, further including supply means for providing supply voltages of positive and negative polarity, said drive means producing driving signals based on said supply voltages.

13. The step motor of claim 8, further including supply means for providing supply voltages of positive and negative polarity, said drive means producing driving signals based on said supply voltages.

14. The step motor of claim 9, wherein the driving signals are at the same frequency as the resonant frequency of said first means.

15. The step motor of claim 1, wherein the frequency at which said first means vibrates is ultrasonic, said first means serves as a stator and said second means serves as a rotor.

16. The step motor of claim 10, wherein the driving signals are at the same frequency as the resonant frequency of said first means.

17. The step motor of claim 11, wherein the driving signals are at the same frequency as the resonant frequency of said first means.

18. The step motor of claim 12, wherein the driving signals are at the same frequency as the resonant frequency of said first means.

19. The step motor of claim 13, wherein the driving signals are at the same frequency as the resonant frequency of said first means.

20. The step motor of claim 4, wherein said projection means includes a plurality of projections, said projections and vibratory nodes being equal in number.

21. The step motor of claim 5, wherein said projection means includes a plurality of projections, said projections and vibratory nodes being equal in number.

22. The step motor of claim 8, wherein said projection means includes a plurality of projections, said projections and vibratory nodes being equal in number.

23. The step motor of claim 5, wherein the frequency at which said first means vibrates is ultrasonic, said first means serves as a stator and said second means serves as a rotor.

24. The step motor of claim 11, wherein the frequency at which said first means vibrates is ultrasonic, said first means serves as a stator and said second means serves as a rotor.

25. The step motor of claim 13, wherein said projection means includes a plurality of projections, said projections and vibratory nodes being equal in number.

26. The step motor of claim 19, wherein said projection means includes a plurality of projections, said projections and vibratory nodes being equal in number.

27. The step motor of claim 6, wherein each vibrator includes at least two terminals, said driving signals applied to one of the at least two terminals of each vibrator.

28. The step motor of claim 27, wherein the same driving signal is applied to different vibrators at the same time.

29. The step motor of claim 13, wherein each vibrator includes at least two terminals, said driving signals applied to one of the at least two terminals of each vibrator.

30. The step motor of claim 29, wherein the same driving signal is applied to different vibrators at the same time.

31. The step motor of claim 27, wherein the other of the at least two terminals of each vibrator is connected to a reference voltage.

32. The step motor of claim 29, wherein the other of the at least two terminals of each vibrator is connected to a reference voltage.

33. The step motor of claim 31, wherein the reference voltage is ground.

34. The step motor of claim 32, wherein the reference voltage is ground.

35. The step motor of claim 9, wherein said driving signals form a phase pattern having a predetermined number of driving signals of a first polarity followed by the same predetermined number of driving signals of a second polarity.

36. The step motor of claim 10, wherein said driving signals form a phase pattern having a predetermined number of driving signals of a first polarity followed by the same predetermined number of driving signals of a second polarity.

37. The step motor of claim 11, wherein said driving signals form a phase pattern having a predetermined number of driving signals of a first polarity followed by the same predetermined number of driving signals of a second polarity.

38. The step motor of claim 14, wherein said driving signals form a phase pattern having a predetermined number of driving signals of a first polarity followed by the same predetermined number of driving signals of a second polarity.

39. The step motor of claim 17, wherein said driving signals form a phase pattern having a predetermined number of driving signals of a first polarity followed by the same predetermined number of driving signals of a second polarity.

40. The step motor of claim 9, further including filter means responsive to said drive means for producing sinusoidal voltages at a frequency equal to the resonant frequency of said first means, said sinusoidal voltages serving as said driving signals applied to said vibrator means.

41. The step motor of claim 10, wherein said drive means further include filter means for producing sinusoidal voltages at a frequency approximately equal to the resonant frequency of said first means, said sinusoidal voltages serving as said driving signals applied to said vibrator means.

42. The step motor of claim 11, wherein said drive means further include filter means for producing sinusoidal voltages at a frequency approximately equal to the resonant frequency of said first means, said sinusoidal voltages serving as said driving signals applied to said vibrator means.

43. The step motor of claim 14, wherein said drive means further include filter means for producing sinusoidal voltages at a frequency approximately equal to the resonant frequency of said first means, said sinusoidal voltages serving as said driving signals applied to said vibrator means.

44. The step motor of claim 17, wherein said drive means further include filter means for producing sinusoidal voltages at a frequency approximately equal to the resonant frequency of said first means, said sinusoidal voltages serving as said driving signals applied to said vibrator means.

45. The step motor of claim 35, wherein said drive means further include filter means for producing sinusoidal voltages at a frequency approximately equal to the resonant frequency of said first means, said sinusoidal voltages serving as said driving signals applied to said vibrator means.

46. The step motor of claim 1, further including supply means for producing supply voltages of only one polarity, said drive means producing driving signals based on said supply voltages.

47. The step motor of claim 3, further including supply means for producing supply voltages of only one polarity, said drive means producing driving signals based on said supply voltages.

48. The step motor of claim 6, further including supply means for producing supply voltages of only one polarity, said drive means producing driving signals based on said supply voltages.

49. The step motor of claim 8, further including supply means for producing supply voltages of only one polarity, said drive means producing driving signals based on said supply voltages.

50. The step motor of claim 15, further including supply means for producing supply voltages of only one polarity, said drive means producing driving signals based on said supply voltages.

51. The step motor of claim 21, further including supply means for producing supply voltages of only one polarity, said drive means producing driving signals based on said supply voltages.

52. The step motor of claim 50, wherein each vibrator includes at least two terminals, said driving signals being applied to one of at least two terminals of each vibrator.

53. The step motor of claim 51, wherein each vibrator includes at least two terminals, said driving signals being applied to one of at least two terminals of each vibrator.

54. The step motor of claim 52, wherein each vibrator includes at least two terminals, said driving signals being applied to one of at least two terminals of each vibrator.

55. The step motor of claim 1, wherein said drive means produces driving signals applied to said vibrators; each vibratory node of said first means being associated with successive driving signals of opposite polarity or a driving signal of zero volts.

56. The step motor of claim 6, wherein said drive means is operable for producing driving signals applied to successive vibrators and staggered by a predetermined period of time from each other; and wherein said drive means include gate means for interrupting application of successive driving signals to said vibrator means for one half of said predetermined period of time.

57. The step motor of claim 56, wherein said drive means further includes control means for producing a predetermined pattern of control signals of opposite phases; said driving signals forming a phase pattern in accordance with the predetermined pattern of control signals of opposite phase.

58. The step motor of claim 6, wherein said vibrators are equally spaced about the circumference of said first means.

59. The step motor of claim 12, wherein said vibrators are equally spaced about the circumference of said first means.

60. The step motor of claim 18, wherein said vibrators are equally spaced about the circumference of said first means.

61. The step motor of claim 27, wherein said vibrators are equally spaced about the circumference of said first means.

62. The step motor of claim 48, wherein said vibrators are equally spaced about the circumference of said first means.

63. The step motor of claim 6 wherein said drive means is operable for producing driving signals applied to said vibrator means and includes detecting means to detect movement of second means and gate means for interrupting application of said driving signals based on said detecting means detecting movement of a predetermined amount by said second means.

64. The step motor of claim 63, wherein detection of said predetermined amount by said detecting means begins with the initial movement of said second means.

65. A step motor comprising:
first means operable for vibrating in a first direction at a frequency which produces at least two vibratory nodes positioned on said first means;
vibrator means for excitation of said first means, said vibrator means including more than one vibrator connected to said first means;
drive means for driving said vibrator means so as to control the number and position of vibratory nodes produced by said first means, said drive means is operable for producing driving signals applied to said vibrator means;
second means operable for movement relative to said vibratory nodes in a second direction essentially orthogonal to said first direction through contact with said first means;
detecting means to detect movement of second means; and
gate means for interrupting application of said driving signals based on said detecting means detecting movement of a predetermined amount by said second means;
wherein detection of said predetermined amount by said detecting means begins with the initial movement of said second means; and
wherein said detection means detects movement of said second means by detecting maximum induced voltages in selected vibrators.

66. The step motor of claim 65, wherein said drive means further includes means for applying a driving signal to a selected vibrator to serve as said maximum induced voltage.

67. The step motor of claim 6, wherein said first means in vibrating in said first direction produces vibratory antinodes positioned on said first means; and wherein said drive means includes gate means for interrupting application of a driving voltage to a vibrator associated with one of said vibratory antinodes.

68. The step motor of claim 67, wherein each vibrator associated with a vibratory antinode is positioned on said first means at the associated vibratory antinode.

69. The step motor of claim 68, wherein said gate means interrupts application of a driving voltage to each vibrator associated with said vibratory antinodes.

70. The step motor of claim 6, wherein said first means in vibrating in said first direction produces vibratory antinodes positioned on said first means; and wherein said drive means include gate means for applying driving voltages to only those vibrators associated with the vibratory antinodes.

71. A step motor comprising:
first means operable for vibrating in a first direction at a frequency which produces at least two vibratory nodes positioned on said first means;
vibrator means for excitation of said first means, said vibrator means including more than one vibrator connected to said first means;
drive means for driving said vibrator means so as to control the number and position of vibratory nodes produced by said first means; and
second means operable for movement relative to said vibratory nodes in a second direction essentially orthogonal to said first direction through contact with said first means;
wherein said drive means produces driving signals applied to said vibrators, at least two driving signals being of opposite phase and applied to at least a corresponding pair of vibrators, said drive means operable for reversing application of driving signals of opposite phase to each corresponding pair of vibrators and including gate means for providing a short circuit between each corresponding pair of vibrators when application of driving signals of opposite phase is reversed.

72. The step motor of claim 63, wherein the driving signals are at the same frequency as the resonant frequency of said first means.

73. The step motor of claim 72, wherein the second means includes projection means extending toward said first means, said projection means operable for contact with said first means whereby said projection means move in said second direction.

74. The step motor of claim 73, wherein said projection means includes a plurality of projections, said projections and vibratory nodes, being equal in number.

75. The step motor of claim 74, wherein said drive means further includes filter means for producing sinusoidal voltages at a frequency equal to the resonant frequency of said first means, said sinusoidal voltages serving as said driving signals applied to said vibrator means.

76. The step motor of claim 75, wherein said vibrators are equally spaced about the circumference of said first means.

77. The step motor of claim 65, wherein the driving signals are at the same frequency as the resonant frequency of said first means.

78. The step motor of claim 77, wherein the second means includes projection means extending toward said first means, said projection means operable for contact with said first means whereby said projection means move in said second direction.

79. The step motor of claim 78, wherein said projection means includes a plurality of projections, said projections and vibrato nodes being equal in number.

80. The step motor of claim 79, wherein said drive means further include filter means for producing sinusoidal voltages at a frequency equal to the resonant frequency of said first means, said sinusoidal voltages serving as said driving signals applied to said vibrator means.

81. The step motor of claim 80, wherein said vibrators are equally spaced about the circumference of said first means.

82. The step motor of claim 67, wherein the driving signals are at the same frequency as the resonant frequency of said first means.

83. The step motor of claim 82, wherein the second means includes projection means extending toward said first means, said projection means operable for contact with said first means whereby said projection means move in said second direction.

84. The step motor of claim 83, wherein said projection means includes a plurality of projections, said projections and vibrator nodes being equal in number.

85. The step motor of claim 84, wherein said drive means further include filter means for producing sinusoidal voltages at a frequency equal to the resonant frequency of said first means, said sinusoidal voltages serving as said driving signals applied to said vibrator means.

86. The step motor of claim 85, wherein said vibrators are equally spaced about the circumference..of said first means.

87. The step motor of claim 68, wherein the driving signals are at the same frequency as the resonant frequency of said first means.

88. The step motor of claim 87, wherein the second means includes projection means extending toward said first means, said projection means operable for contact with said first means whereby said projection means move in said second direction.

89. The step motor of claim 88, wherein said projection means includes a plurality of projections, said projections and vibrator nodes being equal in number.

90. The step motor of claim 89, wherein said drive means further include filter means for producing sinusoidal voltages at a frequency equal to the resonant frequency of said first means, said sinusoidal voltages serving as said driving signals applied to said vibrator means.

91. The step motor of claim 90, wherein said vibrators are equally spaced about the circumference of said first means.

92. The step motor of claim 70, wherein the driving signals are at the same frequency as the resonant frequency of said first means.

93. The step motor of claim 92, wherein the second means includes projection means extending toward said first means, said projection means operable for contact with said first means whereby said projection means move in said second direction.

94. The step motor of claim 93 wherein said projection means includes a plurality of projections, said projections and vibrator nodes being equal in number.

95. The step motor of claim 94, wherein said drive means further include filter means for producing sinusoidal voltages at a frequency equal to the resonant frequency of said first means, said sinusoidal voltages serving as said driving signals applied to said vibrator means.

96. The step motor of claim 95, wherein said vibrators are equally spaced about the circumference of said first means.

97. The step motor or claim 6, wherein said drive means produces driving signals at a predetermined frequency applied to said vibrators and includes detection means for detecting an induced voltage in at least one selected vibrator, operating means for determining the difference between the induced voltage and a reference level and frequency correcting means for producing a frequency correcting signal based on said difference, said drive means in response to said frequency correcting signal for adjusting the predetermined frequency of said driving signals whereby the frequency at which said first means vibrates approaches or reaches the resonant frequency of said first means.

98. The step motor of claim 97, wherein the detection means includes means for interrupting application of at least one of said driving signals applied to a corresponding vibrator.

99. The step motor of claim 97, wherein said difference represents the difference between the amplitude of the induced voltage and reference level.

100. The step motor of claim 97, wherein said difference represents the difference in phase between the induced voltage and reference level, said frequency correcting signal representing the correction required in the predetermined frequency so that said difference equals 90°.

101. The step motor of claim 100, wherein the reference level represents the phase of a driving signal.

102. The step motor of claim 97, wherein said frequency correcting signal includes first oscillating means for producing an oscillating signal, counting means for counting the oscillating signals based on said difference and second oscillating means responsive to said counting means to produce said frequency correcting signal.

103. The step motor of claim 98, wherein said first means in vibrating in said first direction produces vibratory antinodes positioned on said first means; and wherein said drive means further includes logic means for determining the occurrence of said vibratory antinodes, said detection means responsive to said logic means for interrupting application of a driving signal to a vibrator during the occurrence of an antinode at the latter.

104. The step motor of claim 97, wherein said driving means includes means for determining that said induced voltage has reached a predetermined level prior to said comparison means detecting said difference.

105. A step motor comprising:
  first means operable for vibrating in a first direction at a frequency which produces at least two vibratory nodes positioned on said first means;
  vibrator means for excitation of said first means, said vibrator means including more than one vibrator connected to said first means;
  second means operable for movement relative to said vibratory nodes in a second direction essentially orthogonal to said first direction through contact with said first means; and
  drive means for driving said vibrator means so as to control the number and position of vibratory nodes produced by said first means, said drive means producing driving signals at a predetermined frequency applied to said vibrators and including detection means for detecting an induced voltage in at least one selected vibrator, operating means for determining the difference between the induced voltage and a reference level and frequency correcting means for producing a frequency correcting signal based on said difference, said drive means in response to said frequency correcting signal adjusting the predetermined frequency of said driving signals, whereby the frequency at which said first means vibrates approaches or reaches the resonant frequency of said first means; and said drive means further including timing means for generating a timing signal each time said second means has moved for a given period of time relative to said vibratory nodes; said frequency correcting means responsive to said timing signal in producing said frequency correcting signal.

106. The step motor of claim 105, wherein said given period of time starts when said second means begins to move relative to said vibratory nodes.

107. The step motor of claim 97, wherein the second means includes projection means extending toward said first means, said projection means operable for contact with said first means whereby said projection means move in said second direction.

108. The step motor of claim 107, wherein said projection means includes a plurality of projections, said projections and vibratory nodes being equal in number.

109. The step motor of claim 108, wherein said drive means further include filter means for producing sinusoidal voltages at a frequency equal to the resonant frequency of said first means, said sinusoidal voltages serving as said driving signals applied to said vibrator means.

110. The step motor of claim 98, wherein the second means includes projection means extending toward said first means, said projection means being operable for contact with said first means whereby said projection means move in said second direction.

111. The step motor of claim 110, wherein said projection means includes a plurality of projections, said projections and vibratory nodes being equal in number.

112. The step motor of claim 111, wherein said drive means further include filter means for producing sinusoidal voltages at a frequency equal to the resonant frequency of said first means, said sinusoidal voltages serving as said driving signals applied to said vibrator means.

113. The step motor of claim 102, wherein the second means includes projection means extending toward said first means, said projection means operable for contact with said first means whereby said projection means move in said second direction.

114. The step motor of claim 113, wherein said projection means includes a plurality of projections, said projections and vibratory nodes being equal in number.

115. The step motor of claim 114, wherein said drive means further include filter means for producing sinusoidal voltages at a frequency equal to the resonant frequency of said first means, said sinusoidal voltages serving as said driving signals applied to said vibrator means.

116. The step motor of claim 103, wherein the second means includes projection means extending toward said first means, said projection means operable for contact with said first means whereby said projection means move in said second direction.

117. The step motor of claim 116, wherein said projection means includes a plurality of projections, said projections and vibratory nodes being equal in number.

118. The step motor of claim 117, wherein said drive means further include filter means for producing sinusoidal voltages at a frequency equal to the resonant frequency of said first means, said sinusoidal voltages serving as said driving signals applied to said vibrator means.

119. The step motor of claim 65, wherein the drive means selectively displaces the position of the vibrating nodes to displace the second means in steps.

120. A step motor comprising:
  first means operable for vibrating in a first direction at a frequency which produces at least two vibratory nodes positioned on said first means;
  vibrator means for excitation of said first means, said vibrator means including more than one vibrator connected to said first means;
  second means operable for movement relative to said vibratory nodes in a second direction essentially orthogonal to said first direction through contact with said first means; and
  drive means for driving said vibrator means so as to control the number and position of vibratory nodes produced by said first means, said drive means producing driving signals at a predetermined frequency applied to said vibrators and including detection means for detecting an induced voltage in at least one selected vibrator, operating means for determining the difference between the induced voltage and a reference level and frequency correcting means for producing a frequency correcting signal based on said difference, said drive means in response to said frequency correcting signal adjusting the predetermined frequency of said driving signals, whereby the frequency at which said first means vibrates approaches or reaches the resonant frequency of said first means;
  wherein the reference level of said operating means represents a previously detected induced voltage, and wherein said frequency correcting means includes driving follow-up means for comparing said difference to an additional reference level and producing an output signal based on said comparison and representing the position of said second means relative to said vibratory nodes.

121. The step motor of claim 120, wherein said frequency correcting means is responsive to said output signal in producing said frequency correcting signal.

122. The step motor of claim 121, wherein said output signal is below a predetermined level when movement by said second means relative to said vibratory nodes has been completed.

123. The step motor of claim 120, wherein said driving follow-up means includes latch means for producing said output signal in response to said comparison.

124. The step motor of claim 121, wherein said driving follow-up means includes latch means for producing said output signal in response to said comparison.

125. The step motor of claim 124, wherein said output signal is below a predetermined level when movement by said second means relative to said vibratory nodes has been completed.

126. The step motor of claim 121, wherein said drive means includes gate means for interrupting application of one or more driving signals to corresponding vibrators based on said difference being less than a predetermined value.

127. The step motor of claim 126, wherein said output signal is below a predetermined level when movement by said second means relative to said vibratory nodes has been completed.

128. The step motor of claim 126, wherein said frequency correcting means further includes counting means for producing a count value based on said comparison, said gate means based on said count value permitting application of one or more driving signals to corresponding vibrators.

129. The step motor of claim 123, wherein said output signal is below a predetermined level when movement by said second means relative to said vibratory nodes has been completed.

130. The step motor of claim 123, wherein said latch means is operable for resetting the output signal to a value of zero; and wherein each time said second means moves relative to said vibratory nodes said output signal of said latch means can be reset based on said comparison being less than a predetermined magnitude; and wherein said frequency correcting means further includes timing means for producing a timing signal following the elapse of a predetermined period of time after said second means begins to move relative to said vibratory nodes and logic means responsive to said timing signal and output signal for producing a logic output, said frequency correcting means responsive to said logic output in producing said frequency correcting signal.

131. A step motor comprising:
first means operable for vibrating in a first direction at a frequency which produces at least two vibratory nodes positioned on said first means;
vibrator means for excitation of said first means, said vibrator means including more than one vibrator connected to said first means;
second means operable for movement relative to said vibratory nodes in a second direction essentially orthogonal to said first direction through contact with said first means; and
drive means for driving said vibrator means so as to control the number and position of vibratory nodes produced by said first means, said drive means producing driving signals at a predetermined frequency applied to said vibrators and including detection means for detecting an induced voltage in at least one selected vibrator, operating means for determining the difference between the induced voltage and a reference level and frequency correcting means for producing a frequency correcting signal based on said difference, said drive means in response to said frequency correcting signal adjusting the predetermined frequency of said driving signals, whereby the frequency at which said first means vibrates approaches or reaches the resonant frequency of said first means;
the reference level of said operating means representing a previously detected induced voltage; and said frequency correcting means including driving follow-up means for comparing said induced voltage to an additional reference level and producing an output signal based on said comparison and representing the position of said second means relative to said vibratory nodes.

132. The step motor of claim 131, wherein said driving follow-up means includes latch means for producing said output signal in response to said comparison.

133. The step motor of claim 132, wherein said drive means includes gate means for interrupting application of one or more driving signals to corresponding vibrators based on said comparison.

134. The step motor of claim 133, wherein said driving follow-up means includes timing means for producing a timing signal following the elapse of a predetermined period of time after said second means begins to move relative to said vibratory nodes and logic means responsive to said timing signal and output signal for producing a logic output, said frequency correcting means responsive to said logic output in producing said frequency correcting signal.

135. A step motor comprising:
a stator operable for vibrating in a first direction at a frequency which produces at least two vibratory nodes positioned on said stator;
vibrator means for excitation of said stator, said vibrator means including more than one vibrator connected to said stator;
a rotor operable for movement relative to said vibratory nodes in a second direction essentially orthogonal to said first direction through contact with said stator, and
drive means for driving said vibrator means so as to control the number and position of vibratory nodes produced by said stator, said drive means producing driving signals at a predetermined frequency applied to said vibrators and including detection means for detecting an induced voltage in at least one selected vibrator, operating means for determining the difference between the induced voltage and a reference level and frequency correcting means for producing a frequency correcting signal based on said difference, said drive means in response to said frequency correcting signal adjusting the predetermined frequency of said driving signals, whereby the frequency at which said stator vibrates approaches or reaches the resonant frequency of said stator;
the frequency at which said first means vibrates being ultrasonic.

136. The step motor of claim 120, wherein the frequency at which said first means vibrates is ultrasonic, said first means serves as a stator and said second means serves as a rotor.

137. The step motor of claim 126, wherein the frequency at which said first means vibrates is ultrasonic, said first means serves as a stator and said second means serves as a rotor.

138. The step motor of claim 128, wherein the frequency at which said first means vibrates is ultrasonic, said first means serves as a stator and said second means serves as a rotor.

139. The step motor of claim 130, wherein the frequency at which said first means vibrates is ultrasonic, said first means serves as a stator and said second means serves as a rotor.

140. The step motor of claim 134, wherein the frequency at which said first means vibrates is ultrasonic, said first means serves as a stator and said second means serves as a rotor.

141. The step motor of claim 71, wherein the drive means selectively displaces the position of the vibrating nodes to displace the second means in steps.

142. The step motor of claim 120, wherein the drive means selectively displaces the position of the vibrating nodes to displace the second means in steps.

* * * * *